US011501612B2

(12) United States Patent
Davis

(10) Patent No.: US 11,501,612 B2
(45) Date of Patent: Nov. 15, 2022

(54) MECHANICALLY CHARACTERIZED WIN SYMBOL DISPLAY APPARATUS AND METHOD FOR ENTERTAINMENT GAME

(71) Applicant: Epic Tech, LLC, Suwanee, GA (US)

(72) Inventor: Steven Wesley Davis, Suwanee, GA (US)

(73) Assignee: Epic Tech, LLC, Suwanee, GA (US)

(*) Notice: Subject to any disclaimer, the term of this patent is extended or adjusted under 35 U.S.C. 154(b) by 0 days.

(21) Appl. No.: 17/070,695

(22) Filed: Oct. 14, 2020

(65) Prior Publication Data

US 2021/0110676 A1 Apr. 15, 2021

Related U.S. Application Data

(60) Provisional application No. 62/914,880, filed on Oct. 14, 2019.

(51) Int. Cl.

*A63F 13/00* (2014.01)
*G07F 17/34* (2006.01)
*G07F 17/32* (2006.01)

(52) U.S. Cl.

CPC .......... *G07F 17/34* (2013.01); *G07F 17/3213* (2013.01); *G07F 17/3267* (2013.01)

(58) Field of Classification Search

CPC ... G07F 17/3213; G07F 17/3267; G07F 17/34
See application file for complete search history.

(56) References Cited

U.S. PATENT DOCUMENTS

| | | | | |
|---|---|---|---|---|
| 11,011,025 B2 * | 5/2021 | Pierer | G06Q 50/34 | |
| 2002/0123378 A1 * | 9/2002 | Bucknall | G07F 17/3211 | 463/16 |
| 2004/0063490 A1 * | 4/2004 | Okada | G07F 17/3227 | 463/20 |
| 2009/0075717 A1 * | 3/2009 | Jaffe | G07F 17/34 | 463/20 |
| 2009/0075722 A1 * | 3/2009 | Louie | G07F 17/32 | 463/20 |
| 2009/0181758 A1 * | 7/2009 | Loose | G07F 17/3202 | 463/20 |
| 2009/0280890 A1 * | 11/2009 | Jaffe | G07F 17/32 | 463/20 |
| 2013/0225262 A1 * | 8/2013 | Thompson | G07F 17/3248 | 463/25 |

* cited by examiner

*Primary Examiner* — Justin L Myhr
(74) *Attorney, Agent, or Firm* — Baker Donelson; Carl M. Davis, II

(57) ABSTRACT

A gaming system for entertaining play having a win symbol for display during game activity initiated by an input device with a winning notice field having a plurality of value devices representative of the win value and overlying the win symbol in the matrix, said winning notice field comprising an opaque field, whereby the win symbol is at least partially legible and said winning notice field expanding to cover at least an extent of the win symbol before fading from the display for uncovering the win symbol that moves to an winning accumulator. A method of displaying win symbols during play of an entertaining game is disclosed.

31 Claims, 47 Drawing Sheets

MECHANICALLY CHARACTERIZED WIN SYMBOL DISPLAY APPARATUS AND METHOD FOR ENTERTAINMENT GAME

TECHNICAL FIELD

The present invention relates generally to game machines with special features for play of random activity games, which special features facilitate game play performance and player satisfaction for entertaining game play. More particularly, the present invention relates to game machines for play of random activity games which game machine provides an improved special feature of an apparatus and method for characterized mechanical display of a win symbol during game play.

BACKGROUND

The gaming machines technology field provides a wide range of interactive machines for the playing of games of skill or random activity and chance for game players. Standard gaming devices and games display provide mechanical, electronically simulated, or otherwise action direction and display devices for interactive engagement of players with the action play during operation of the game. Game machine providers often seek technology particularly directed to special features for game performance and operation, which may be offered to players using such machines.

One conventional type of gaming devices and games display use a number of reels each having a plurality of symbol positions that are each marked or associated with one of a number of symbols available from a pool of different symbols. In the conventional game devices, the reels spin, and stop randomly, for displaying a pattern of symbols. If the pattern of symbols displayed on the stopped reels corresponds to a predetermined winning pattern, the device awards the player with a prize. In some games, a skill element is required in order to win the game, such as nudging one or more of the reels in a particular direction in an attempt to create a winning pattern.

Game machines and random activity games that offer novel and stimulating variations on the basic reel-based games, yet also comply with the strict regulatory restrictions that govern the gaming industry, are eagerly sought and there is intense competition between manufacturers to innovate. As such, vast amounts of time, energy, and financial resources are applied for the development of new gaming concepts, such as those described and claimed herein.

Further, game systems benefit from including features to attract the interest of players and generate an exciting expectation of play of the game.

Thus, there is a continuing need in the industry to provide novel innovative features for game machines and players. It is to such that the present invention is directed.

SUMMARY OF THE INVENTION

The present invention meets the need in the art by providing a gaming system for entertaining play having a randomly obtained win symbol during game play and with a novel and innovative apparatus for mechanical characterized display of the win symbol during game play, which gaming system comprises at least one input device and at least one display device configured to display a game comprising a matrix of rotating reels. A processor includes at least one memory including computer program code configured to, with the processor, operate the activity of the gaming system. A win symbol occurs randomly during a play of the gaming system, said win symbol included in the matrix displayed on the display device and said win symbol for displaying a win value. A winning notice field having a plurality of value devices representative of the win value overlies the win symbol in the matrix, and said winning notice field comprising an irregular perimeter, whereby the win value is at least partially legible, and the perimeter transforming to a substantially regular perimeter expanding outwardly from the irregular perimeter to cover substantially more of the win symbol.

More particularly, the present invention provides a gaming system for entertaining play having a randomly obtained win symbol for display during game activity, which gaming system comprises at least one input device and at least one display device configured to display a game comprising a matrix of rotating reels. A processor includes at least one memory including computer software configured to, with the processor, operate the activity of the gaming system. A win symbol displays during a play of the gaming system, said win symbol displayed in the matrix displayed on the display device and said win symbol for a win value. A winning notice field having a plurality of value devices representative of the win value displays overlying at least a portion of the win symbol in the matrix. The winning notice field comprising an opaque field having a perimeter, whereby the win value is at least partially legible and the perimeter transforming to a substantially regular perimeter and expanding outwardly to cover at least the entirety of the win symbol.

In another aspect, the present invention provides a gaming system for entertaining play having a win symbol for display during game activity, comprising at least one input device and at least one display device configured to display a game. A processor configured with computer software for operating the activity of the game, including a win symbol displayed on the display during a play of the gaming system, said win symbol for displaying a value of a winning play. A winning notice field for temporary display in association with the win symbol in the matrix, said winning notice field comprising a perimeter being irregular and the winning notice field being translucent for overlaying at least a portion of the win symbol in the matrix, whereby the win value is at least partially legible. The perimeter transformable to a substantially regular perimeter and expandable outwardly from the irregular perimeter to cover at least an entirety of the win symbol while the winning notice field decreasing translucency to make the winning notice field opaque to hide the win symbol.

In another aspect, the present invention provides a method of mechanically characterizing the display of a win symbol displayed during play of a gaming system, comprising the steps of:

displaying a win symbol on a portion of the game presented on a display of a game playing device;

overlying the win symbol with a winning notice field, said winning notice field opaque for covering at least a portion of the win symbol;

enlarging the winning notice from a first perimeter to a second perimeter for covering the win symbol;

forming a passageway through the winning notice for viewing at least a portion of the win symbol;

fading the winning notice field from the display; and displaying a move of the win symbol from the portion of the game to a winnings accumulator.

Objects, advantages, and features of the present invention will become apparent upon a reading of the following detailed description in conjunction with the drawings.

BRIEF DESCRIPTION OF THE DRAWINGS

A full and enabling disclosure of the present invention, including the best mode thereof directed to one of ordinary skill in the art, is set forth in the specification, which makes reference to the appended drawings.

DETAILED DESCRIPTION

Reference will now be made in detail to embodiments of the present systems and methods, one or more examples of which are illustrated in the accompanying drawings. Each example is provided by way of explanation, not limitation of the present system. In fact, it will be apparent to those skilled in the art that modifications and variations can be made to the present system and methods without departing from the scope or spirit thereof. For instance, features illustrated or described as part of one embodiment may be used in another embodiment to yield a still further embodiment. Thus, the present system and methods cover such modifications and variations as come within the scope of the appended claims and their equivalents.

Figure 1:
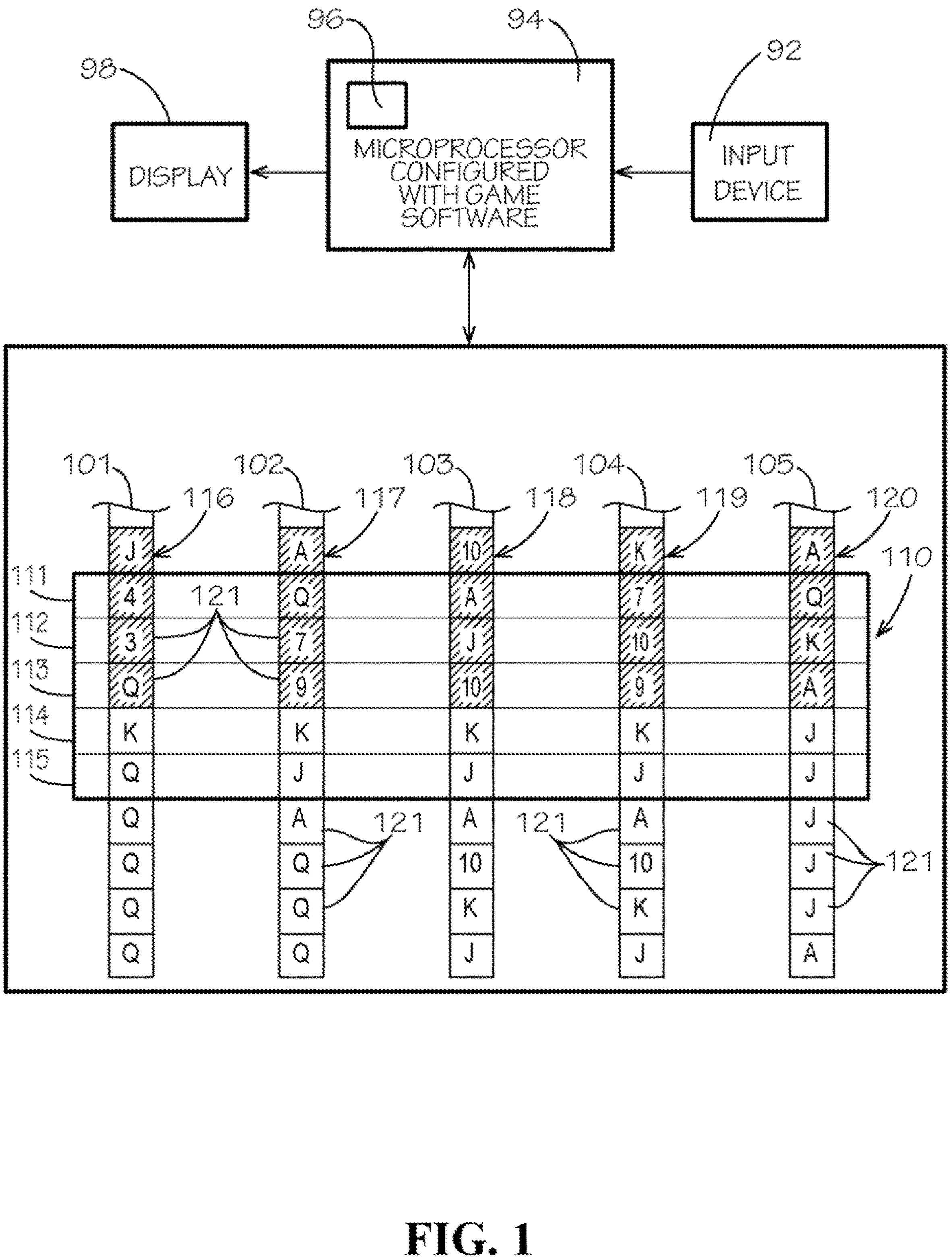
FIG. 1 illustrates in schematic view a representation of a game machine using reel strips for play of a game in an embodiment of the present invention.

With reference to the drawings, in which like parts have like reference numeral, FIG. 1 illustrates in schematic view a gaming machine 90 configured with a novel and exciting special feature apparatus 96 and method for characterized display of a win symbol during game play in accordance with the present invention using the gaming machine, system, and methodology. The disclosed invention of the special feature is illustrated implemented within an embodiment of a random action game having a player input device 92 that communicates with a microprocessor 94 containing software configured for the actions of the particular game including the special feature apparatus 96, and a display 98.

The game machine 90 operates with one or more simulated rotatable reels 101, 102, 103 104, and 105, displayed in a matrix format 110 of columns 116, 117, 118, 119, and 120 and rows 111, 112, 113, 114, and 115. In an embodiment, each reel is displayed as a vertical matrix column 116, 117, 118, 119, and 120 and contains one or more symbol positions 121 within each column. Any number of reels (columns) may be utilized in the present invention. In some embodiments, three, four, or five reels, or more, may be displayed. Similarly, any number of rows 111, 112, 113, 114, and 115 may be displayed. In an embodiment, the number of rows displayed at any given time may be three, four, or five rows, but the invention should not be so limited. Regardless of the number of matrix rows displayed to a participant player, such as the four rows 111, 112, 113, and 114, set forth in FIG. 3, the number of rows (and symbol positions 121) in any particular reel/column may be greater than the number of rows displayed. For example, as shown in the illustrative embodiment of a particular game may display five reels, each having displayed rows of symbol positions, which in the illustrated embodiment, a first reel 101 and a fifth reel 105 have three rows and the intermediate reels 102-104 have four rows, for a total of 18 displayed symbol positions. However, each of those five reels may actually comprise 20, 30, 50, 100, or any other number of rows or symbol positions 121 which are not displayed.

In an embodiment, each of the reels that is displayed in a column for a particular game is selected from a database of reel strips 100. The database may contain any number of reel strips 101, 102, 103, 104, and 105. In an embodiment, some reel strips may be related. For example, there may be a particular set of reel strips available for reel 1, a different set of reel strips available for reel 2, and yet a different set of reel strips available for reel 3. Alternatively, the reel strip for each reel may be selected from a common pool of reel strips.

Each pool or set of reel strips may contain any number of reel strips. In an embodiment, the processor selects reel strips from the database prior to each game to determine the reel strip that will displayed for each reel. This selection may be random or predetermined. In an embodiment, the system may first randomly select a reel strip for reel 1, then randomly select a reel strip for reel 2, and then randomly select a reel strip for reel 3 (or in any other order known). These selections may occur nearly simultaneously. Alternatively, the processor may select reel strips for all available reels simultaneously. Similarly, the reel strips may be displayed within the reel positions in any order known in the art or may be displayed simultaneously.

Figure 2:
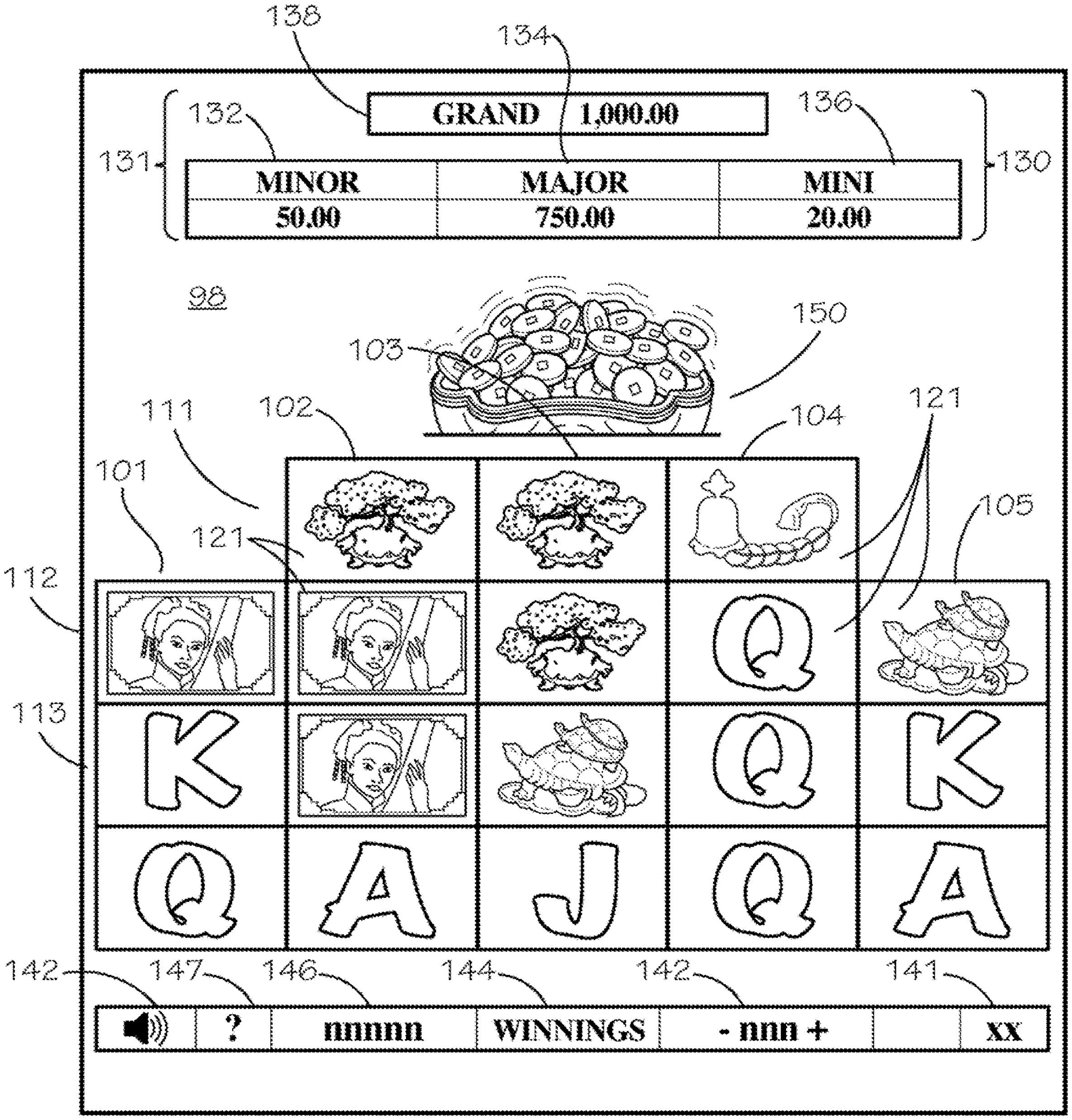
FIG. 2 illustrates an embodiment of a game display for the game machine having an improved special feature of an apparatus and method for characterized mechanical display of a win symbol during game play according to the present invention.

FIG. 2 illustrates the display 98 during play of the game machine according to the disclosed embodiment. The display includes a header generally 130 disclosing selectable game participation levels, such as for example mini game award 132, minor game award 134, major game award 136, and grand game award 138, which vary on player preferences for participation including a per-bet level 141. The display 98 includes a player adjustable bet amount 142 with selective plus or minus to increase or decrease the played amount for receiving at the end of play the selected game award if a played game results in a win. A winnings field 144 displays game play winnings while an accumulator value 146 displays accumulate winnings from sequential plays of the game. A help button 147 accesses game-provider assistance. A volume control 148 provides for adjusting background game play volume for sound such as game music and game commentary and sounds. The display 98 shows the matrix 110 of the reels, for example the reels 101-105 in the illustrative non-limiting embodiment, including matrix actions during play of a game and play outcome for determining wins and prizes based on the displayed matrix showing a predetermined win pattern. The game display for the illustrative embodiment further includes a winnings accumulator 150.

Figure 3:
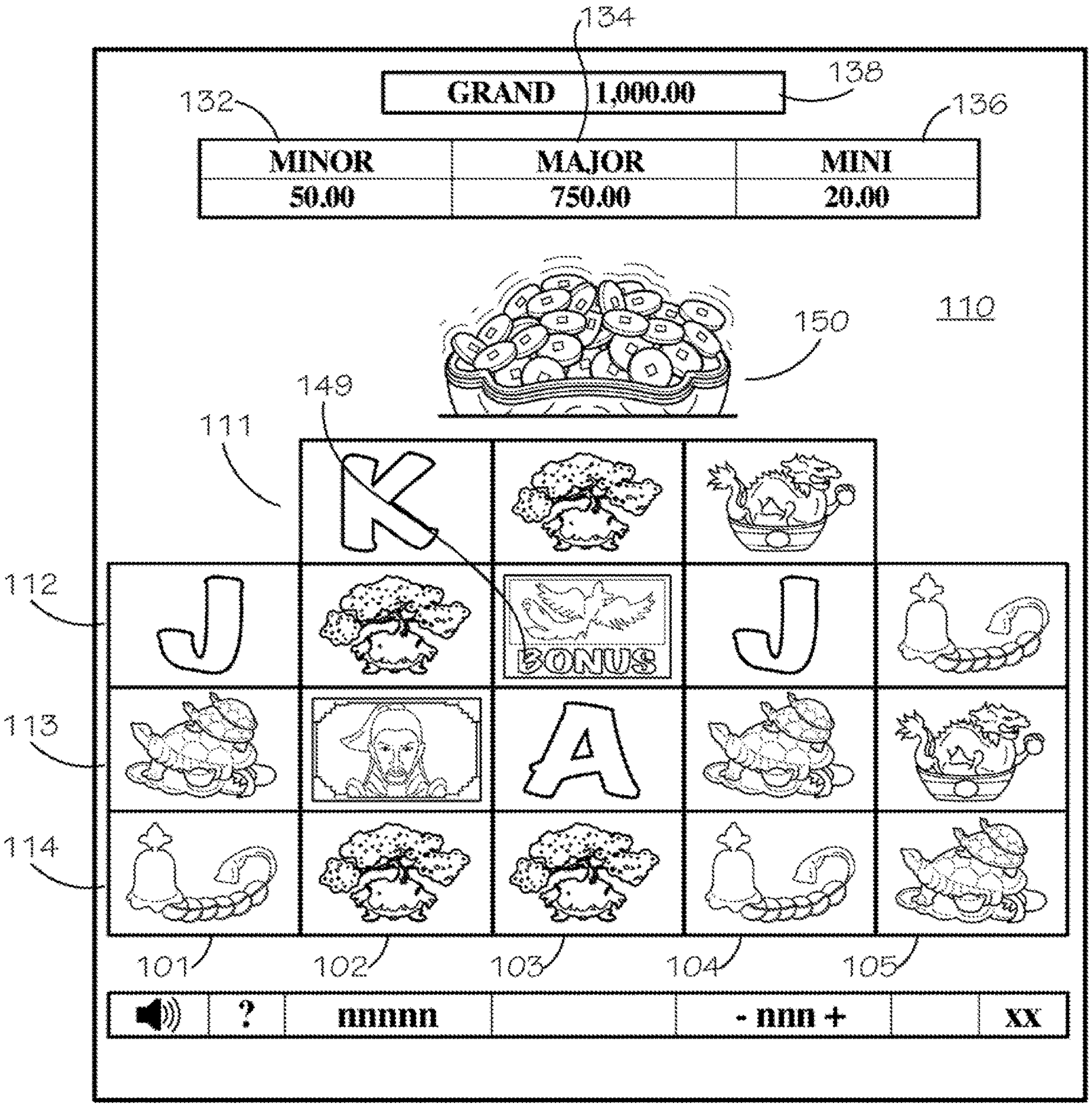
FIG. 3 illustrates the embodiment of the game display shown in FIG. 2 during a play of the game machine.
Figure 4:
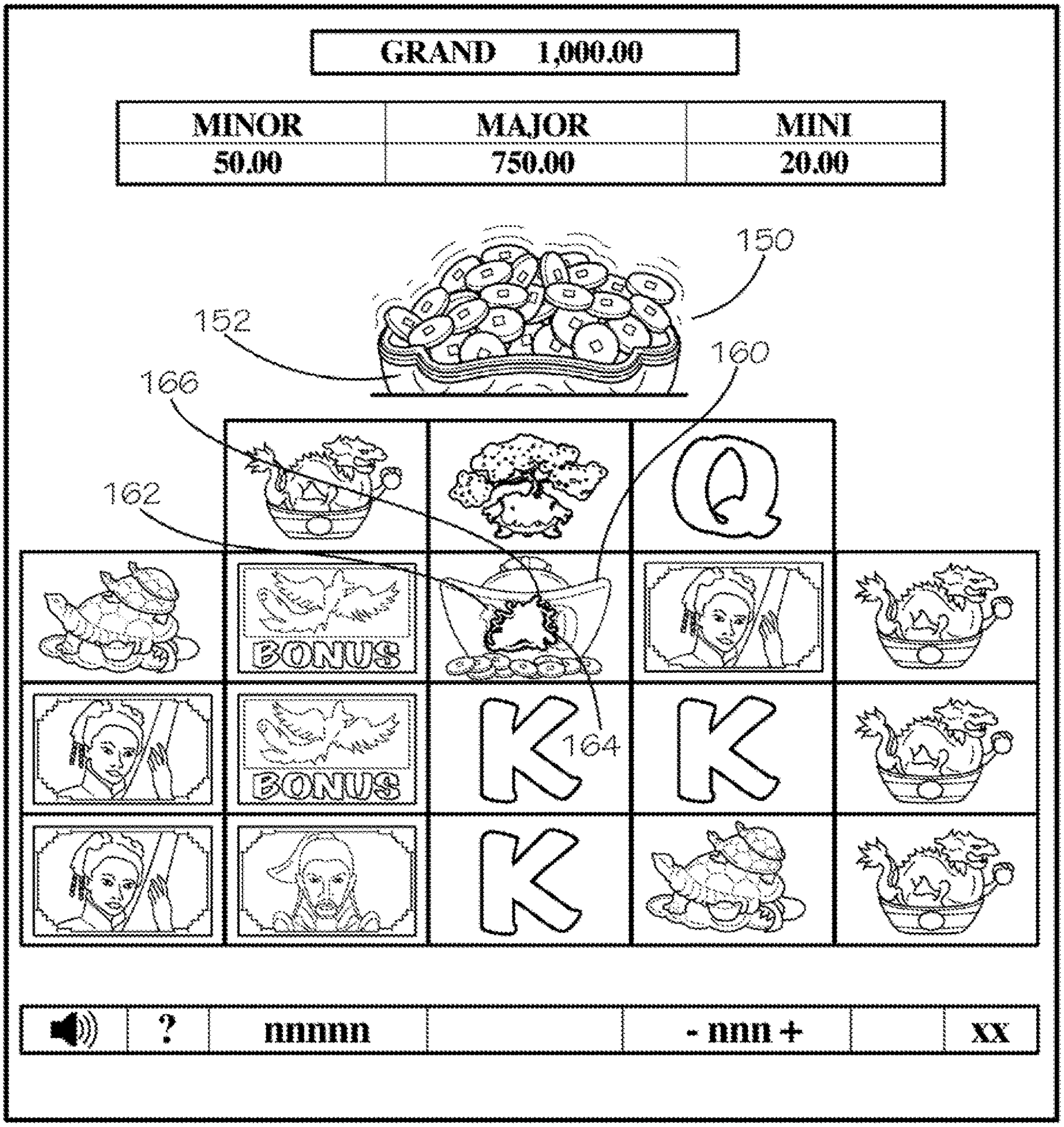
FIG. 4 illustrates the embodiment of the game display shown in FIG. 2 during a play of the game machine having a win symbol displayed in accordance with the present invention.

FIG. 3 illustrates game display shown in FIG. 2 during a play of the game machine. The reels 101-105 rotate for a predetermined period. The rotation causes the reel strips selected for play of the game machine to pass through the matrix 110 shown on the display. In the illustrated example, the display shows a "bonus" win 149 as to which the present invention brings to the attention of the player for encouraging excitement and interest in game play, in the matter discussed below.

Figure 5:
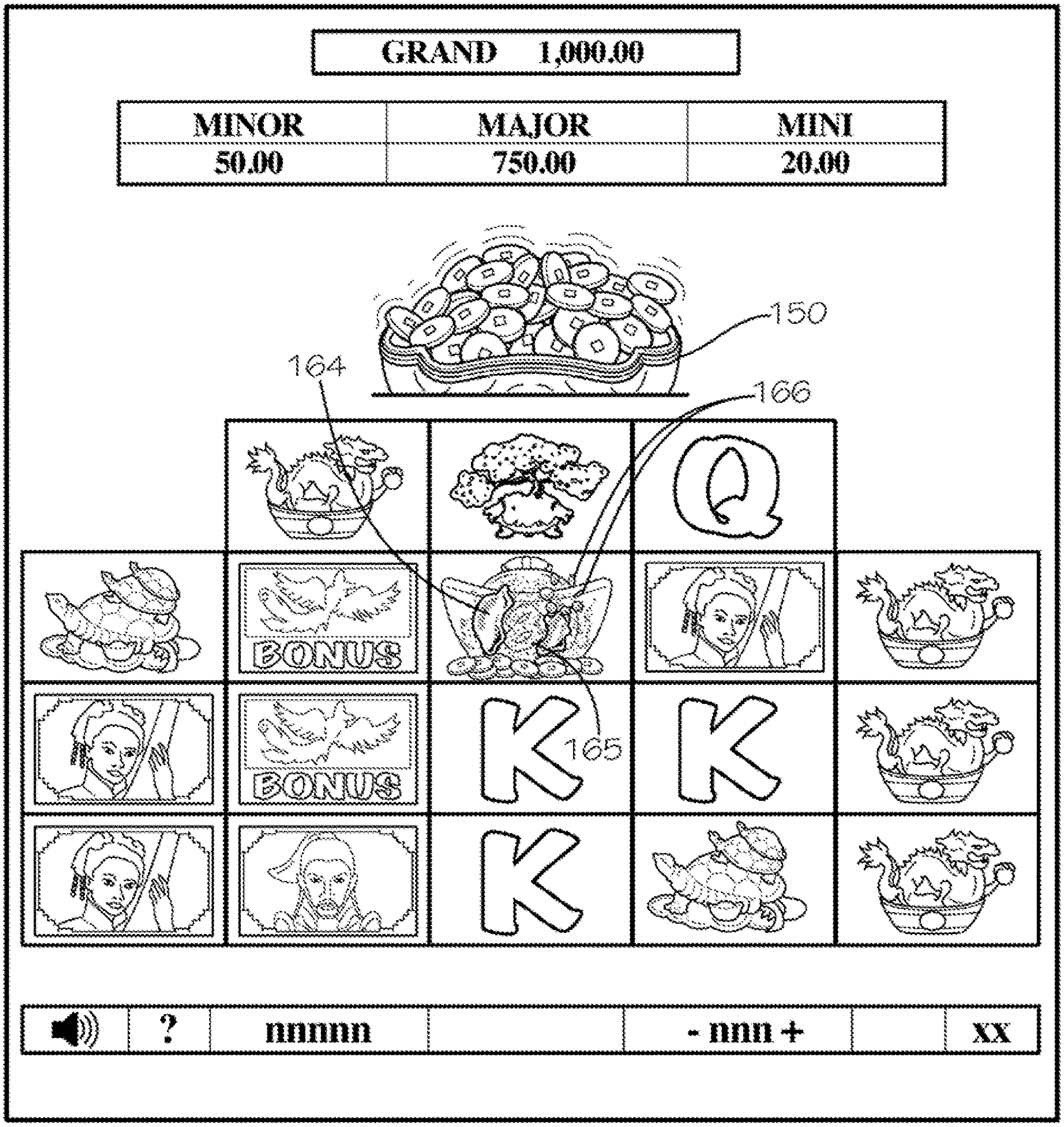
FIGS. 5-12 illustrate the embodiment of the game display shown in FIG. 3 during a play of the game machine having a special feature apparatus and method for characterized display of the win symbol during game play in accordance with the present invention, with FIGS. 9-12 shown in detailed view.

With reference to FIGS. 4-12, the game machine includes apparatus 96 for a characterized display process of a win symbol 160 that randomly occurs during game play. The win symbol 160 includes a graphic overlaid by a win value 162 for the particular win symbol that is presented randomly during game play. The win value 162 may differ for a particular type of the win symbol 160, for example, the win type based on player participation levels, randomly within a range of win values, or other win value determination actions. In the illustrated embodiment, the win symbol 160 appears with a flash 164 that partially obscures the win value 162. The flash 164 depicts a burst of light. The burst illumines at an initial point and becomes brighter (and shown larger on the screen) and then dimming. Also, the flash 164 includes a plurality of value devices 166 representative of the win value 162. That is, the higher the win value 162, the greater the number of value devices 166 displayed on the display. The value devices 166 are spaced-apart, and may be illustrated as gold coins or other value-indicative symbol or graphic. The value devices 166 commence rotating such as a rotating circle with the value devices on a perimeter thereof. The flash 164 expands outwardly from an irregular (jagged) perimeter to a regular (smooth or non-jagged) perimeter, and as shown in FIG. 5, opaquely obscures the win value 162. The expanding flash 164 then commences defining a proximate central passageway 168 open for viewing the partially obscured win value 162. The expanding flash 164 thereby takes on an appearance of a washer (open center and perimeter surface) or a planar view of a torus shape.

Figure 6:
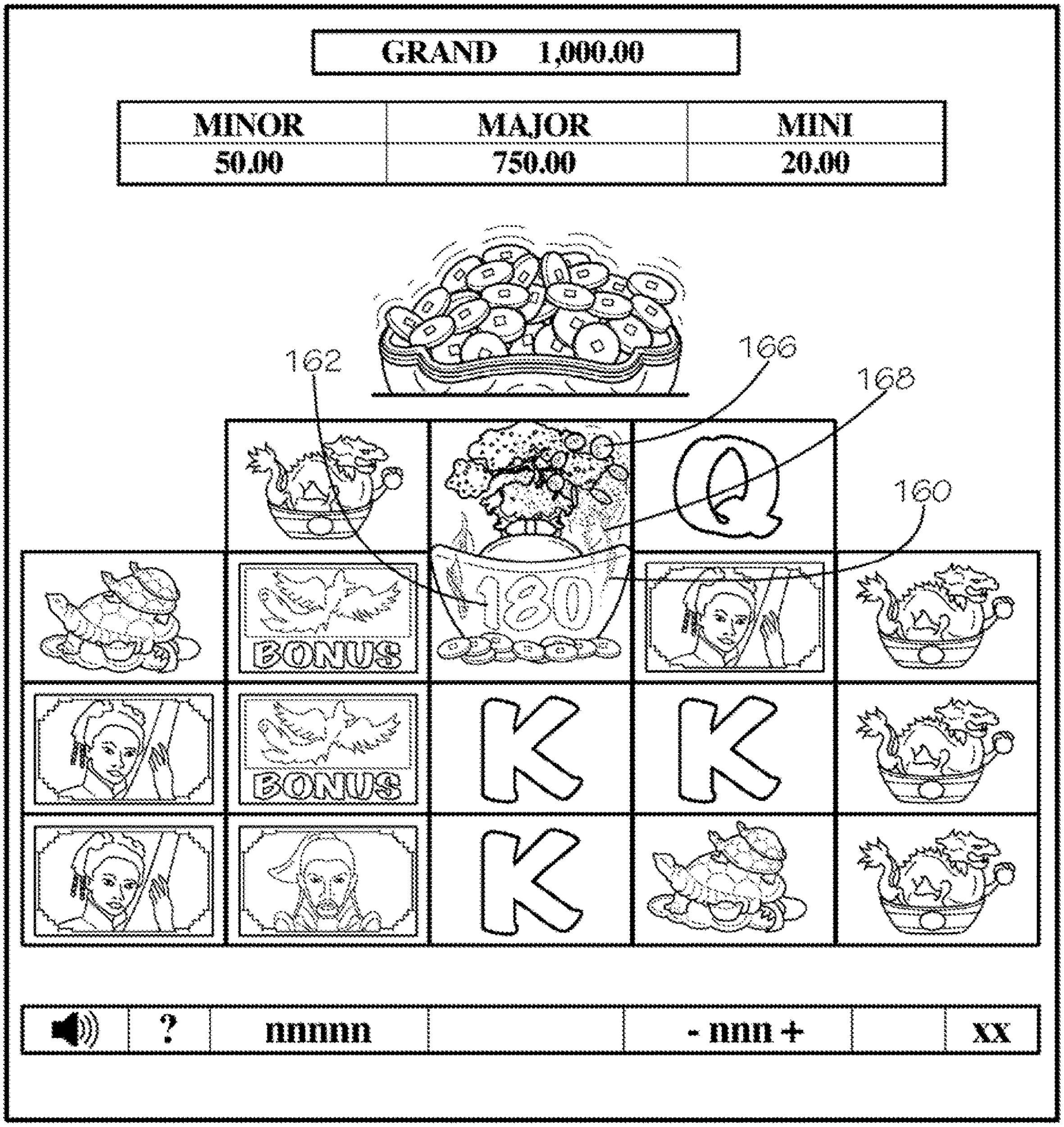

The expanding flash 164 proceeds to dissipate (becomes dimmer) and disappear as shown in FIG. 6. The group of value devices 166 continue to rotate and to move away from the win symbol 160 towards the win accumulator 150. Alternatively, each of the value devices 166 may rotate and move outwardly independently towards the win accumulator 150. The win accumulator 150 is depicted, for example as a container 151 holding a plurality of value-indicative symbols such as a treasure chest or pot 152 holding gold coins and may be placed on a mount, pile, or mountain of the coins. The travel of the group of value devices 166 may be linear directly towards a deposit point into the treasure chest, for example an apex of the graphic of the pile of coins. Alternatively, the travel of the group of the value devices 166 may be arcuate, such as a curved arc from the win symbol 160 laterally and upwardly to the winnings accumulator 150. In an alternate embodiment, the rotating group travels on a first arcuate pathway and then on a second arcuate pathway for reaching the winnings accumulator 150. As the group moves towards the winnings accumulator 150, the win value 162 is visible. At the deposit point the coins deposit or place into the container, the mountain of value symbols, or both, and the mounded winnings symbols may spill outwardly of the winnings accumulator 150.

Figure 7:
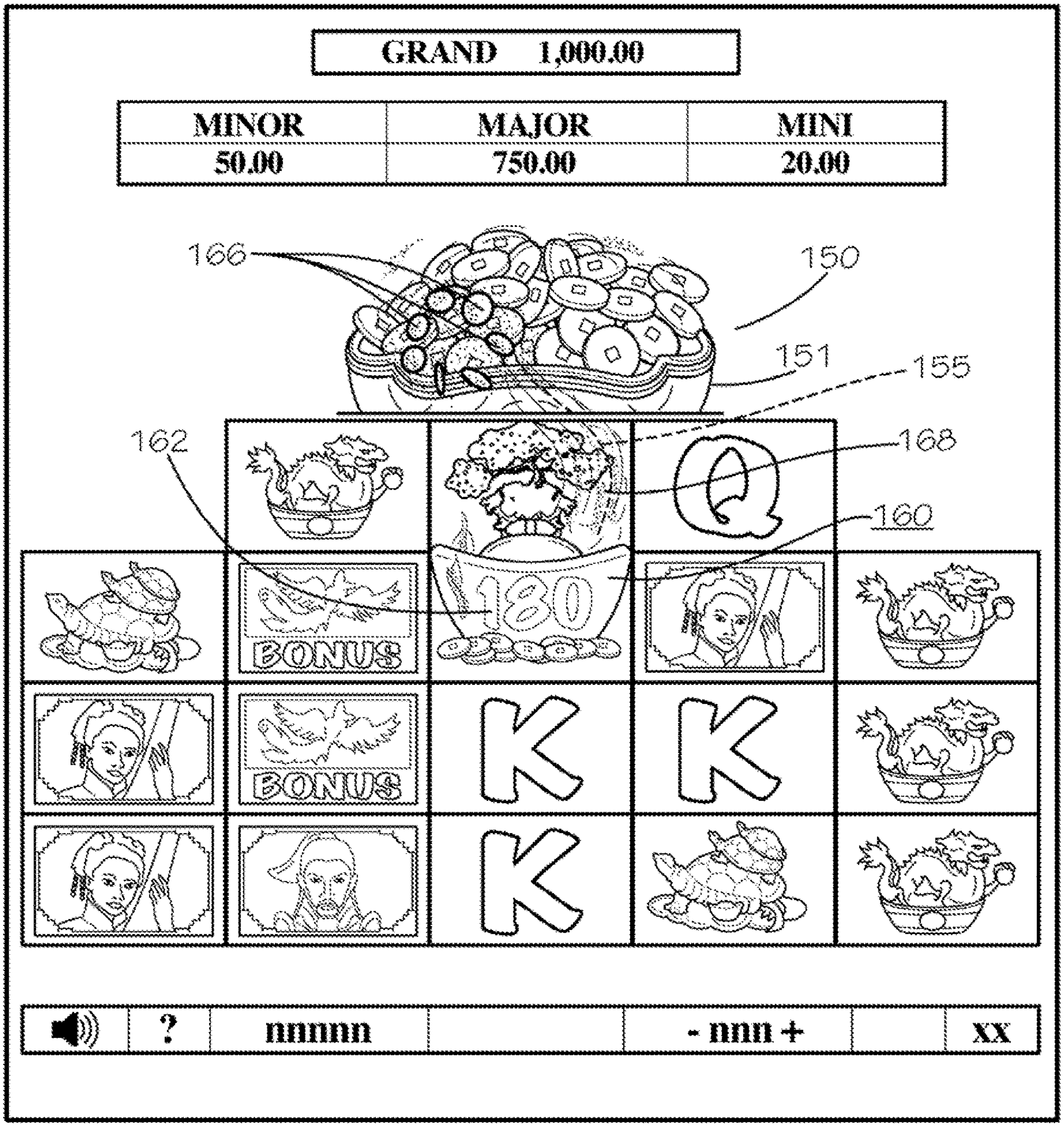

As shown in FIG. 7, the moving group of value devices 166 may include a motion indicating graphic such as a trailing tail 168. The tail 168 may be a translucent extending gaseous-simulating type-tail with varying translucency from low to high proximate the group to a distal end. The tail proximate the group of value devices is thereby more opaque than towards the distal end. The group of value devices 166 flow or move upwardly to and across the winnings accumulator 150 for depositing into the accumulator.

The movement pathway in the illustrated embodiment is arcuate as indicated by dashed line 155. The movement pathway in an alternate embodiment may be linear.

Figure 8:
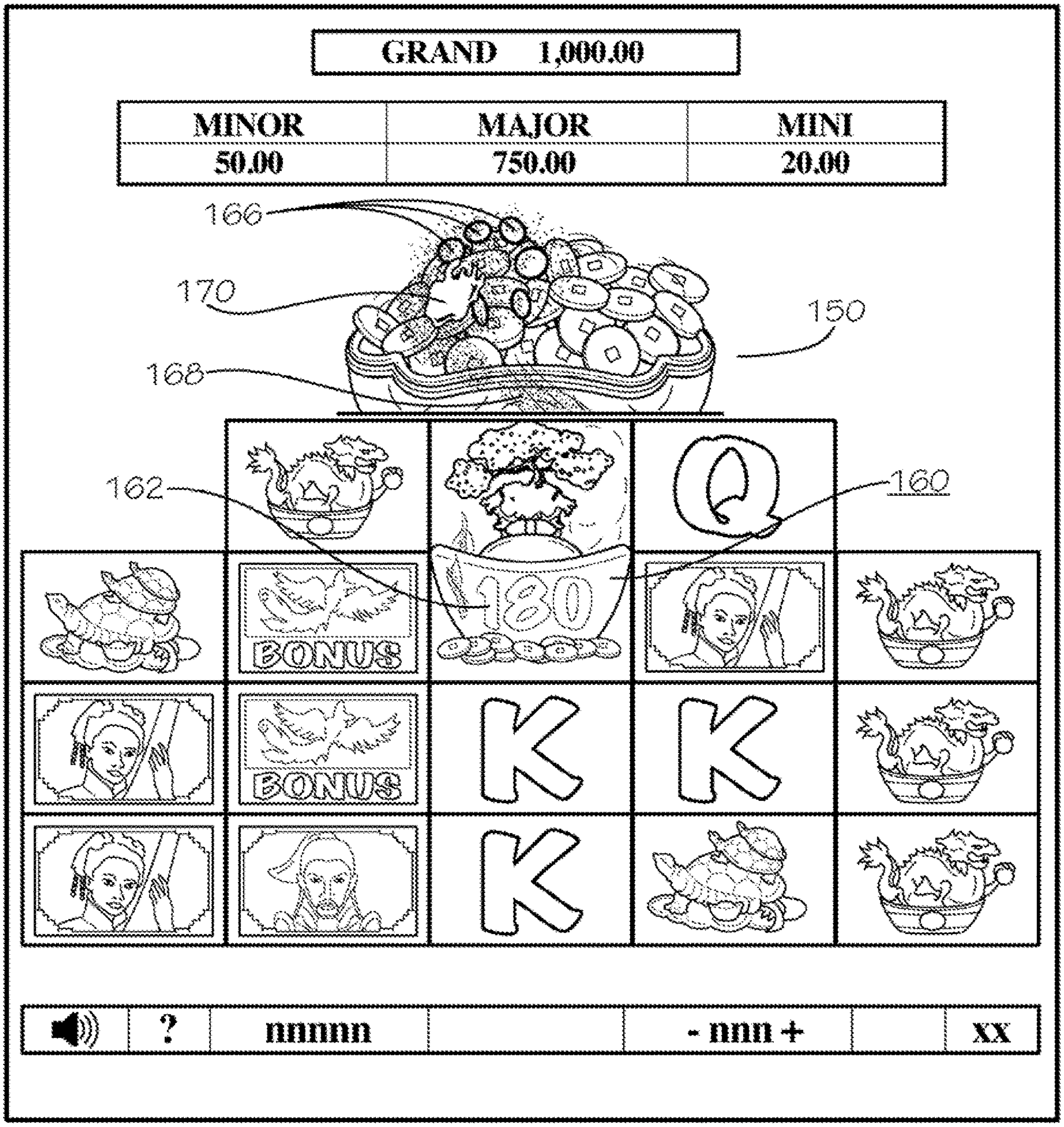
Figure 9:
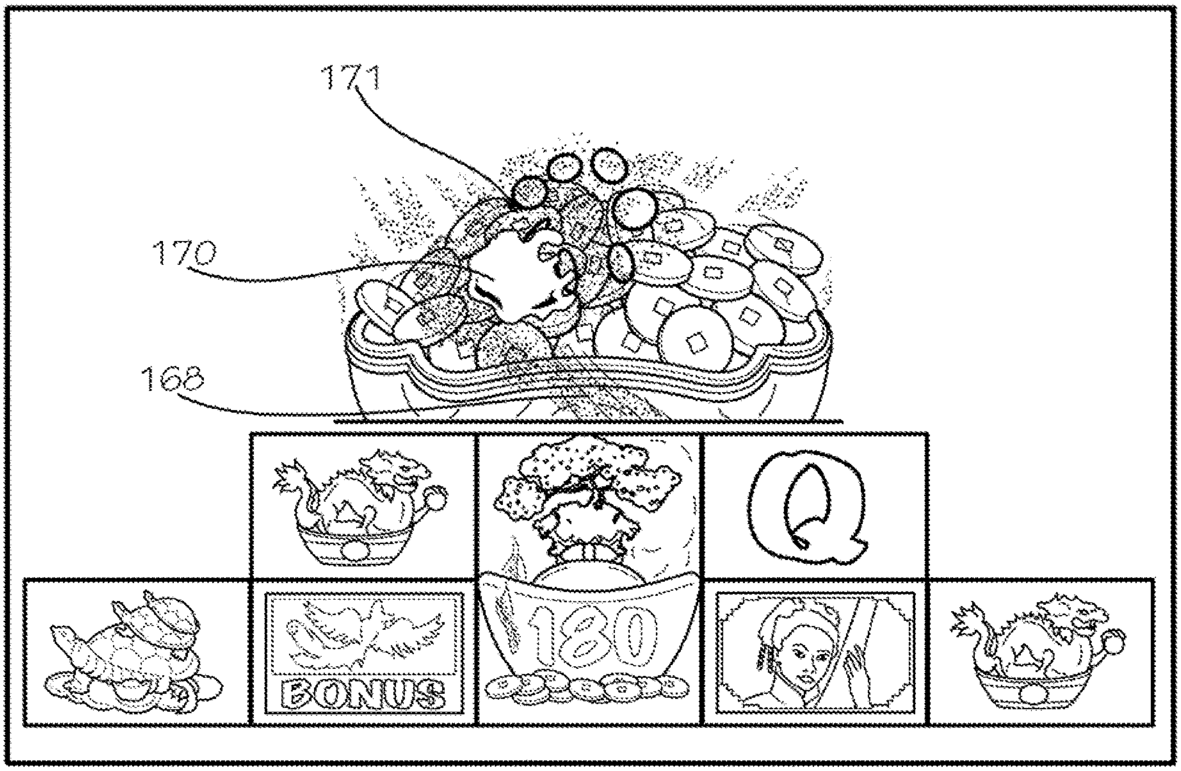
Figure 10:
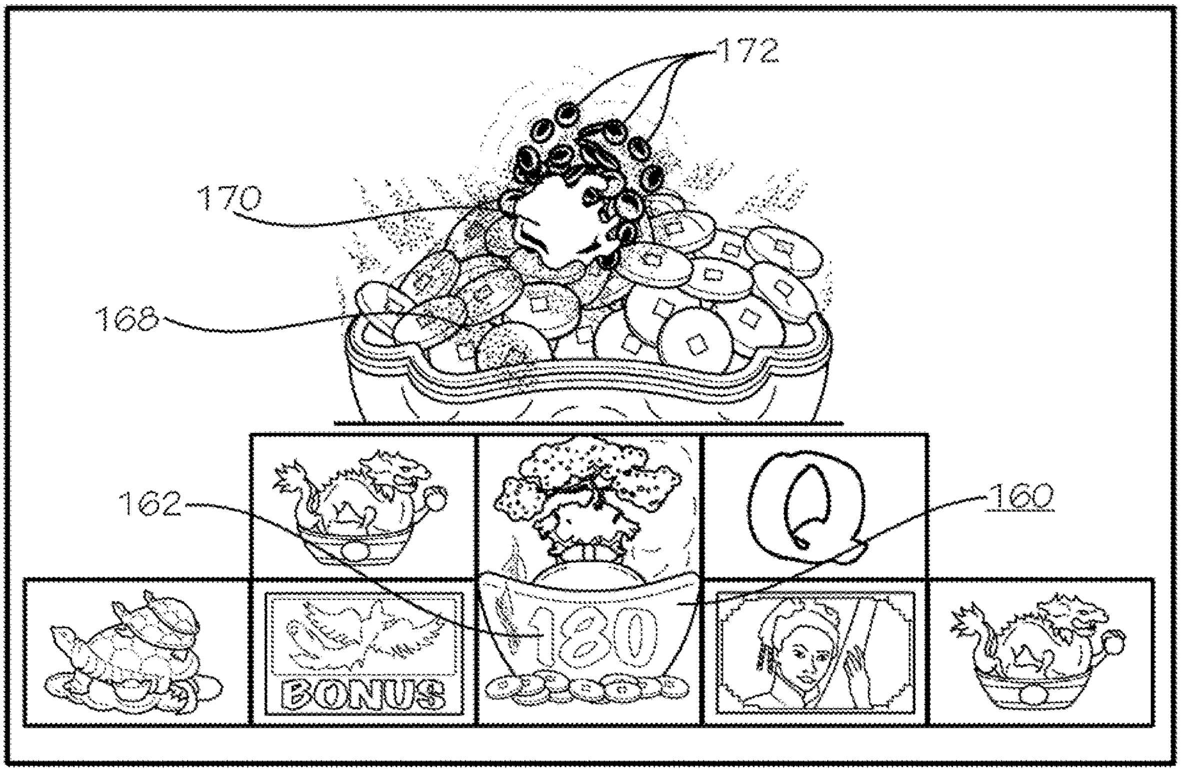
Figure 11:
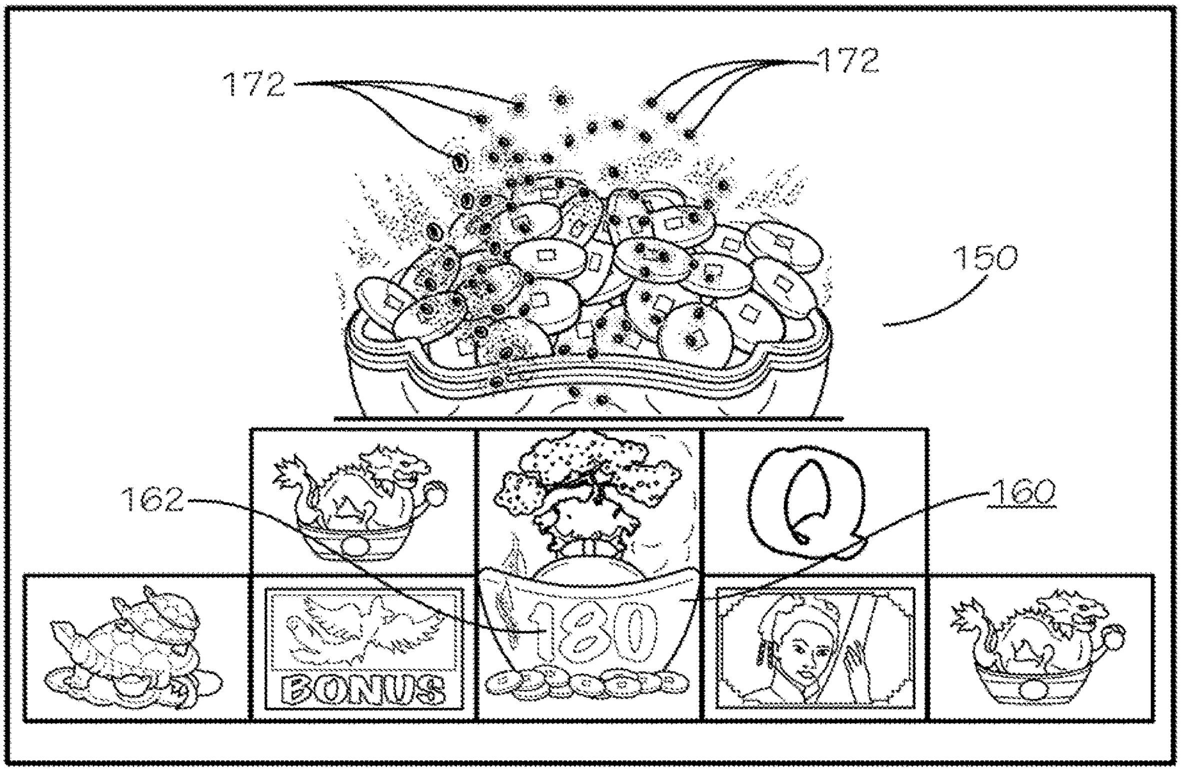
Figure 12:
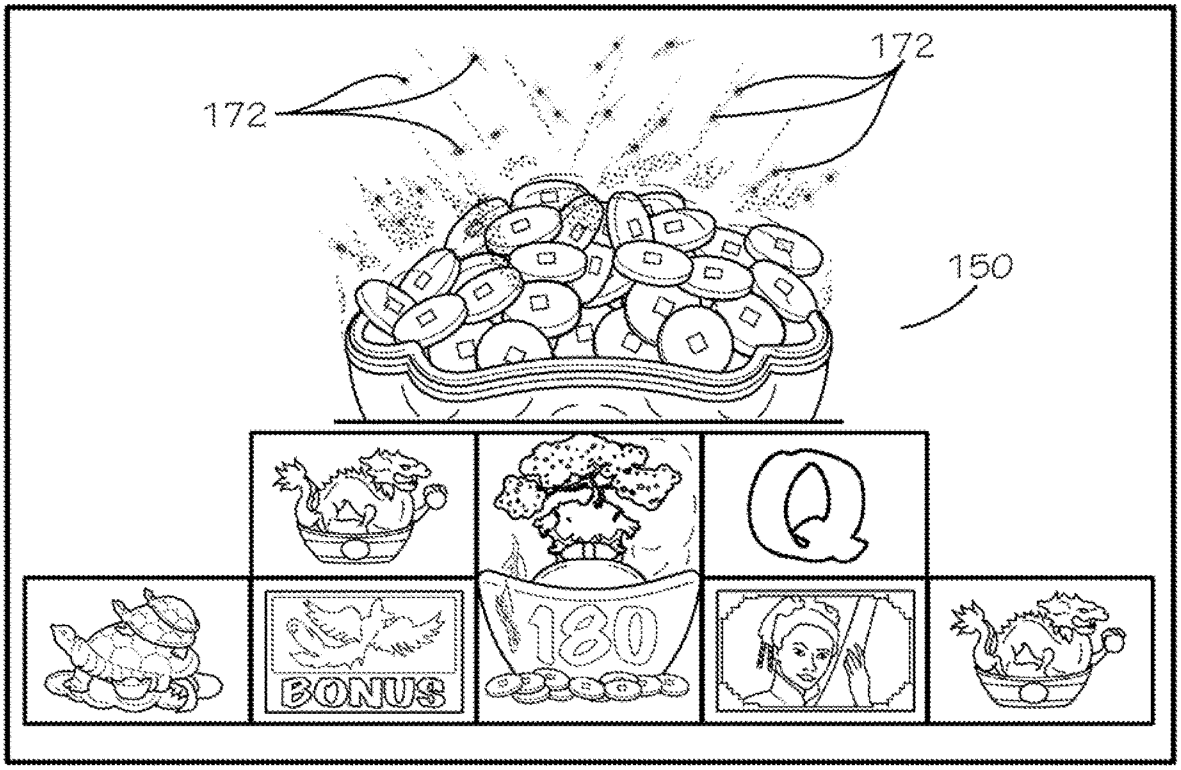

The tail 168 slightly separates from the group of value devices 166, and a new bright flash 170 occurs as shown in FIG. 8. The flash 170 depicts a burst of light. The burst illumines at an initial point and becomes brighter (and shown larger on the screen) and then dimming. Continuing to FIG. 9, the flash 170 lights the proximate upper portion generally 171 of the winnings accumulator 150. The value devices 166 may reflect the increasing light from the flash 170. The flash 170 further expands outwardly and as shown in FIG. 10, separates into a plurality of irregular members 172. The members 172 separately coalesce in spaced-relation from respective portions of the expanding light field, and as shown in FIG. 11, each move outwardly from the winnings accumulator. Continuing movement, the separate members 172 move outwardly as shown in FIG. 12, and fadingly become dimmer until expiring, as if moving further away from the winnings accumulator 150.

The game is then ready for a subsequent play by operation of the input device 92.

The present invention provides an apparatus of win symbol display during game play, including a win symbol, a win value overlaid on the win symbol, a flash or alerting indicator to bring attention of the player to the win symbol, which flash translucently overlies the win symbol, which flash expands radially, which flash reduces in translucency for increasing opaque covering of the win value and win symbol, and in some embodiments may include one or more value devices representative of the win value. The win value may be in terms of points, free spins, prize tokens, redemption values, or monetary equivalents. The value devices translate movingly from the win symbol to the winnings accumulator. In some embodiments, the value devices move individually in spaced-relation, while in other embodiments the value devices spaced-apart but define a group that moves to the winnings accumulator. The group may in some embodiments rotate while the group as a whole moves towards the winnings accumulator. In one aspect, the rotation may be continuous, intermittent, or periodic. The line of movement may be linear or arcuate, or combinations. The movement of the value devices creates a trailing tail extending therefrom. Upon arrival at the winnings accumulator, the tail separates, provides a flash, and the flash increases in field area before separate irregular members coalesce from the field area which members continue moving outwardly and decreasing in visible displayed intensity from a first brightness to a disappearance or expiration of brightness second brightness from the display. The win value adds to an accumulator total which may be displayed as a total, or alternatively, the accumulator total may increment sequentially as a counter or odometer increasing from a current accumulator total to a resultant accumulator total by adding incrementally the win value.

Figure 13:
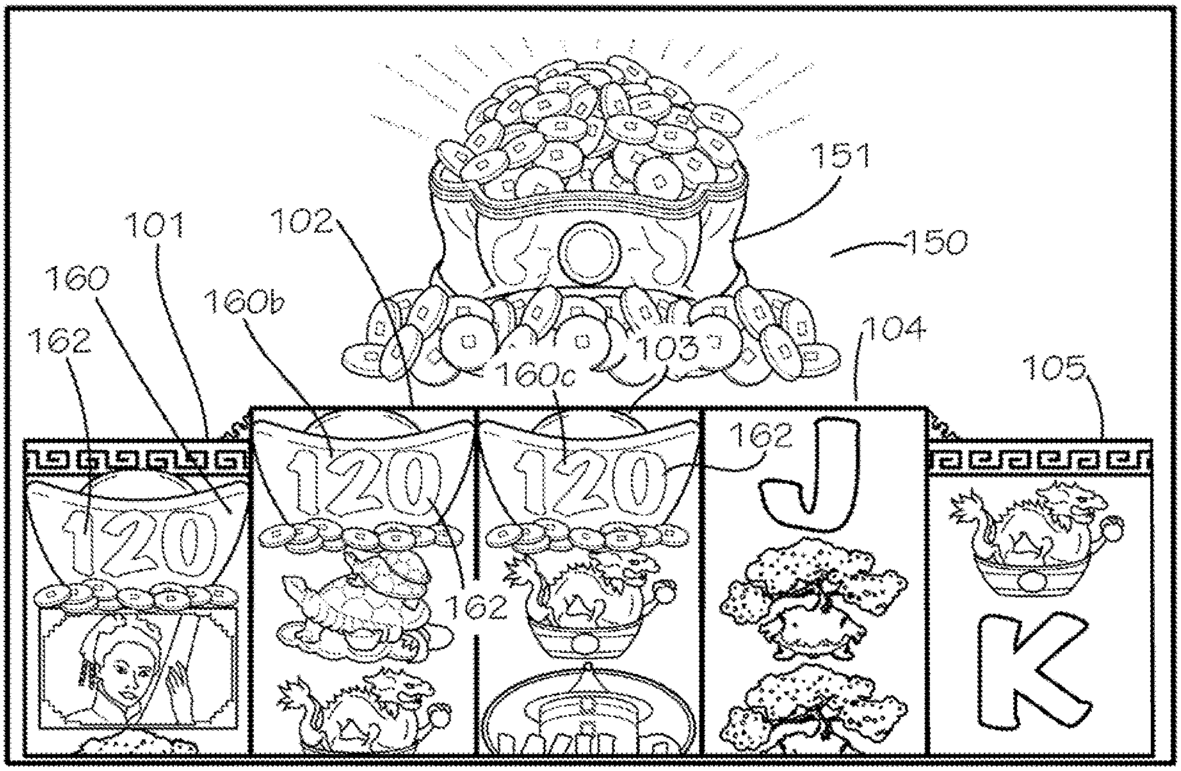
FIGS. 13-83 illustrate a second illustrative embodiment of a game machine with the improved special feature apparatus and method for characterized mechanical display of the win symbol during game play.
Figure 14:
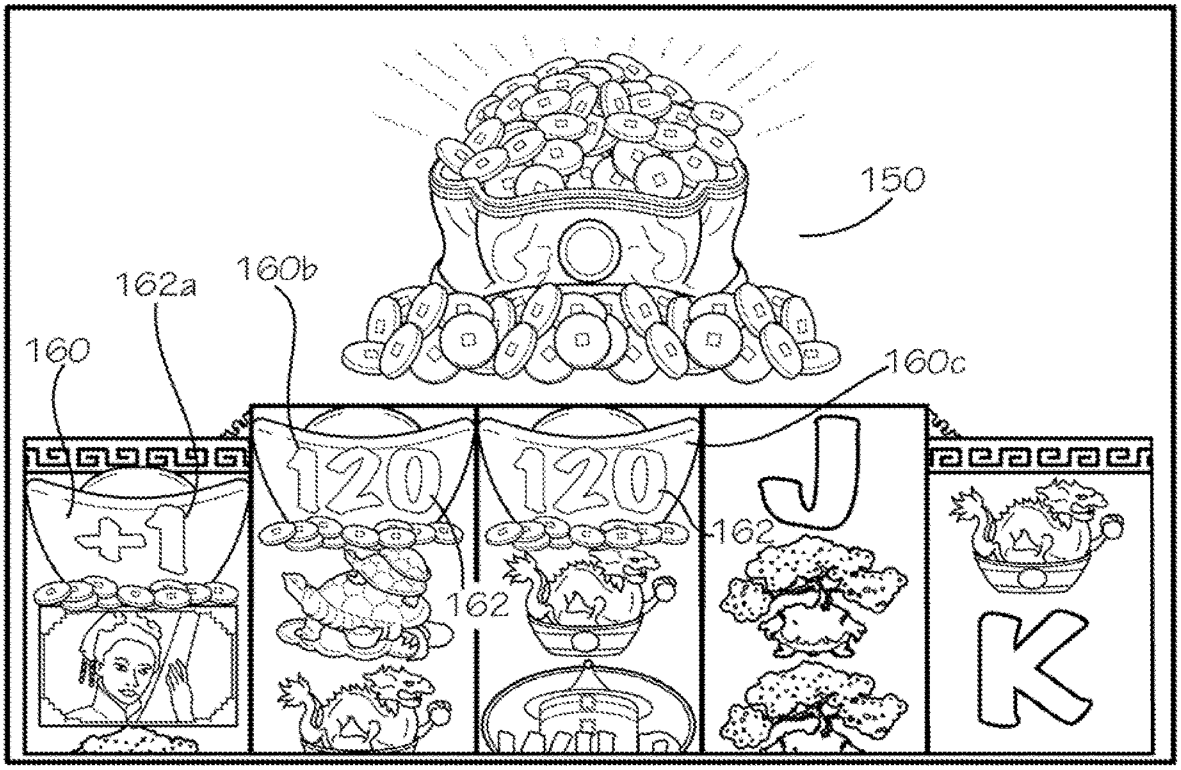
Figure 83:
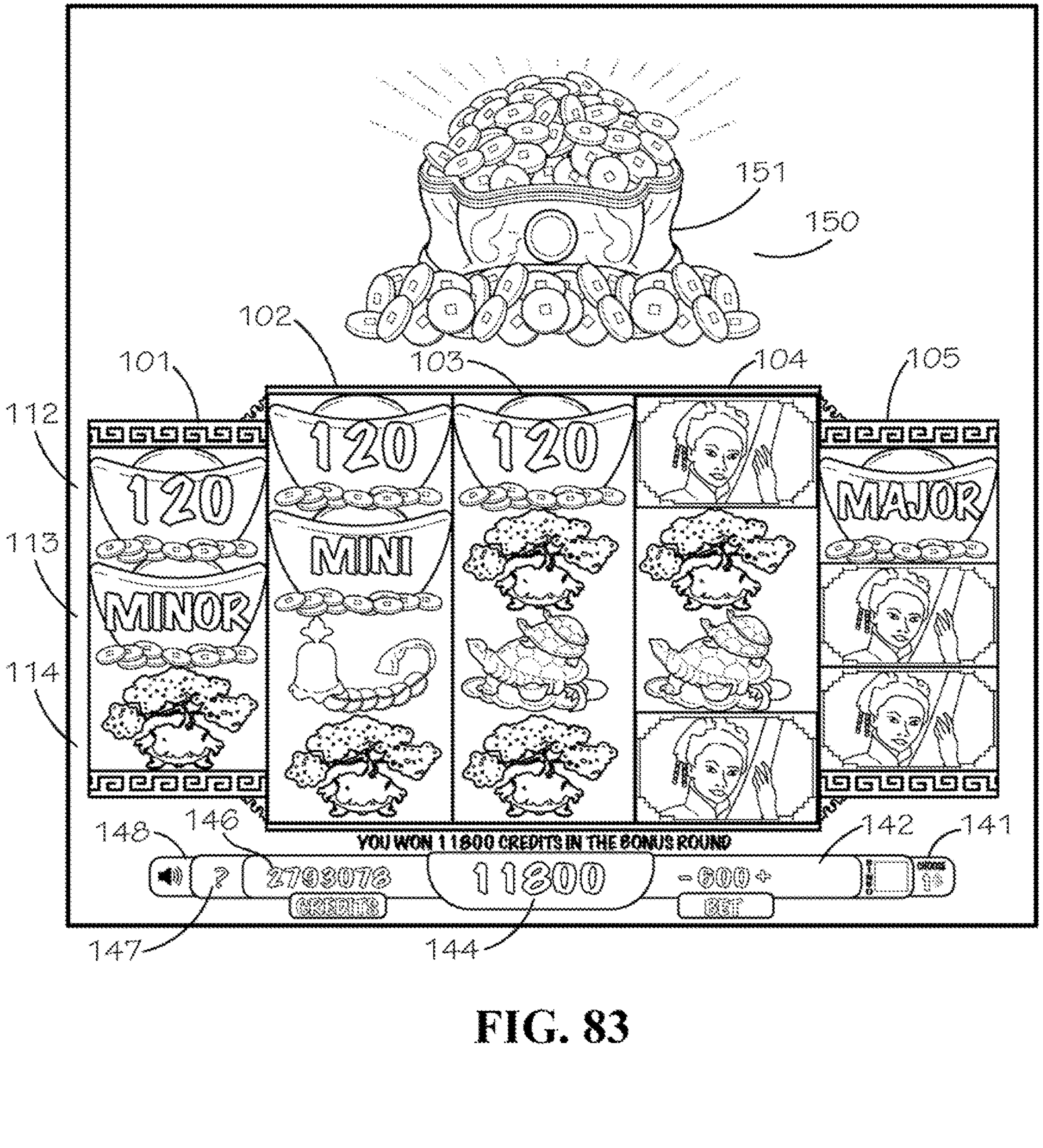

FIGS. 13-83 illustrate a second illustrative embodiment of a game machine with the improved special win alerting feature apparatus and method for characterized mechanical display of the win symbol during various aspects of game play. The game machine is illustrated in detail view of the reels 101-105 and symbol positions 121 of the matrix 110 and a winnings accumulator but such are readily applied for the game display such as shown in FIG. 2. During play of the game one or more win symbols 160 may be displayed. By way of illustration of an exemplary embodiment but not limitation, FIG. 13 illustrates three win symbols 160*a*, 160*b*, and 160*c*, each on a separate one of the reels 101-103. More than one win symbol 160 may be shown for each reel 101-105 in the matrix 110. That is, a respective reel may have more than one randomly placed win symbol 160. In the illustrated embodiment, the win symbols 160 further include a display simultaneously, near simultaneously, or within a predetermined period, of the win value 162 overlying the win symbol. The win value 162 may change as shown in the embodiment in FIG. 14 from a first type of win value 162 to a second type 162*a* of win value. The different types of win values 162 include points, time, or a measurable value including monetary value, free spins provided to a player, bonuses of plays, or a value item. In the illustrated embodiment, the second type 162*a* of win value is a number indicating additional free spins provided to the player.

Figure 15:
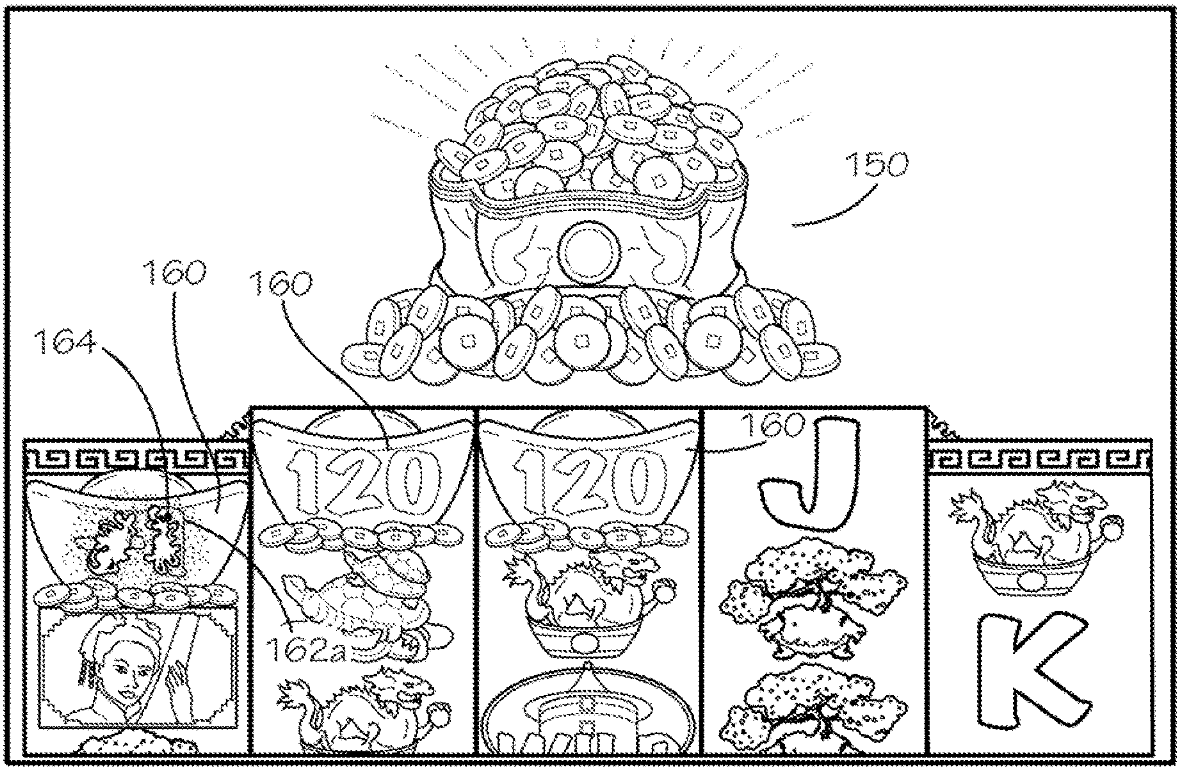
Figure 16:
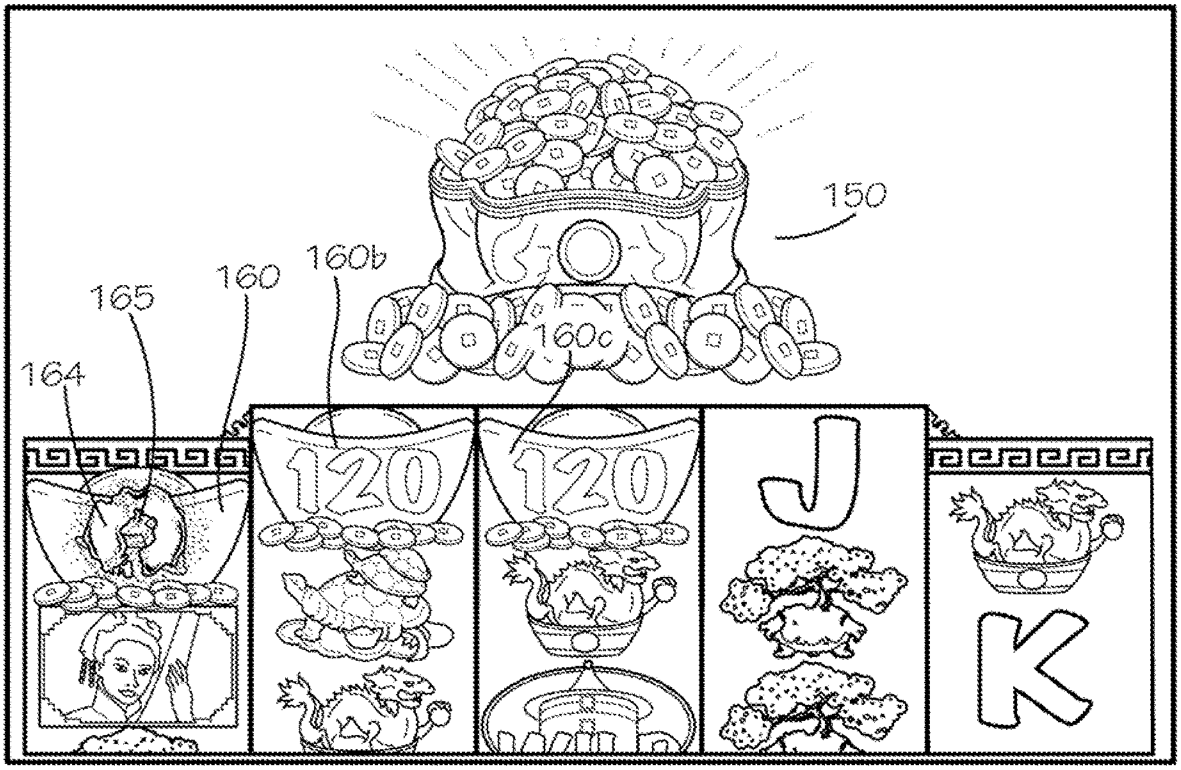
Figure 17:
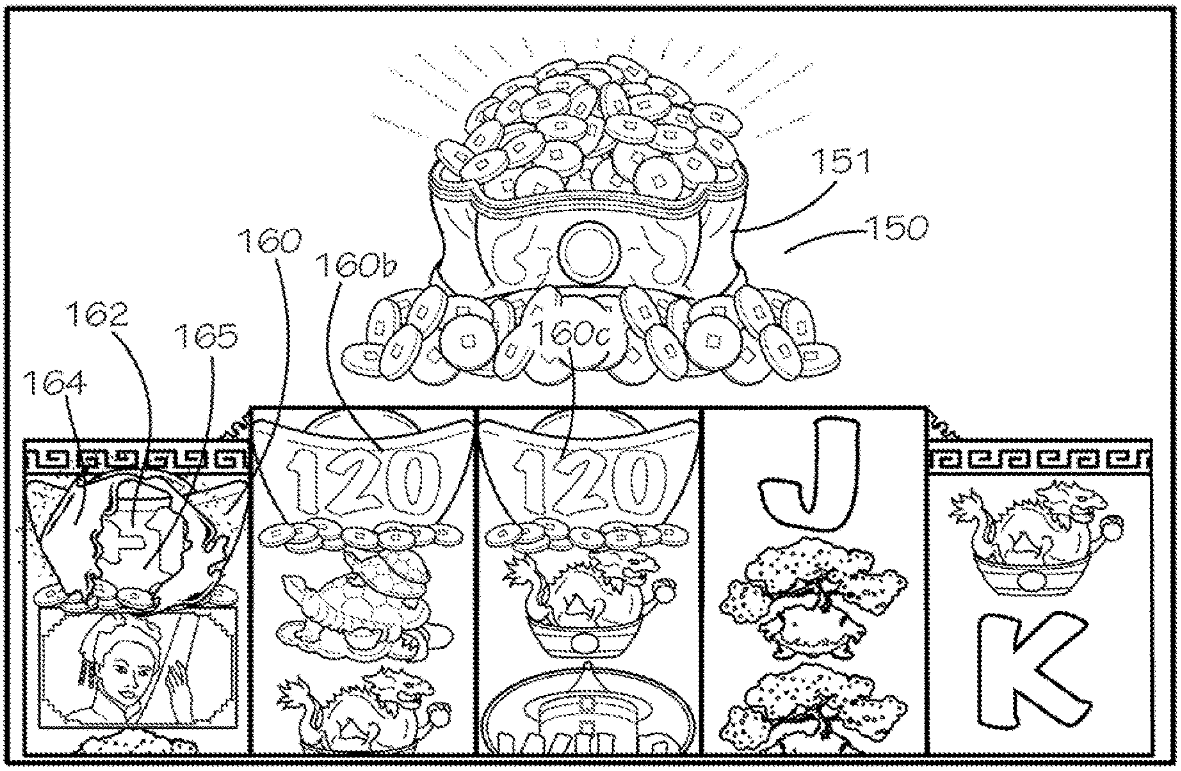
Figure 18:
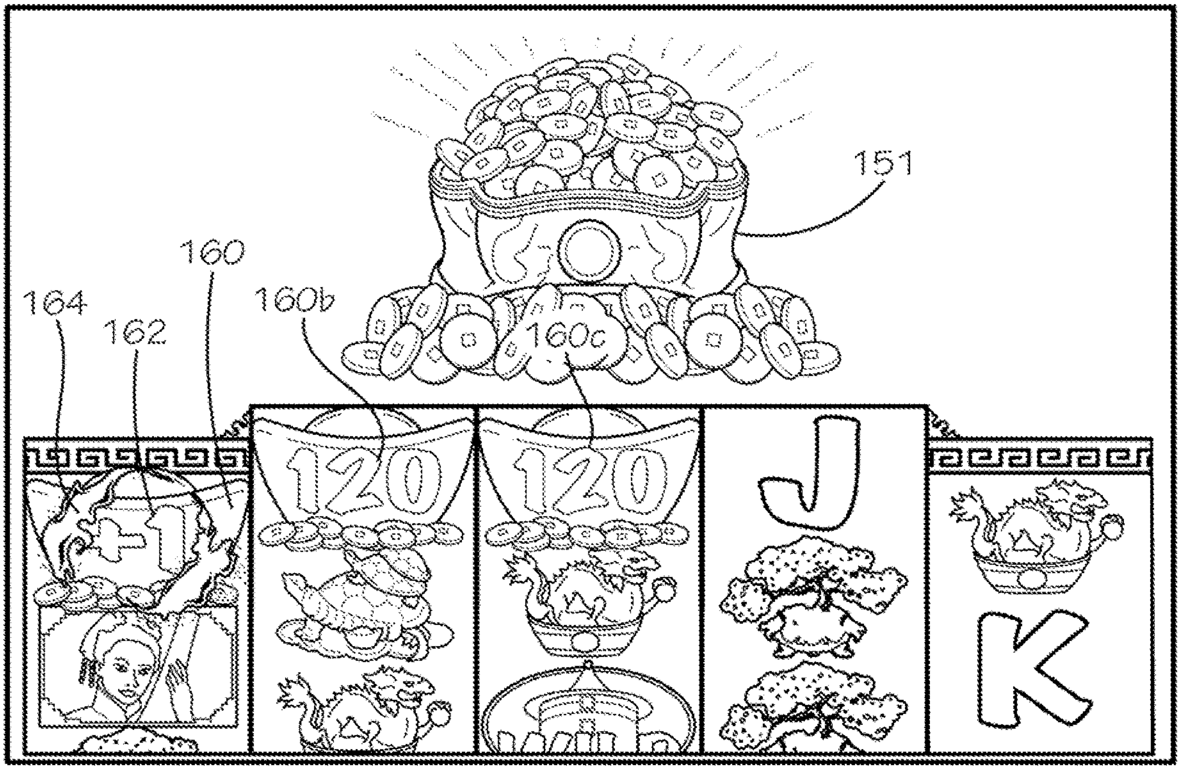
Figure 19:
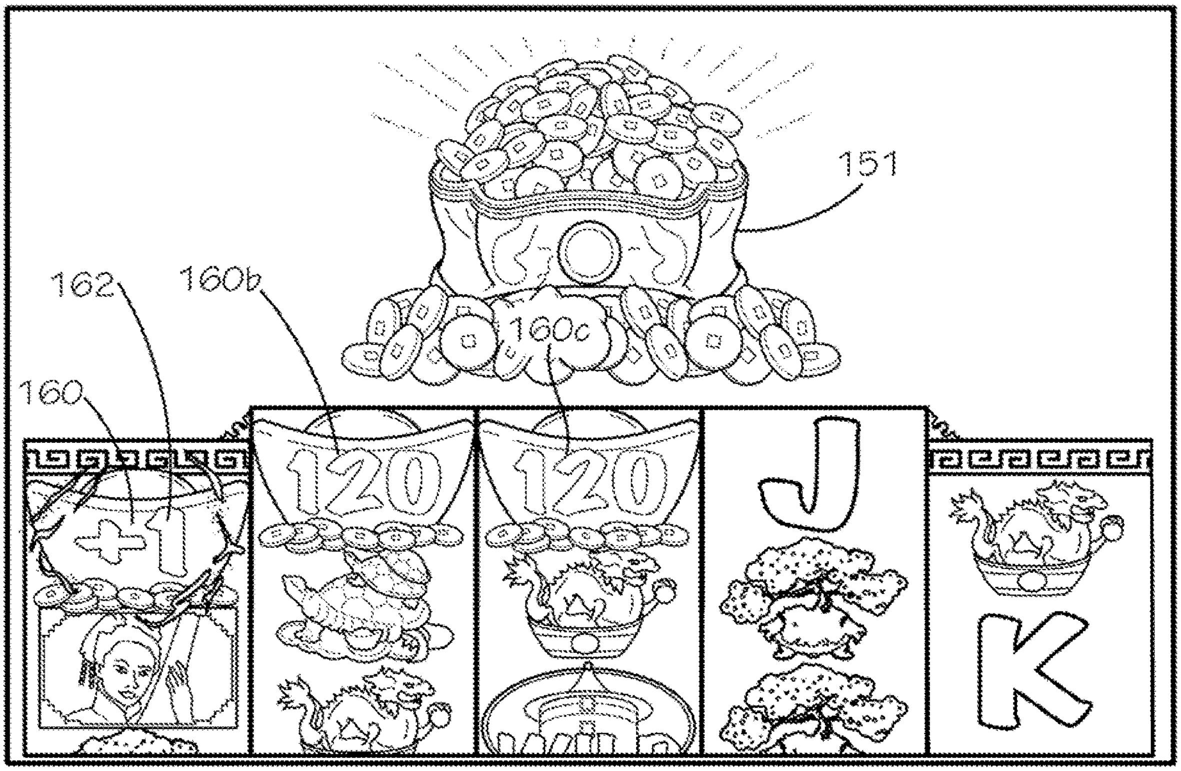
Figure 20:
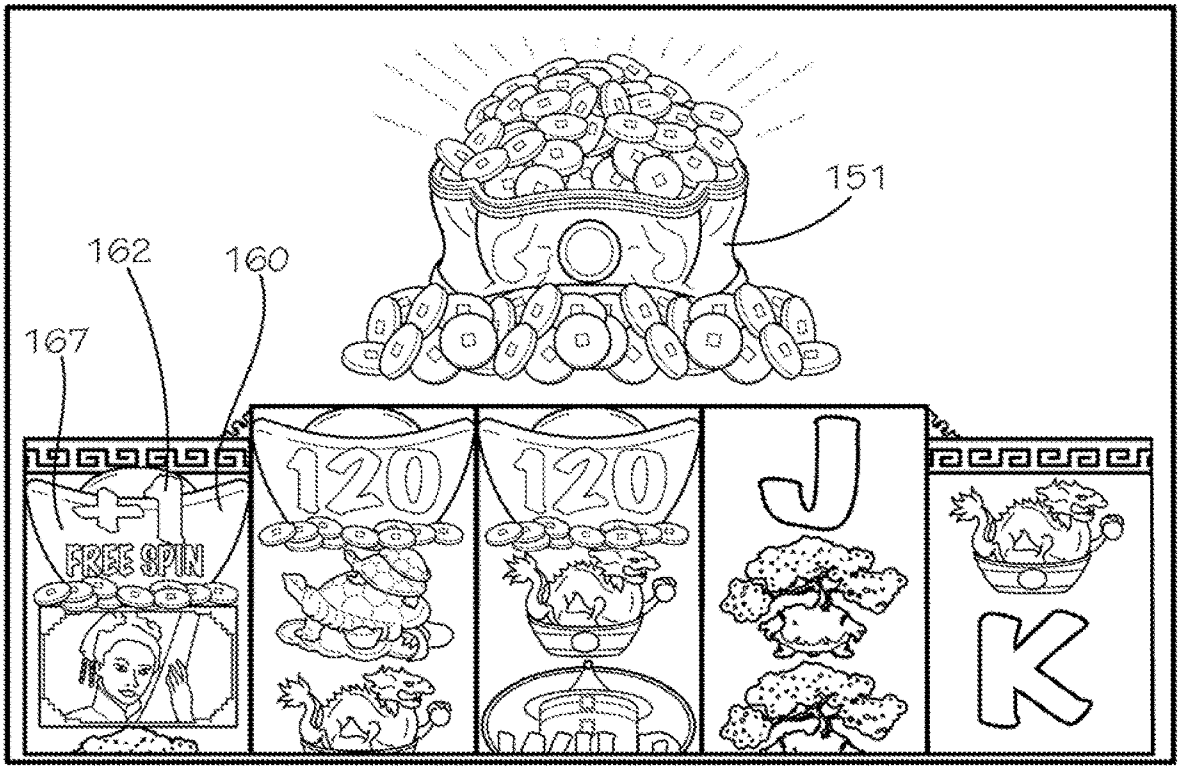

As shown in FIG. 15, the flash 164 illuminates proximate and overlying at least a portion of the displayed win value 162. In accordance with the disclosed special feature apparatus, the flash 164 increases in field area and may increase in opaqueness to hide the win value and win symbol, as shown in FIG. 16. The central passageway 165 forms as the flash field increasingly moves outwardly across the win symbol, which central passageway provides an opening for viewing of the win value overlying the win symbol as shown in FIG. 17. The flash disappears or vaporizes to again reveal the win symbol 160 and the win value 162, as shown in FIG. 18. In reference to FIGS. 19 and 20, the win value 162 may move for display of a value type designator 167, which in the illustrated embodiment recites "free spin" to indicate the player has achieved a free play of the game with opportunity for additional win value and/or additional free spins as may occur randomly during the action play of the game machine.

Figure 21:
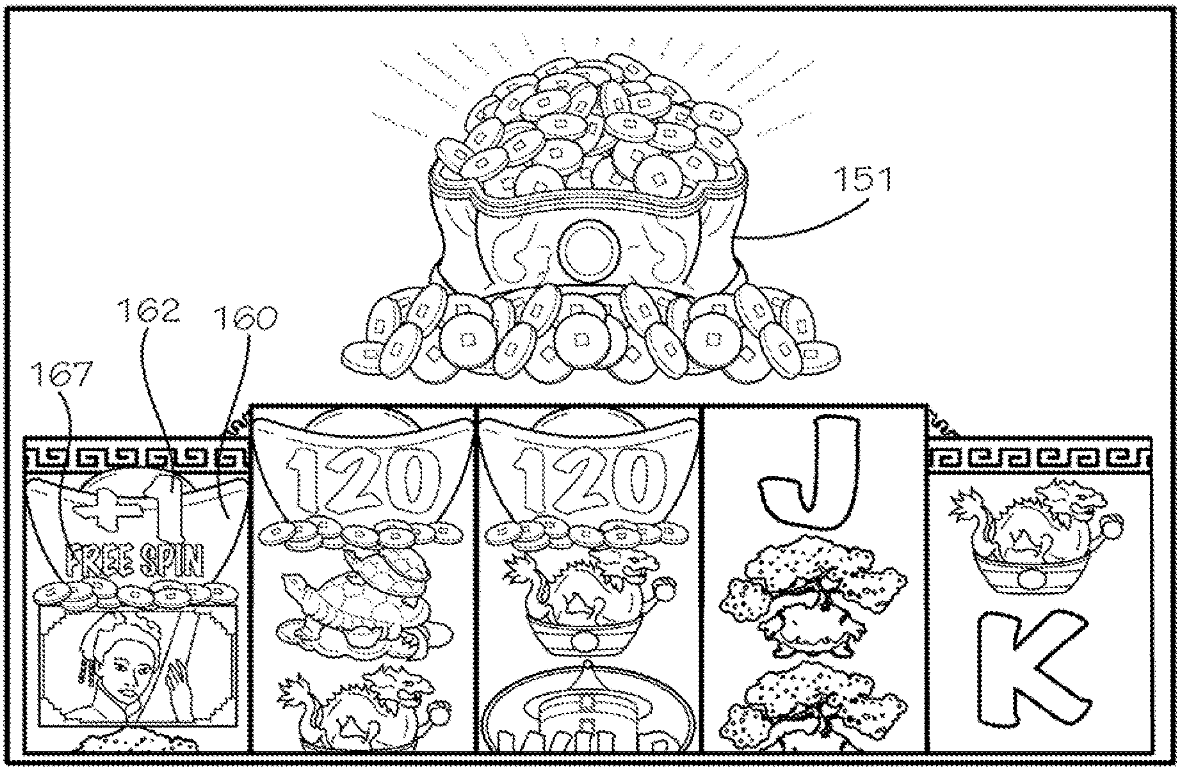
Figure 22:
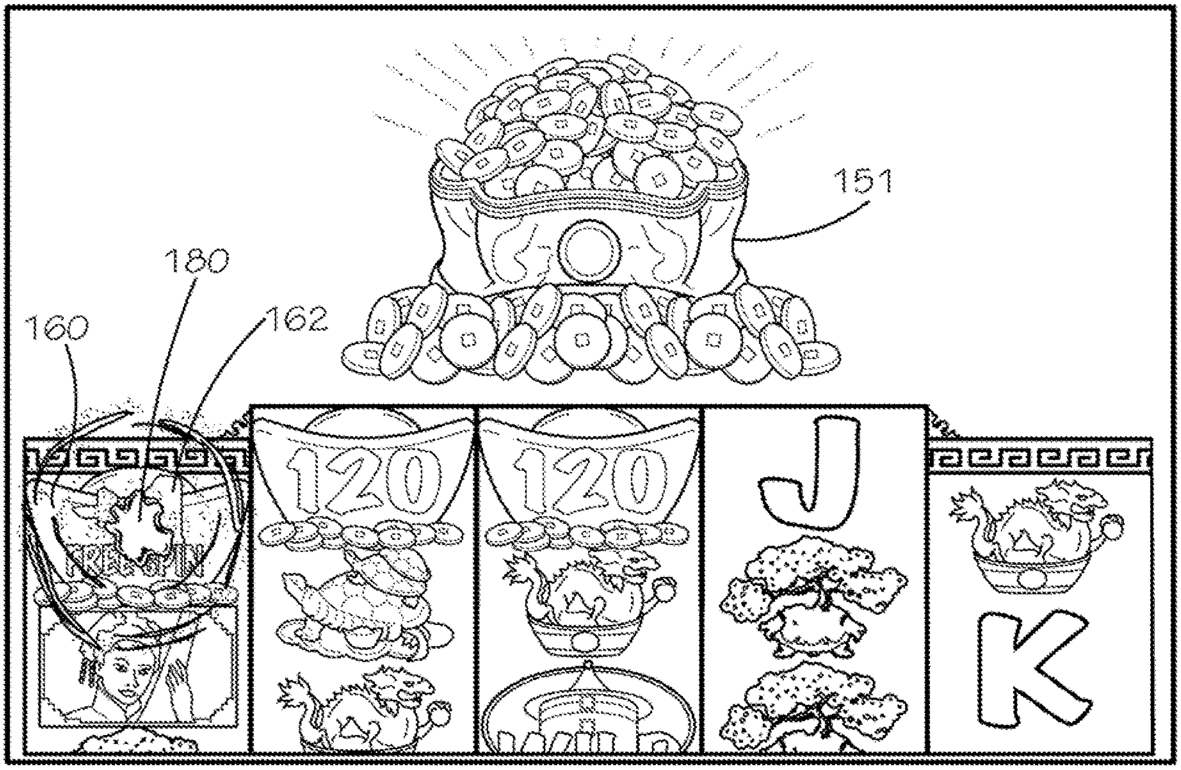
Figure 23:
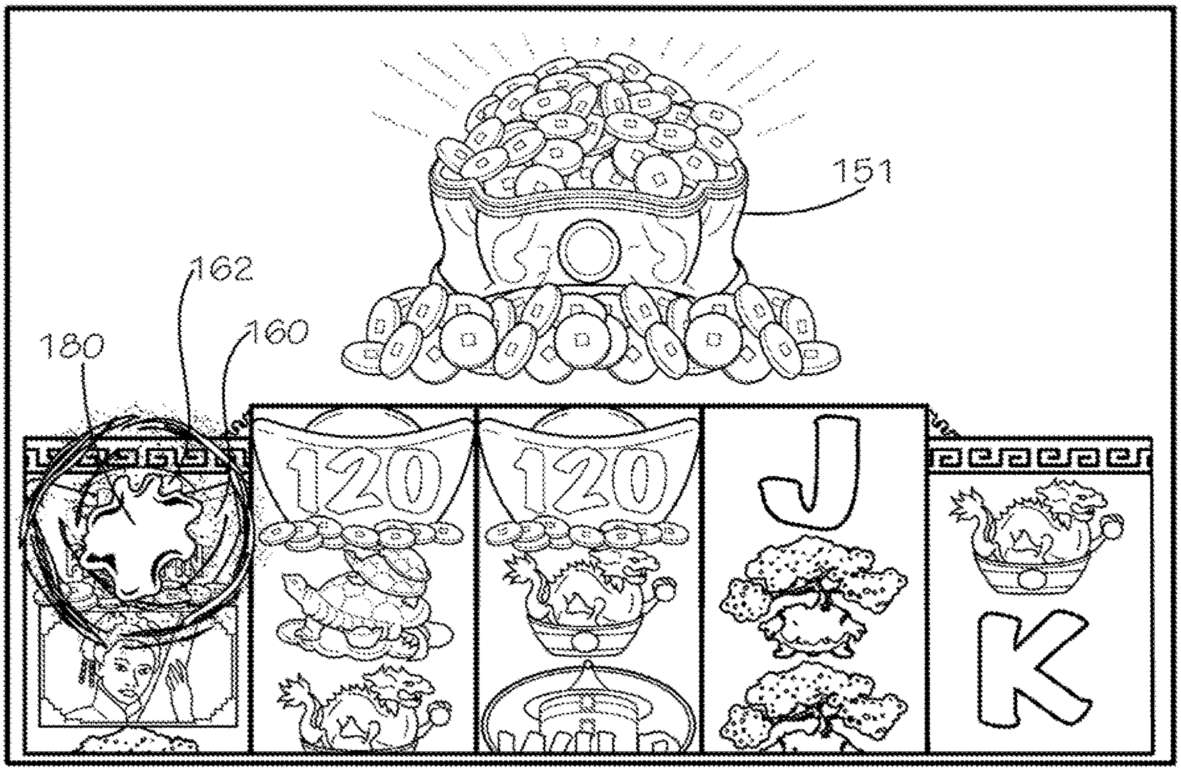
Figure 24:
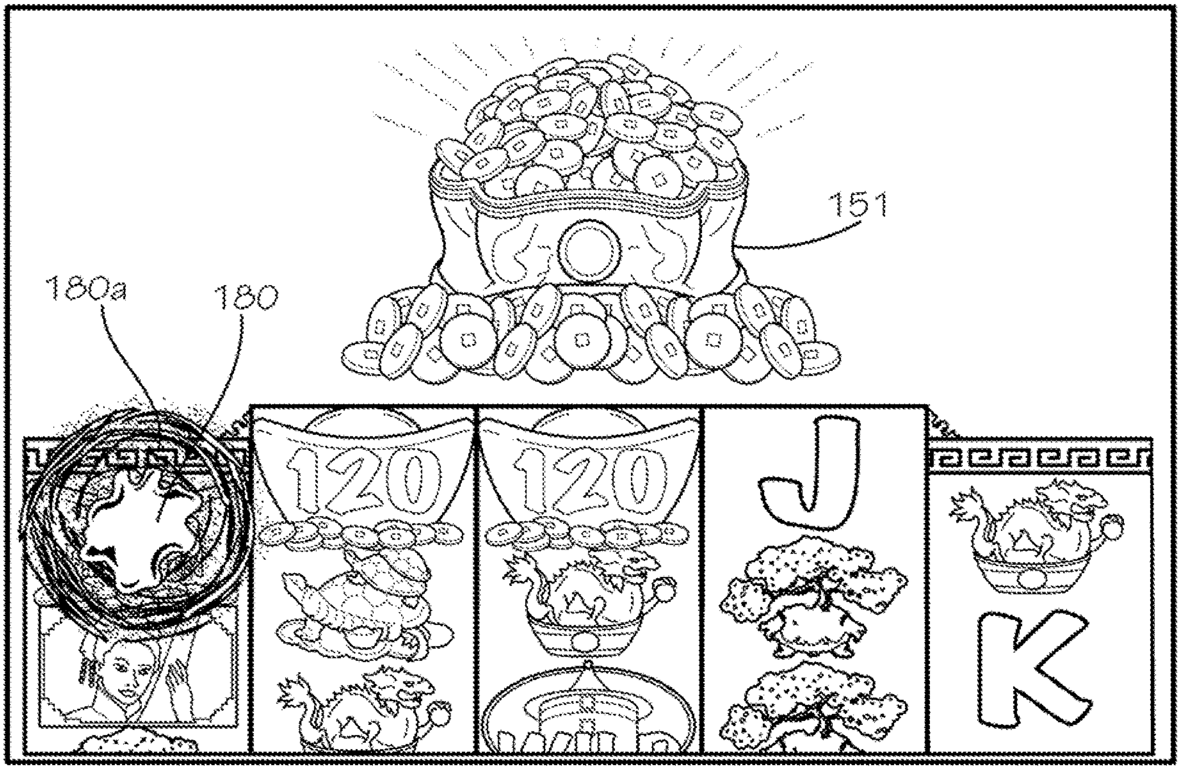
Figure 25:
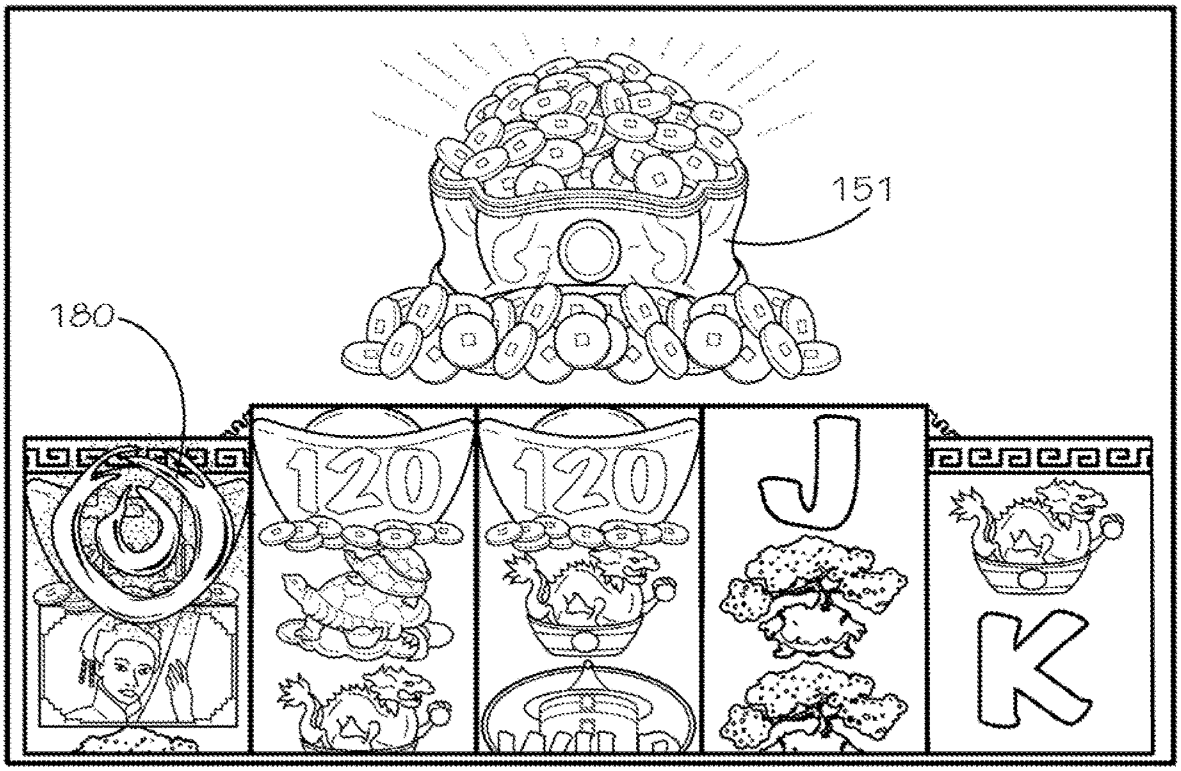
Figure 26:
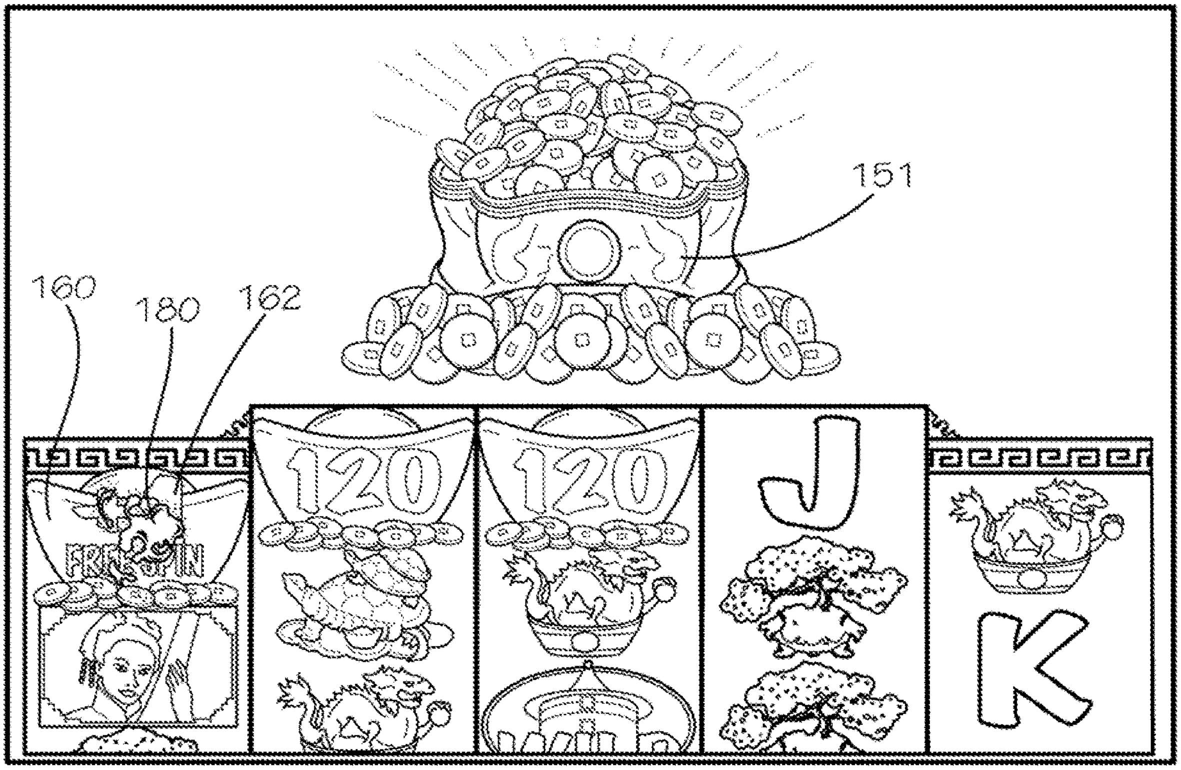
Figure 27:
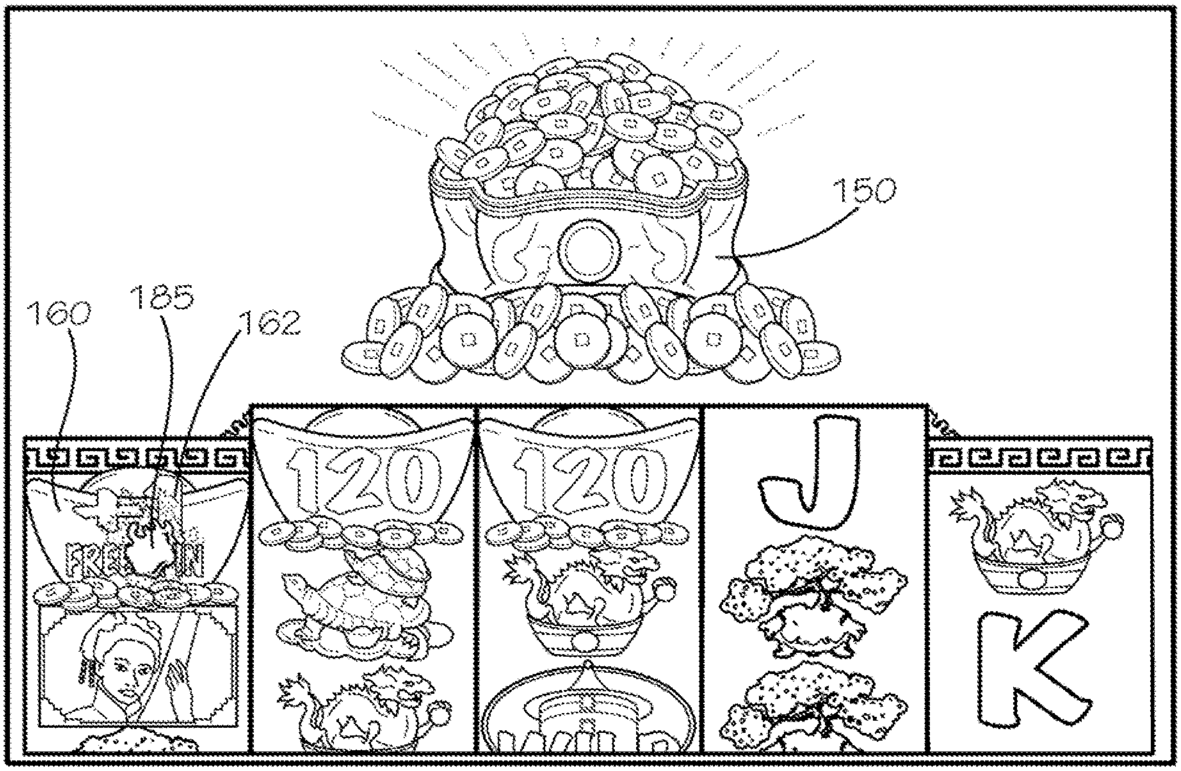
Figure 28:
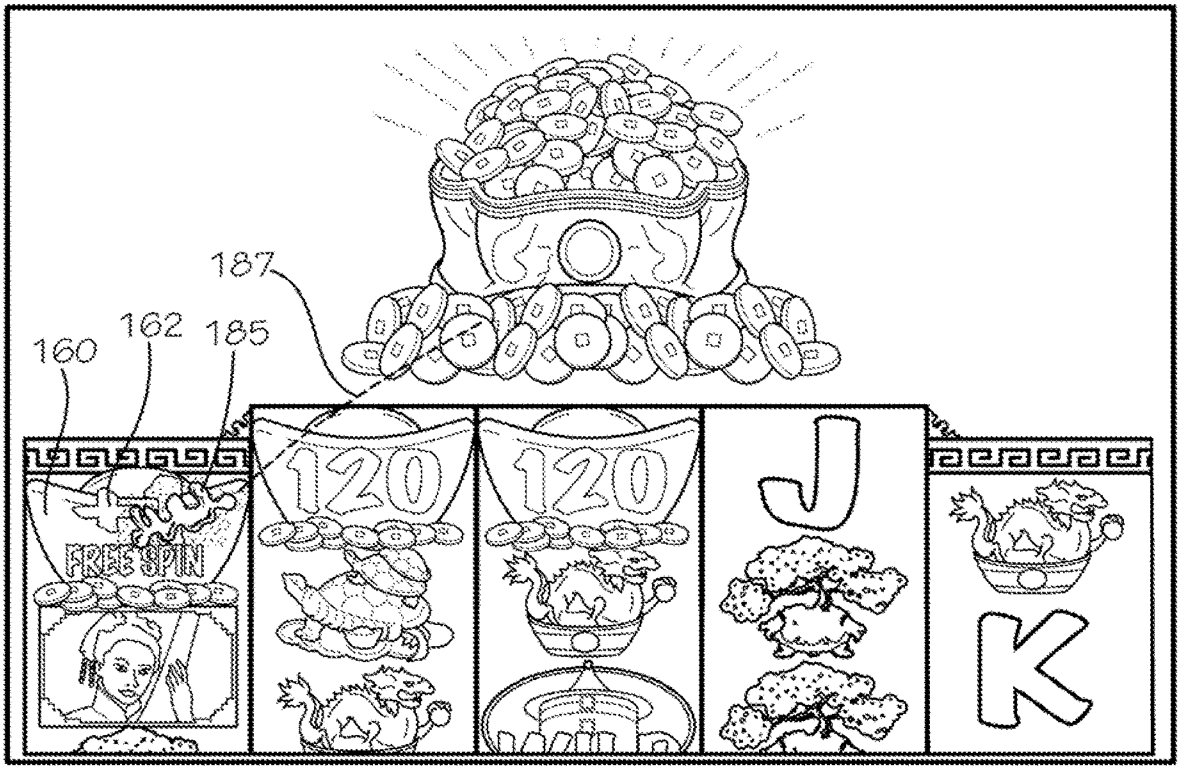
Figure 29:
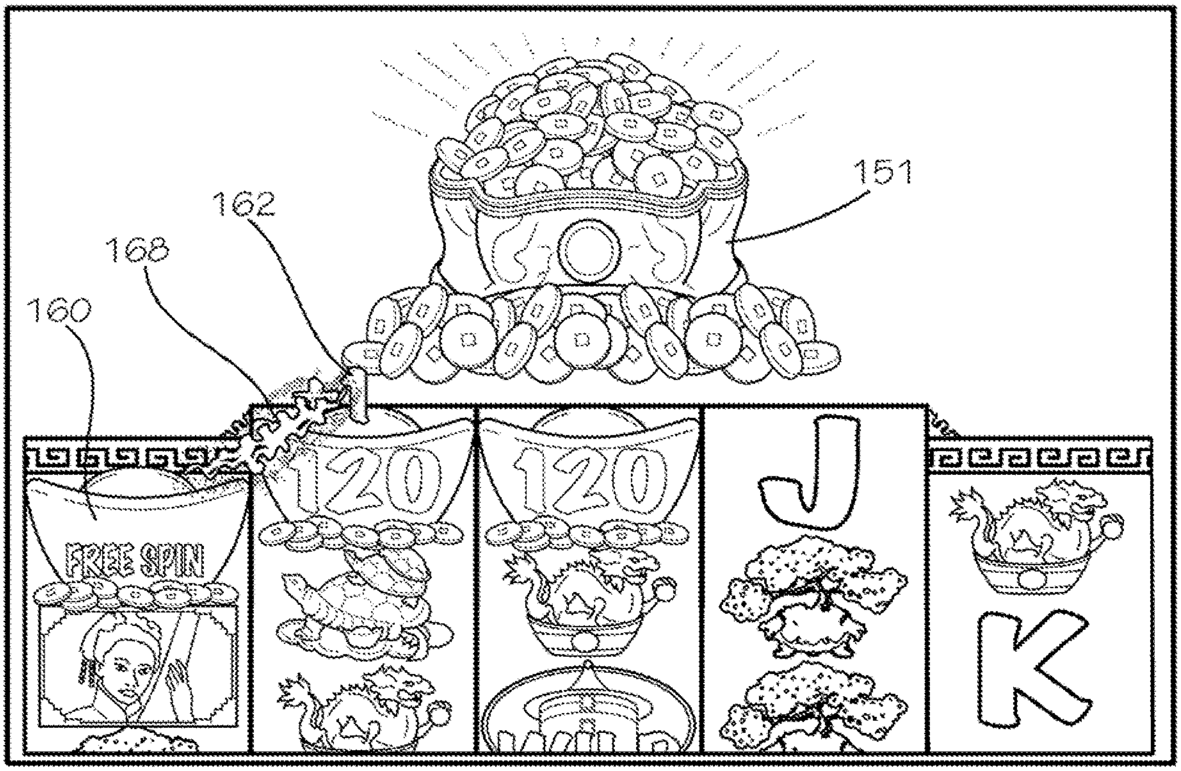
Figure 30:
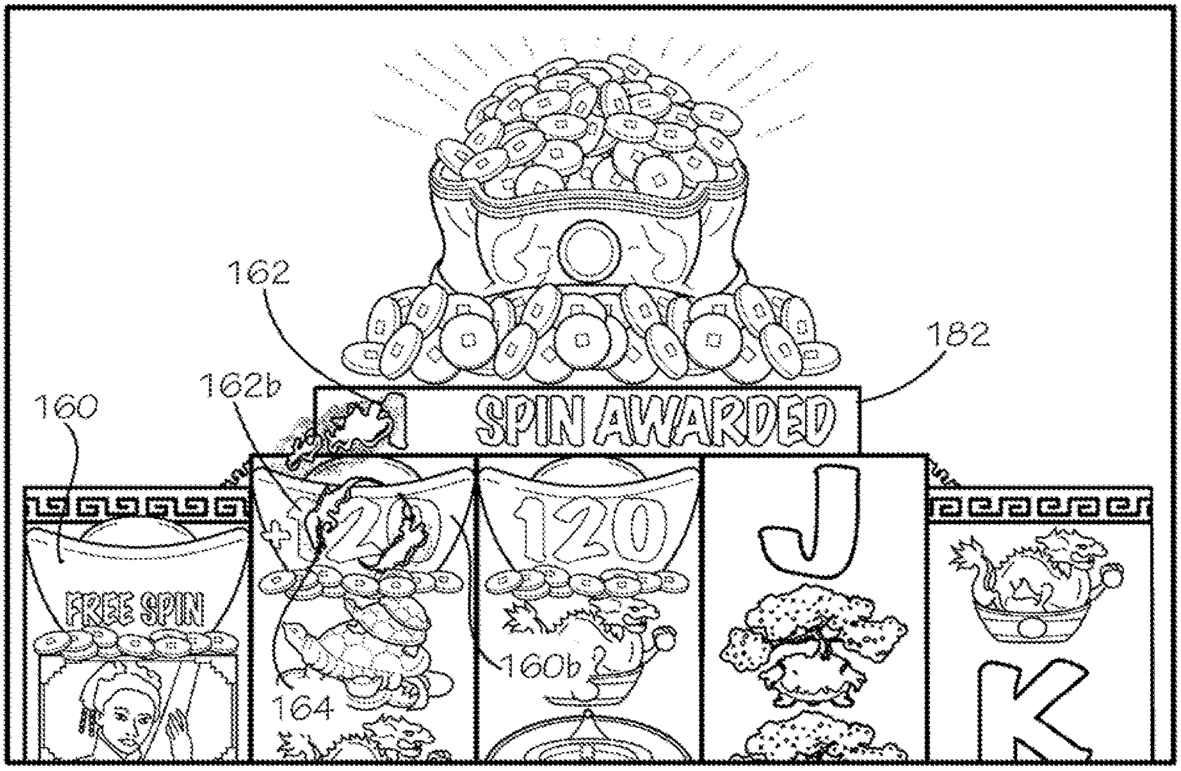
Figure 31:
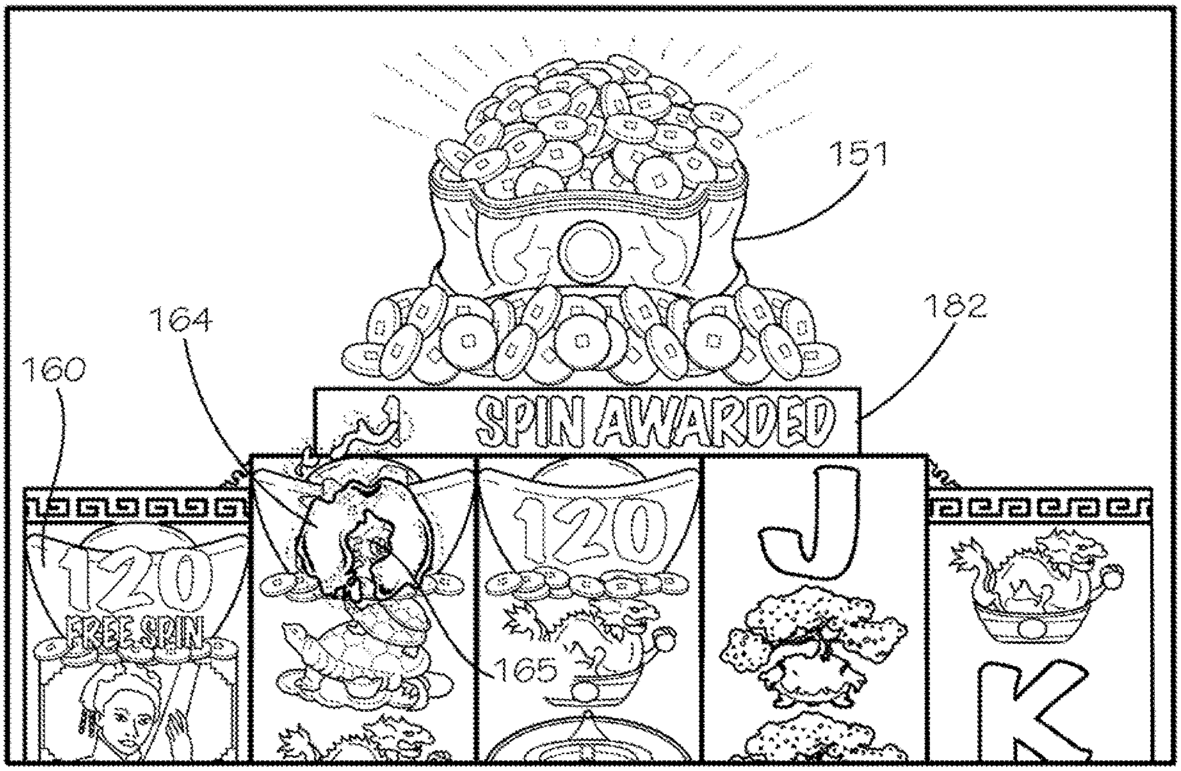

As shown in FIG. 21, the win value 162 commences moving and in FIG. 22, is accompanied by a second alerting illumination or flash 180 for bringing the attention of the player to the activity of the win value. An irregular field overlies the win symbol and the flash expands to a larger flash field 180*a* as shown in FIG. 23, and may partially obscure at least the win value 162. The irregular field is thin and vaporous translucent cloudy with an irregular perimeter. The irregular field transforms to a regular field (in the illustrated embodiment shown in FIG. 24, as a circular shape) overlying the win symbol and adjacent portions of the matrix. The flash 180 and the irregular field increases in becoming more opaque as shown in FIG. 25. The regular field of the flash 180 reaches a distal extent covering the win value, and then collapses inwardly as shown in FIG. 26 and uncovering the moving win value. The illustrated embodiment may include, as shown in FIG. 27, a second flash 180, which may accelerate the win value 162 moving towards the winnings accumulator 150. In the illustrated embodiment, the win value moves linearly (see FIG. 28) as shown by a dashed line 187 from the win symbol towards the winnings accumulator. The tail 168 trails behind the moving win symbol and the win value may be obscured as shown in FIG. 29. The obscuring of the win value may arise alternatively from a portion of the flash or from the win value decreasing in display intensity to fading out. As shown in FIG. 30, the win value enters a win field 182 which may display a number based on the win value (and any previously accumulated win values). The win field 182 includes a win type designation 184.

Figure 32:
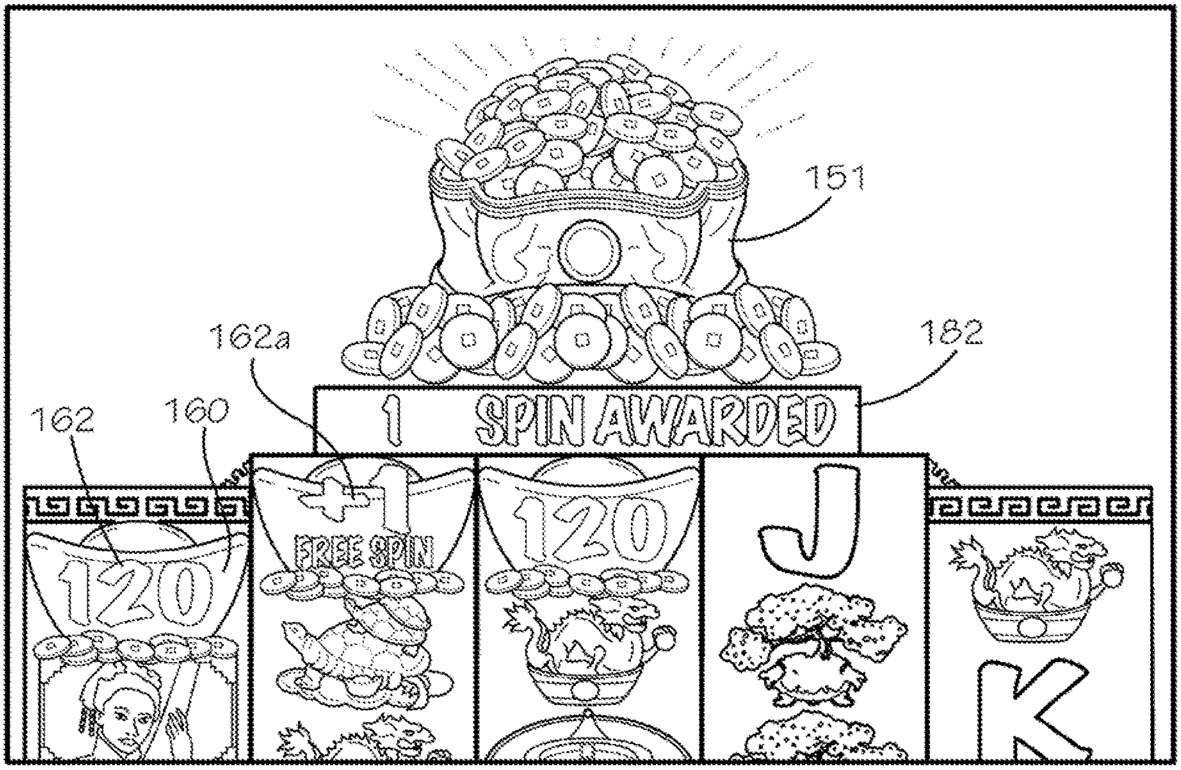
Figure 33:
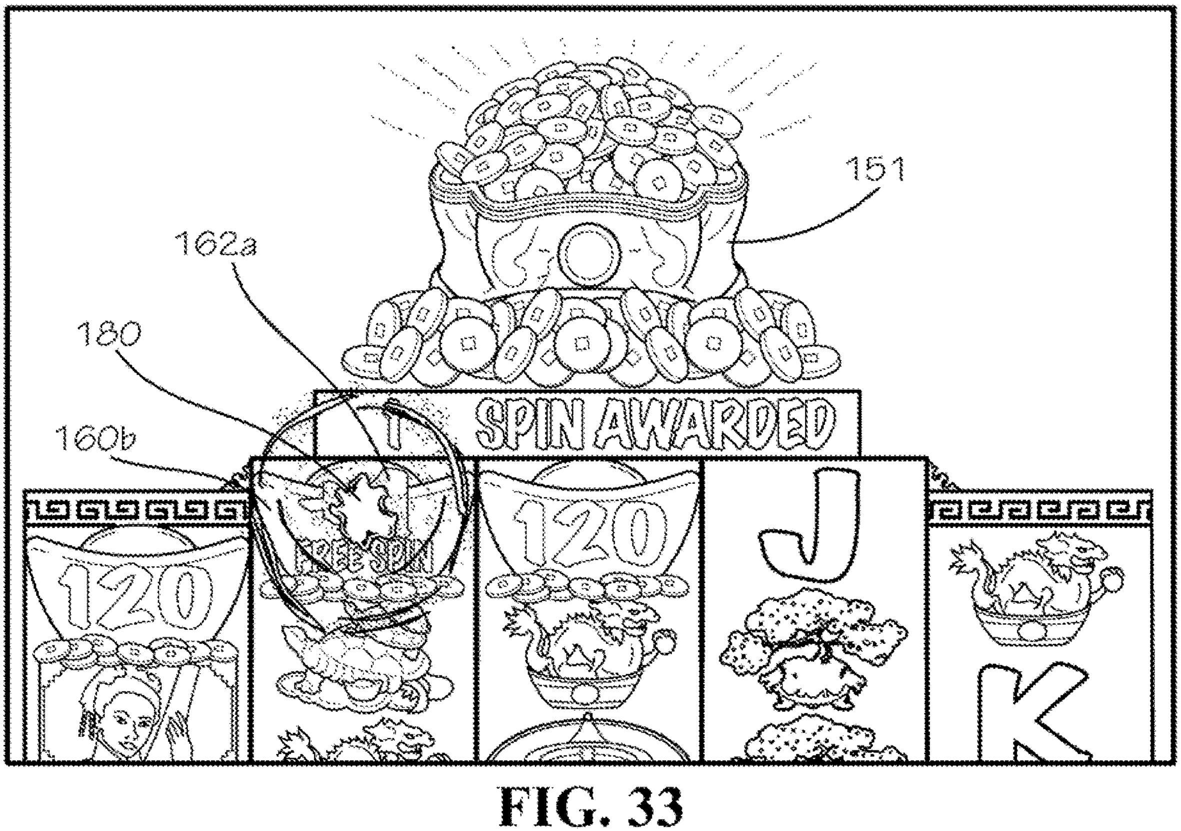
Figure 34:
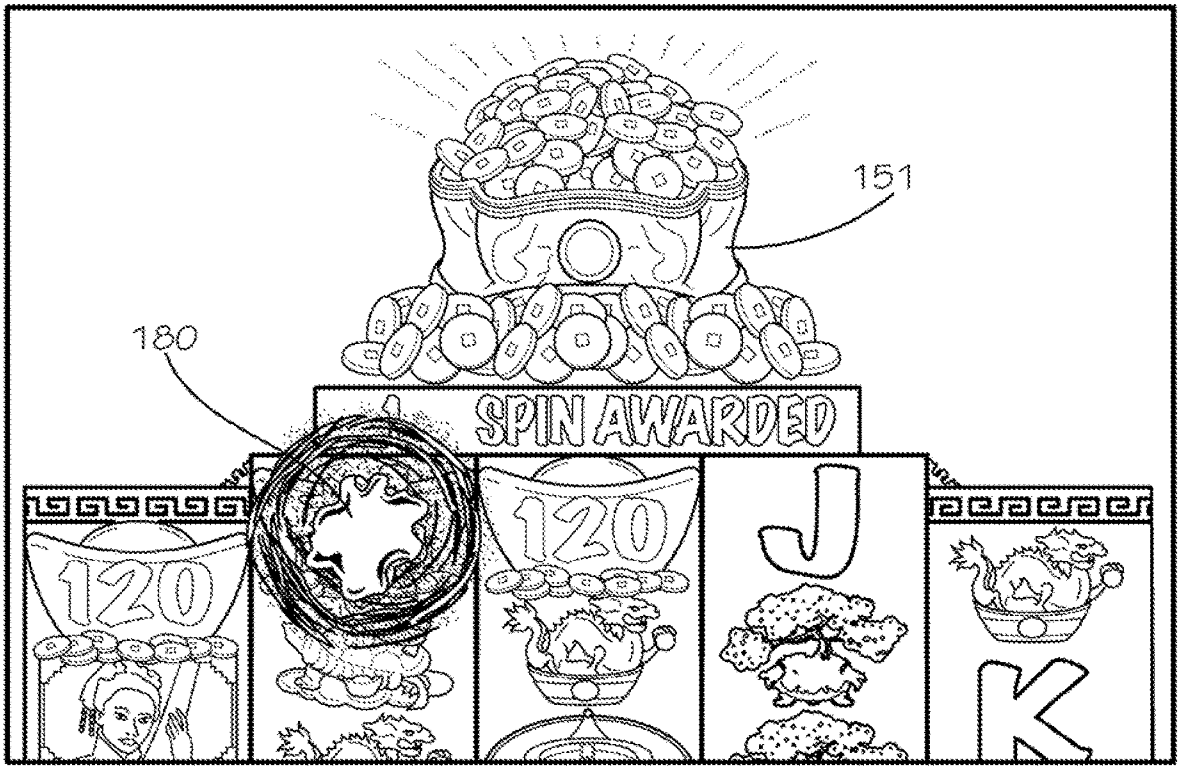
Figure 35:
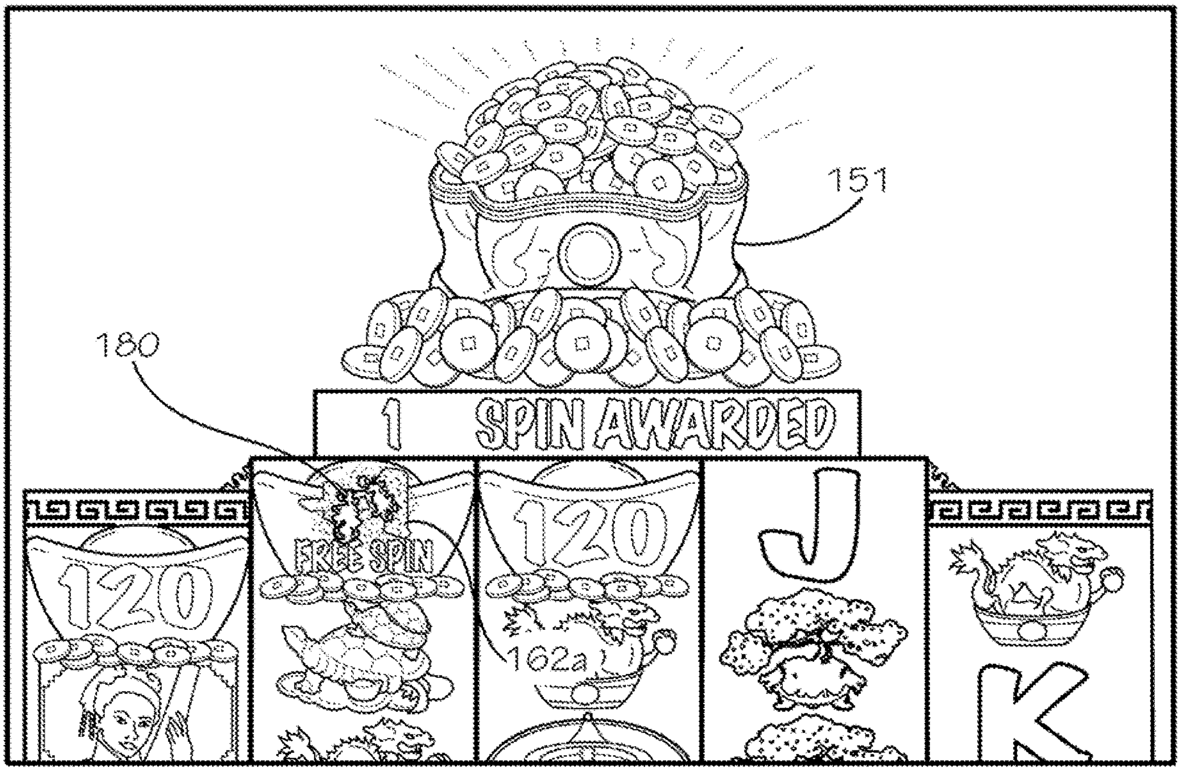
Figure 36:
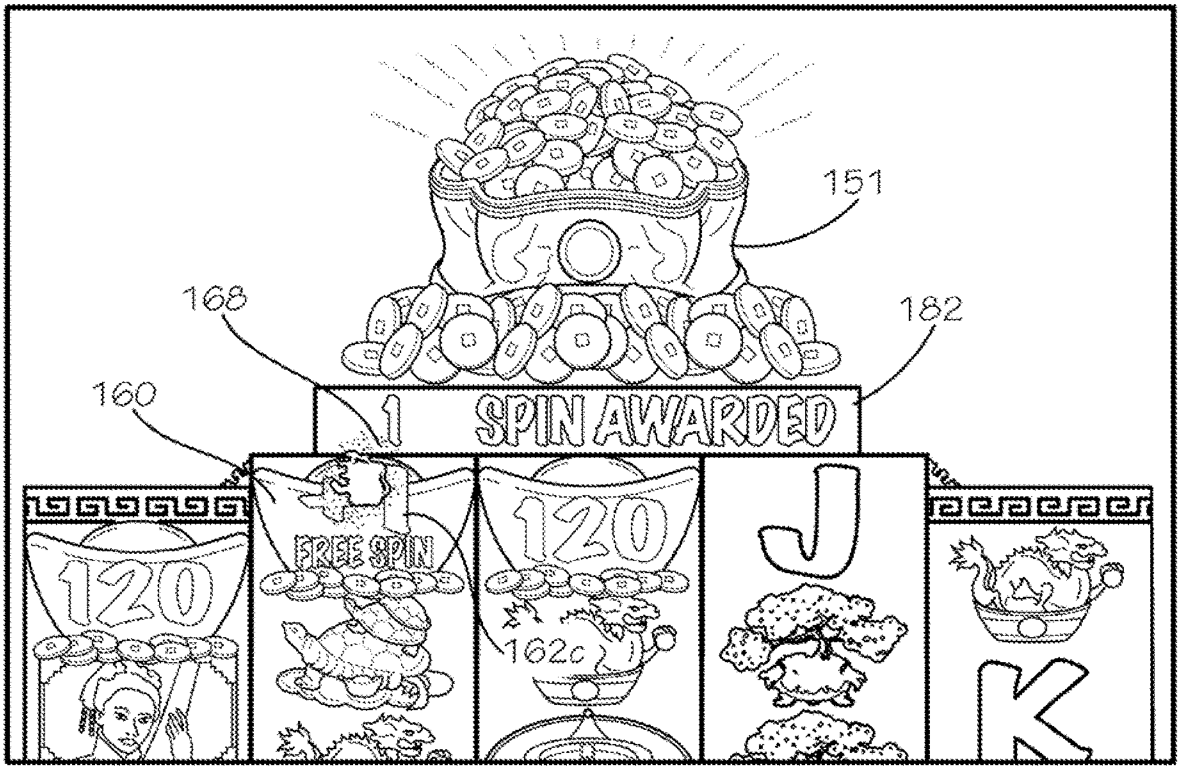
Figure 37:
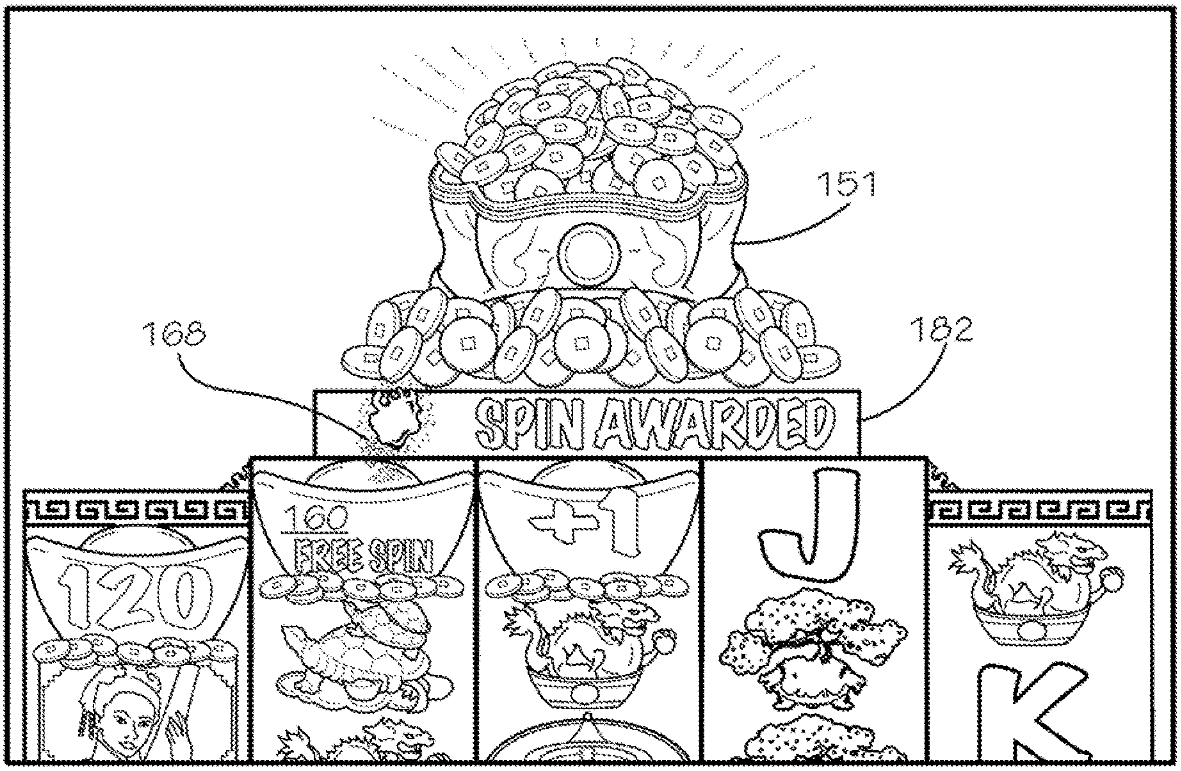
Figure 38:
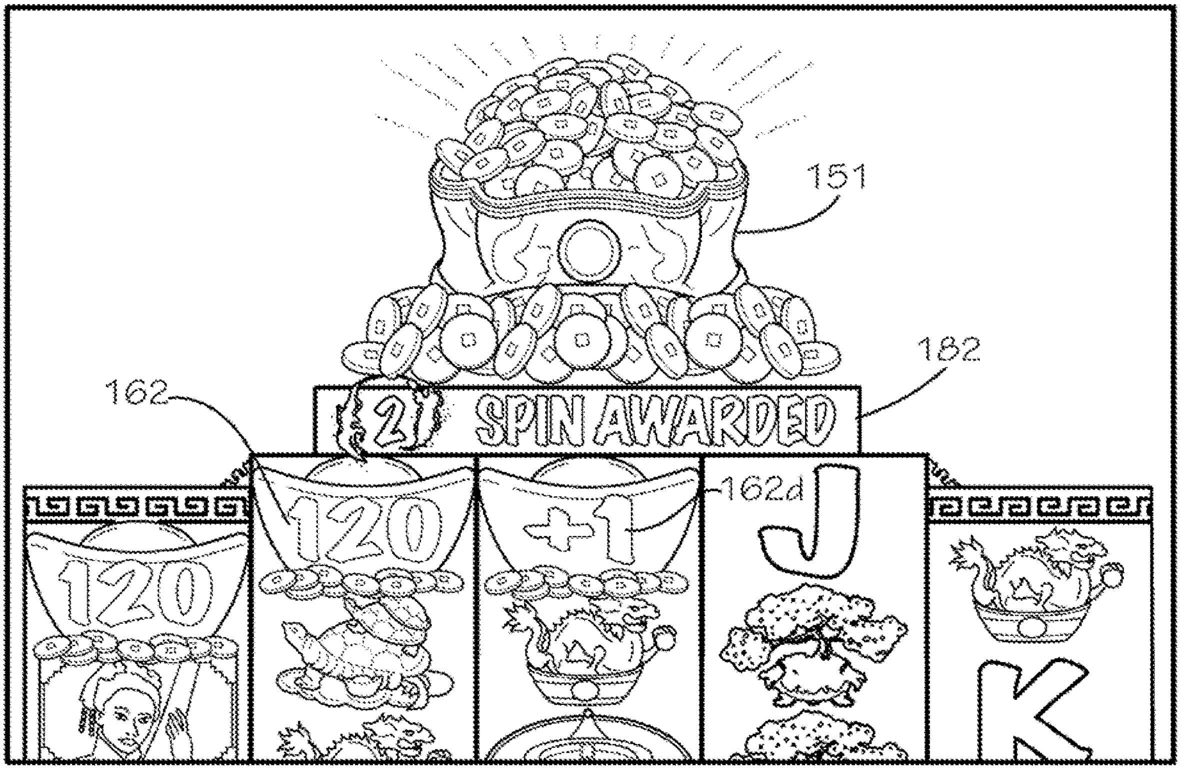
Figure 39:
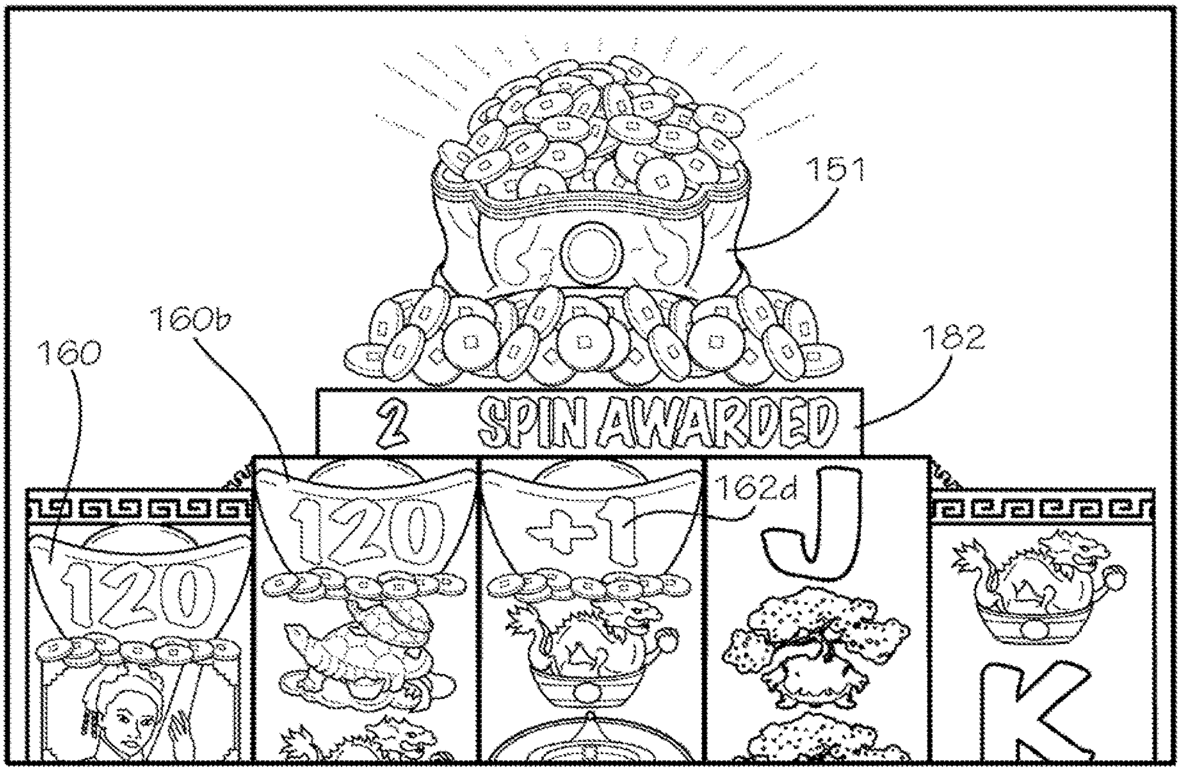
Figure 40:
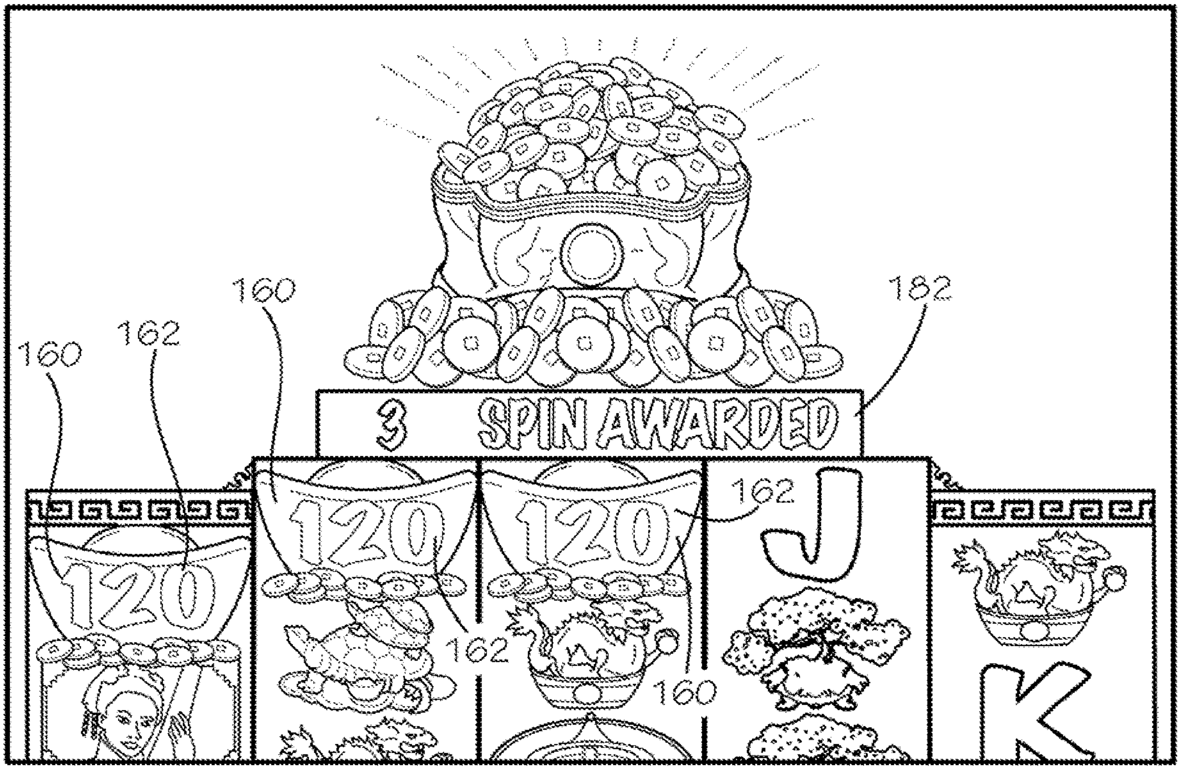

The exemplary game play illustrated in FIGS. 13-83 provides initially, as noted above, three win symbols. Continuing now with the second of the win symbols with reference to FIG. 30, as a first win value reaches the win field 182, a second win value 162*b* experiences the flash 164. The flash 164 expands and opaquely blocks the second win value 162*b*. The expansion of the flash 164 subsequently forms the passageway 165 opening view of the win value. The first win value changes from the first type to the second type, as shown in FIGS. 29 and 30. As shown in FIG. 32, the symbol flash 164 collapses and vaporizes uncovering the win value 162*a* that indicates the second type and amount of win value (free spins and a total of 1 such free spin). The second flash 180 occurs (FIG. 33) and expands to obscure the win symbol and win value (FIG. 34). The expanding flash then collapses and vaporizes as shown in FIG. 35. FIG. 36 illustrates the win value 162*b* moving from the win symbol to the win field 182. As shown in FIG. 37, the tail 168 extends from the moving win value and the third win value 162*d* in the exemplary embodiment changes from the first type of win value to the second type. The win field displays the increase by the amount of the second win value as shown in FIG. 38. The third win value 162*d* in the illustrated embodiment then similarly displays the first flash 164, its expansion and collapse, and the second flash 180 that expands to obscure the win symbol and win value before forming the passageway as discussed above. The win value moves as discussed above to the win field that increases by the amount of the win value and the win value overlying the win symbol changes to the first type, as shown in FIG. 40.

Figure 41:
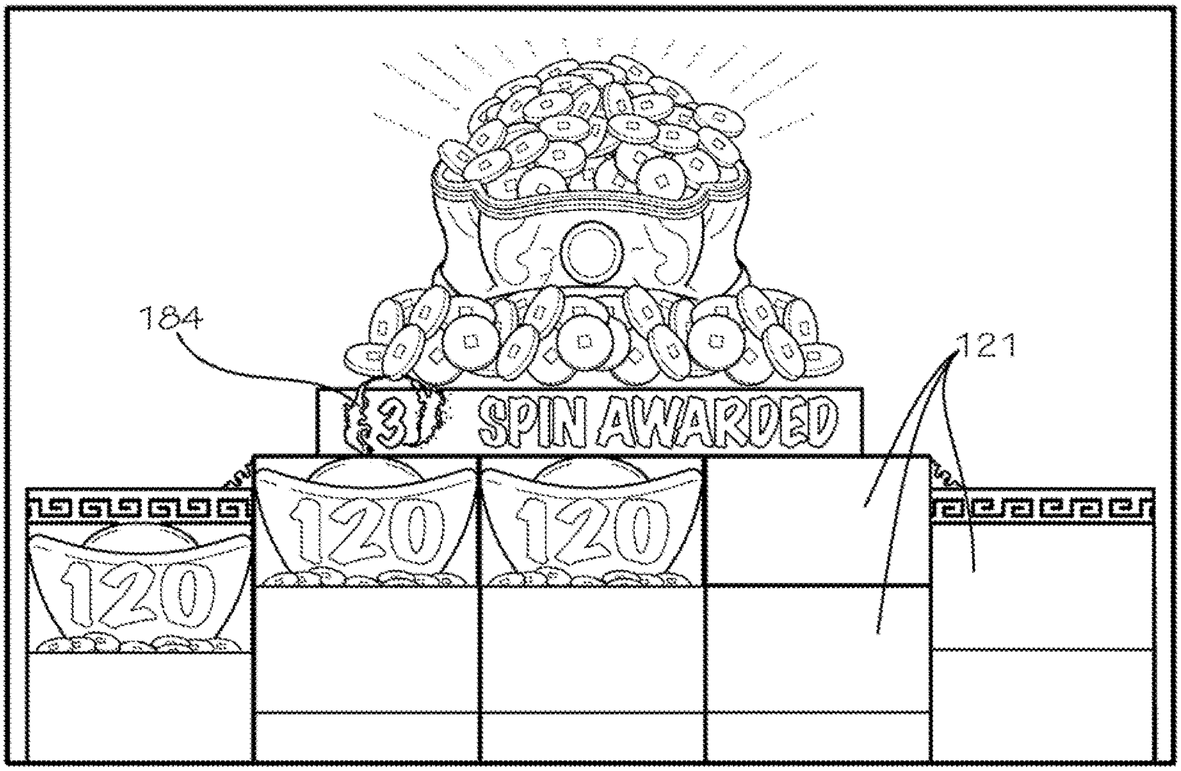
Figure 42:
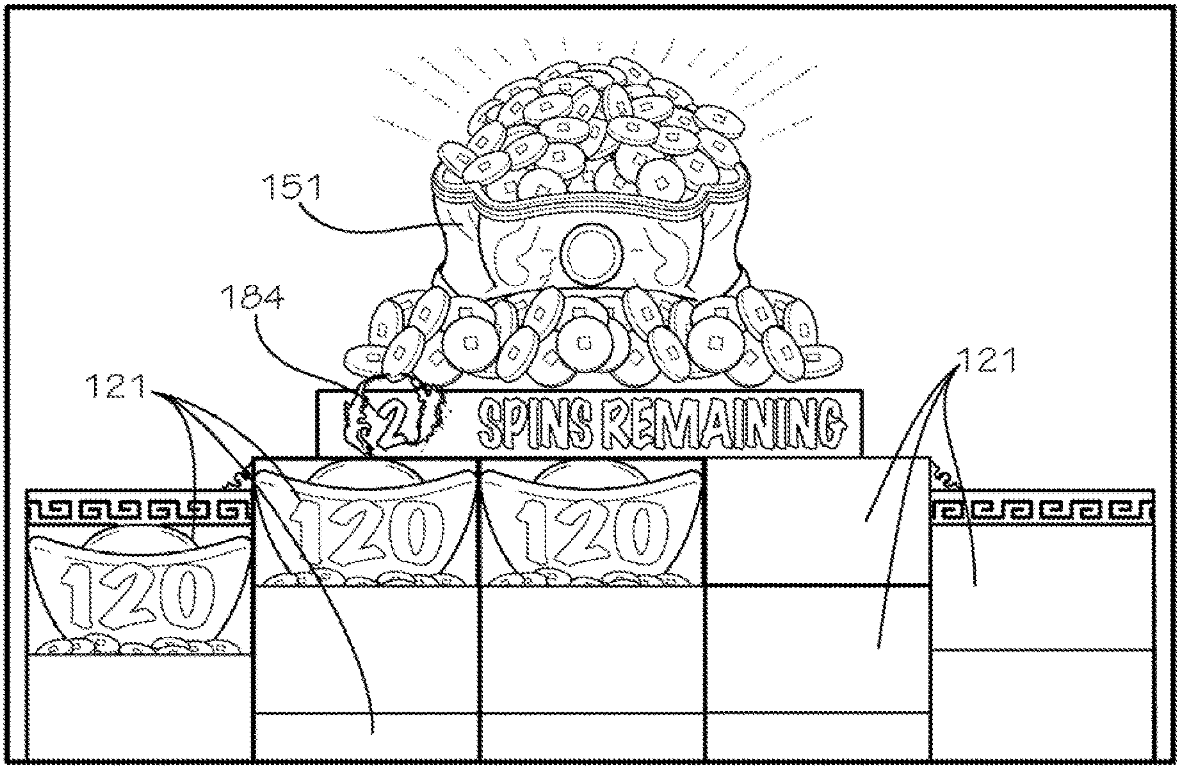
Figure 43:
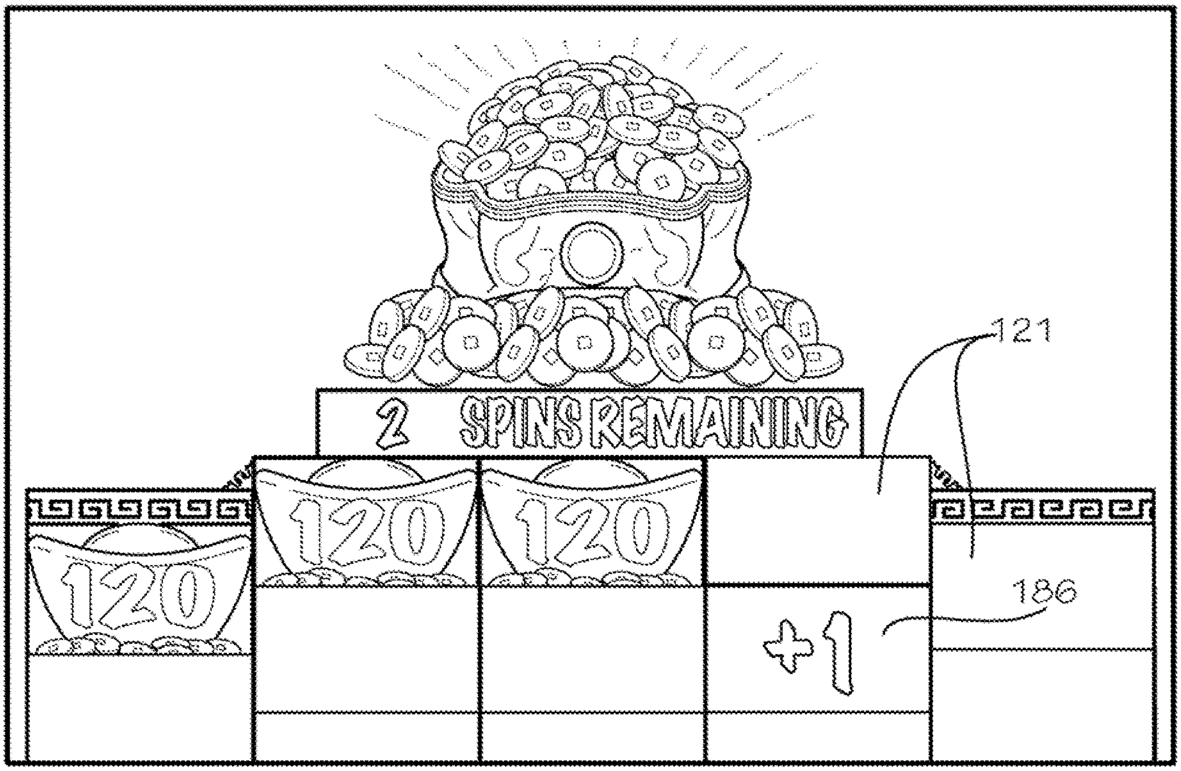
Figure 44:
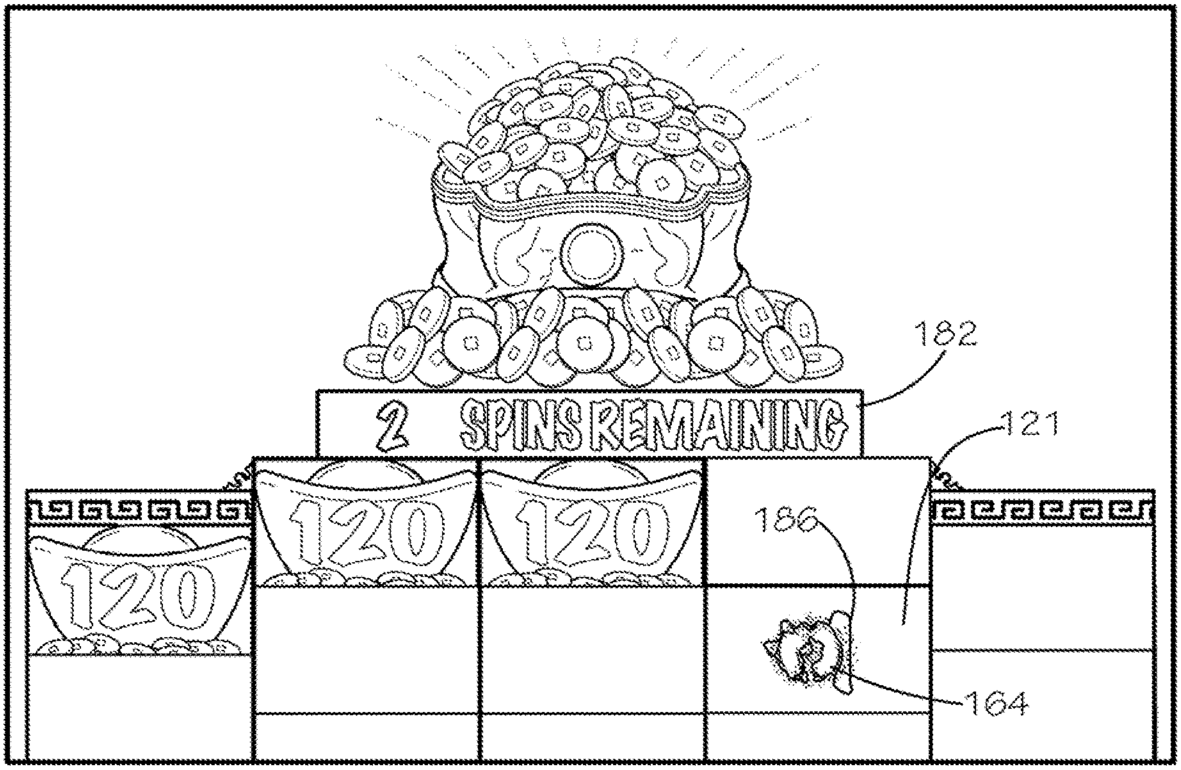
Figure 45:
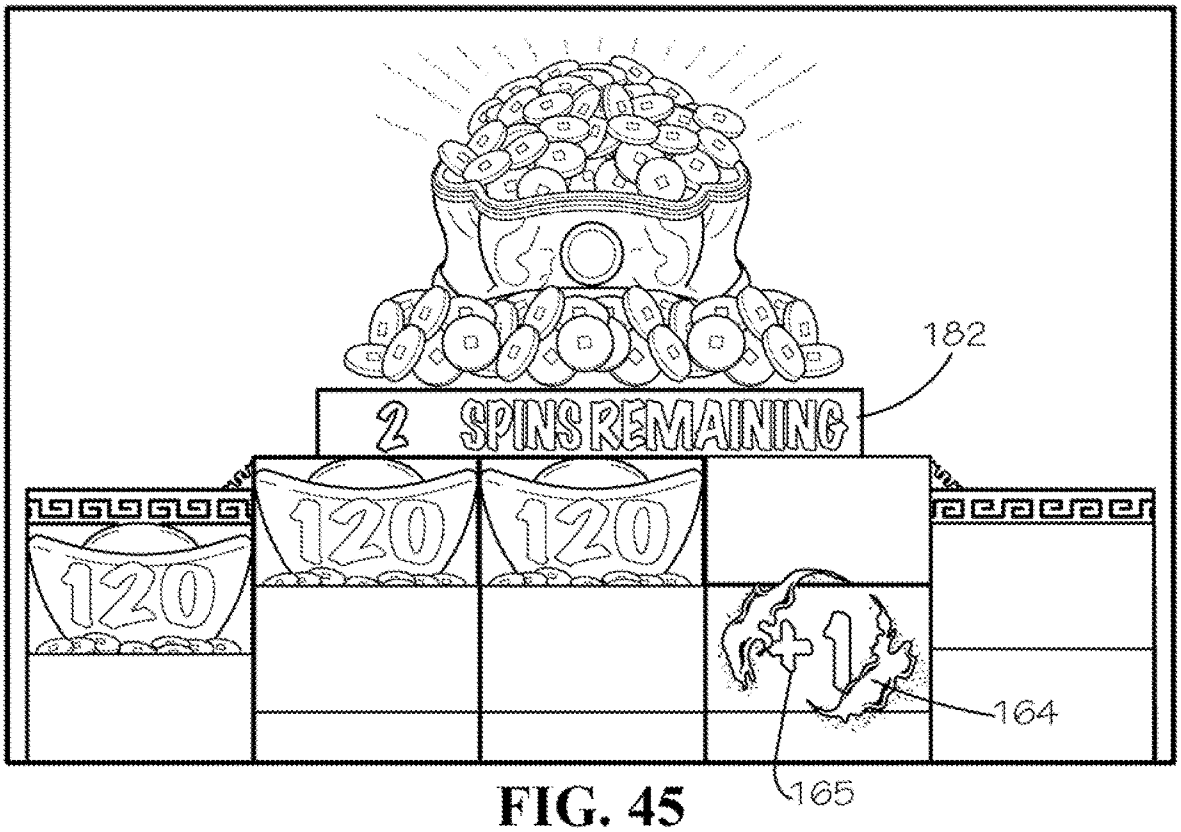
Figure 46:
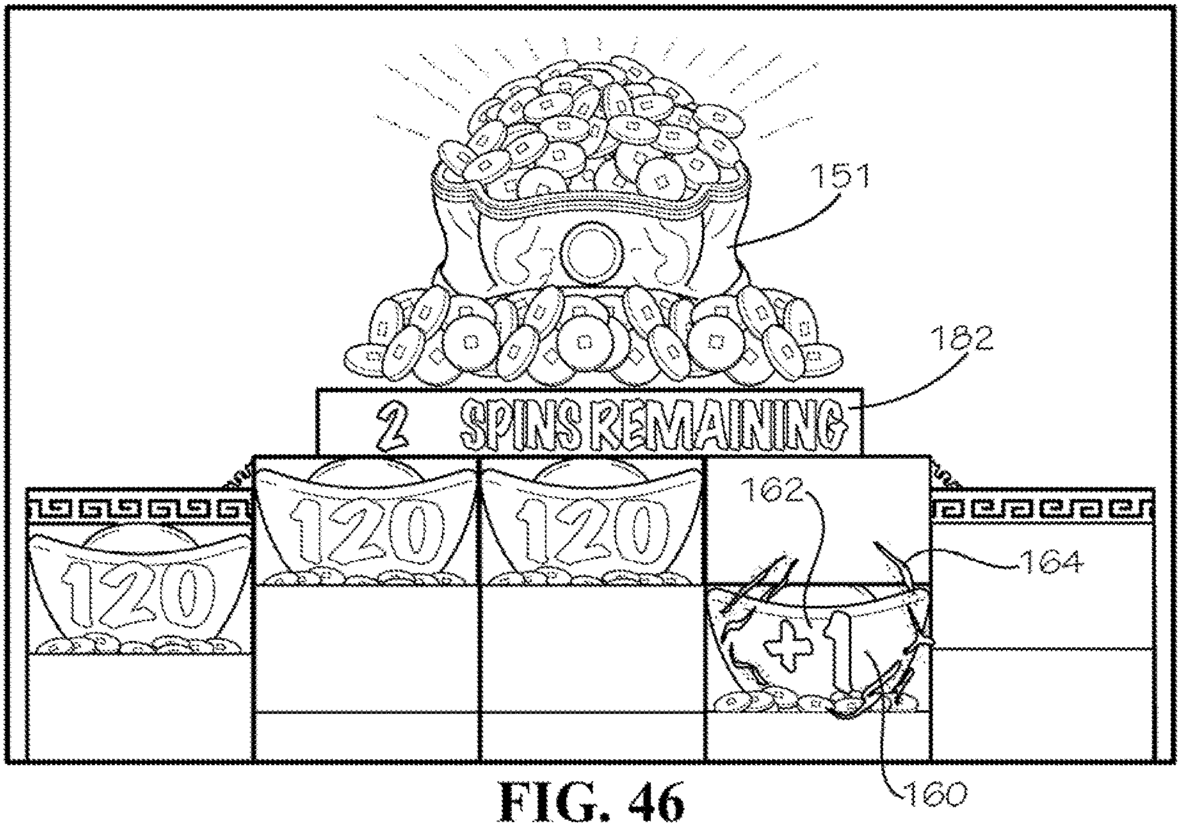
Figure 47:
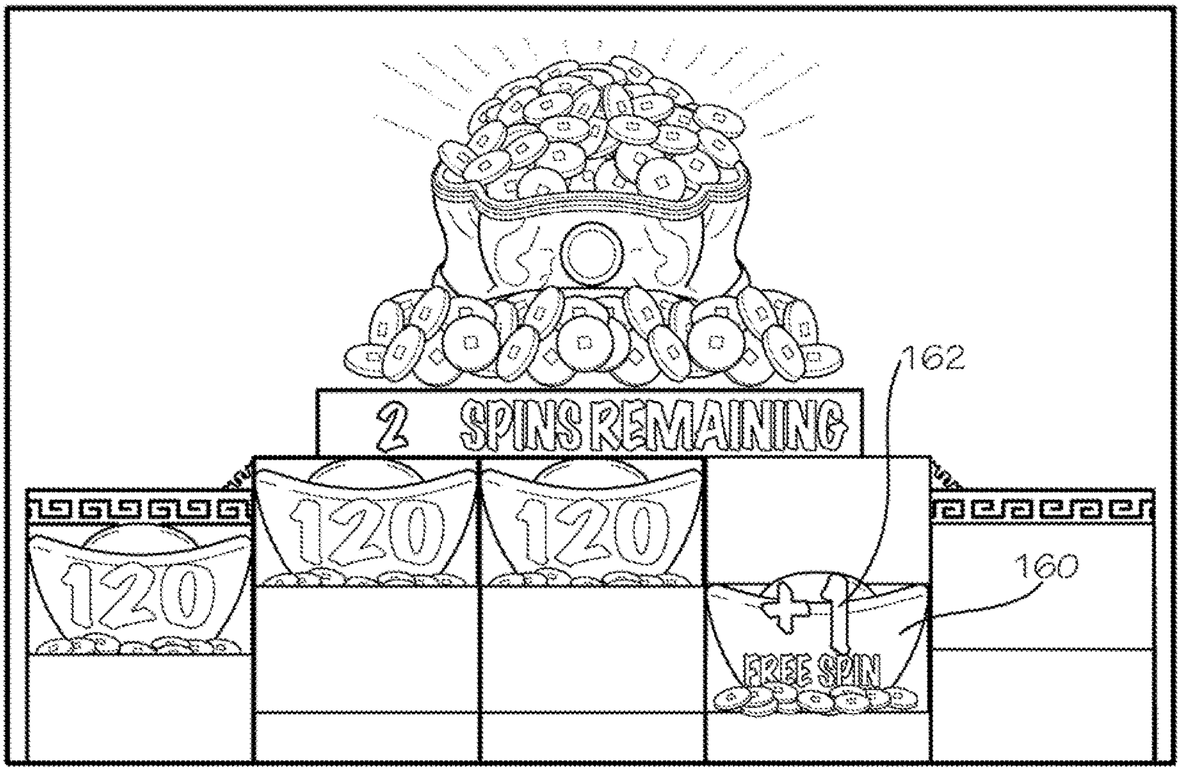
Figure 48:
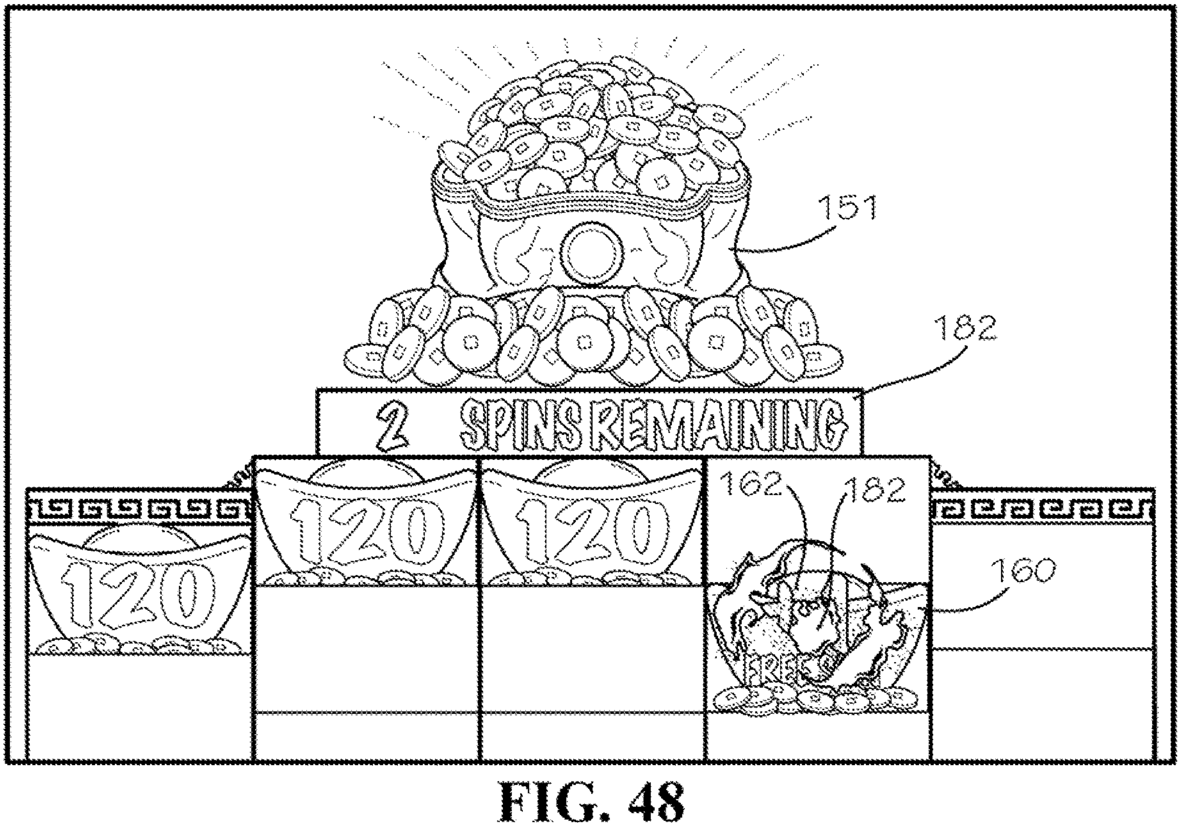
Figure 49:
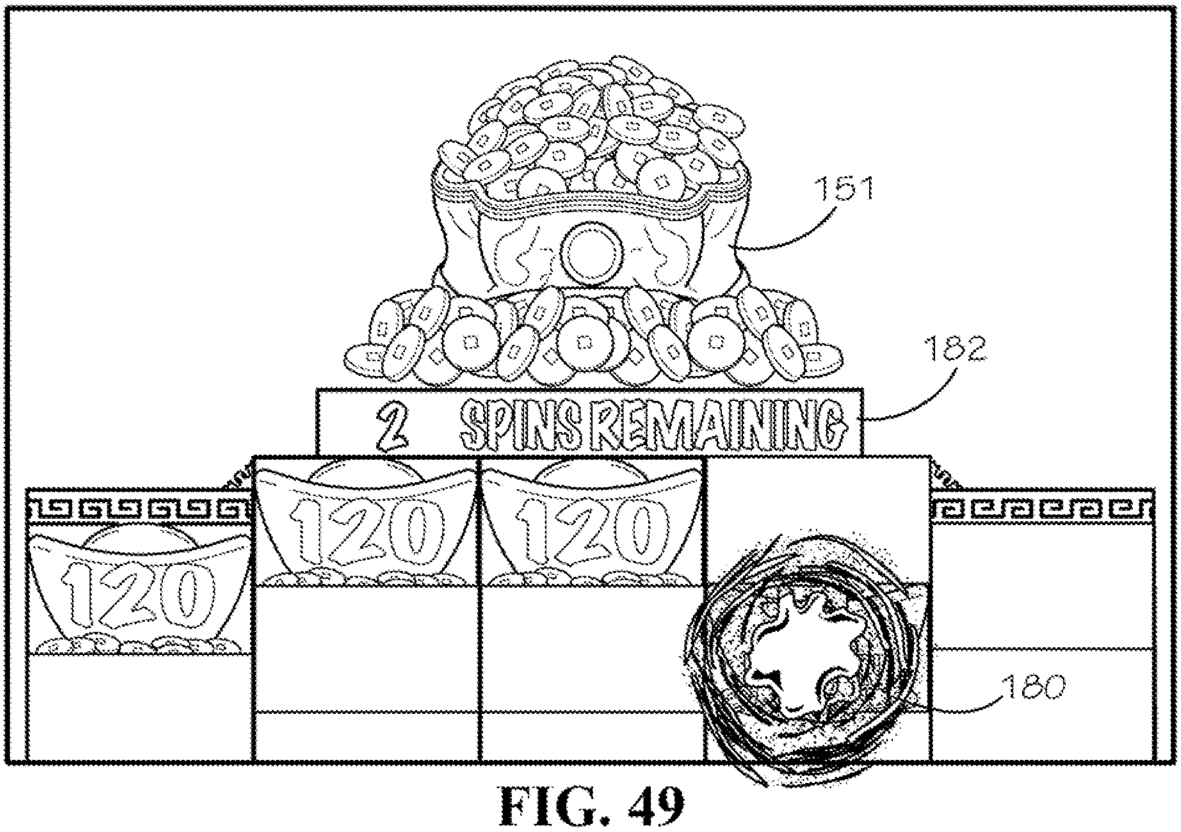
Figure 50:
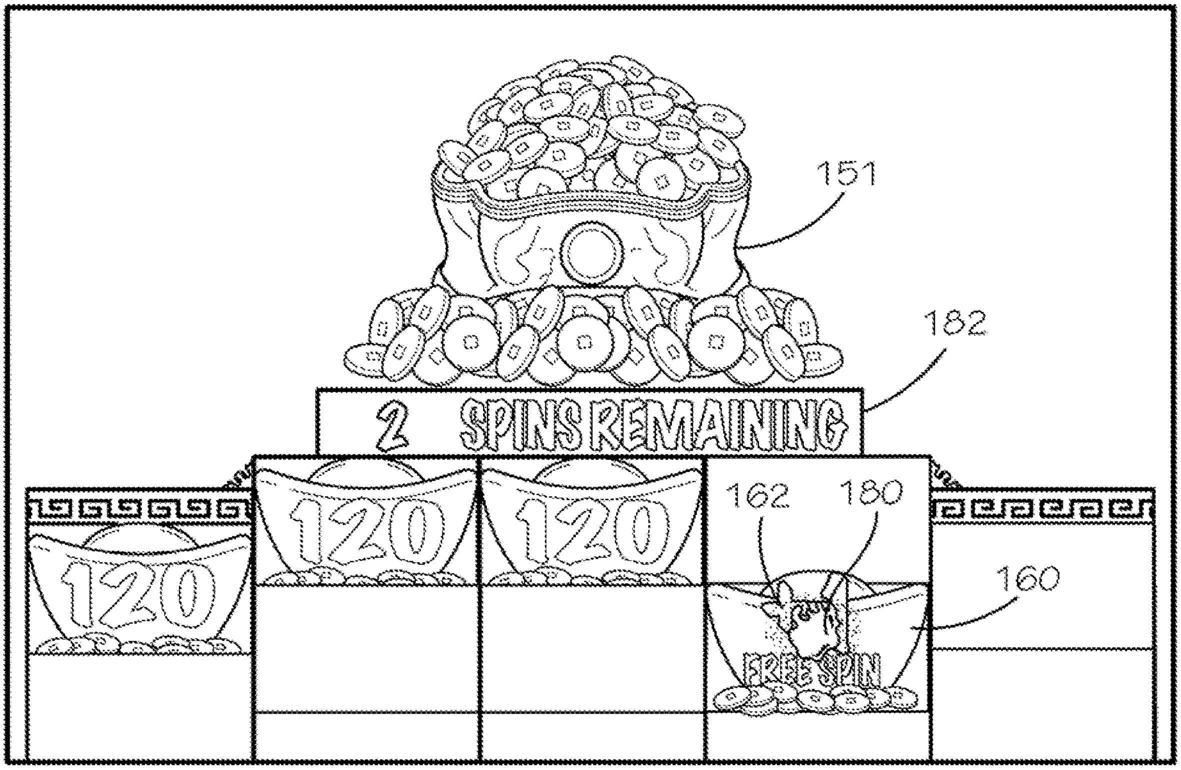
Figure 51:
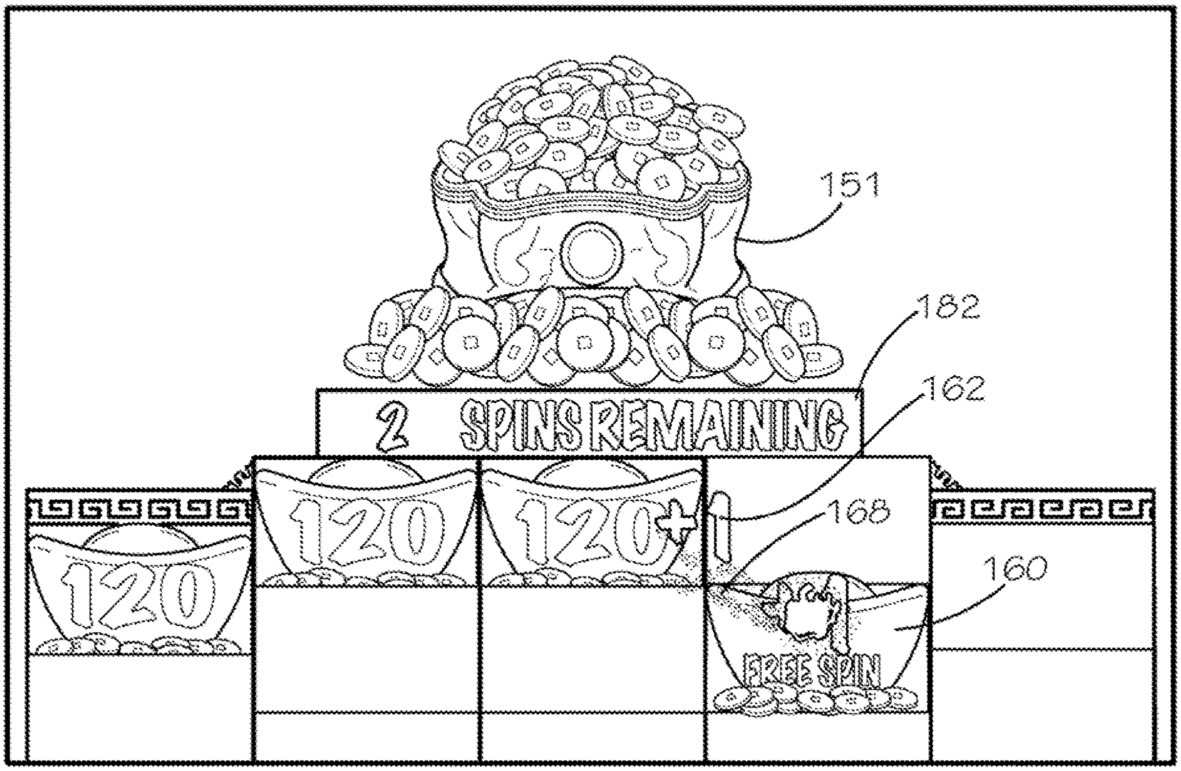
Figure 52:
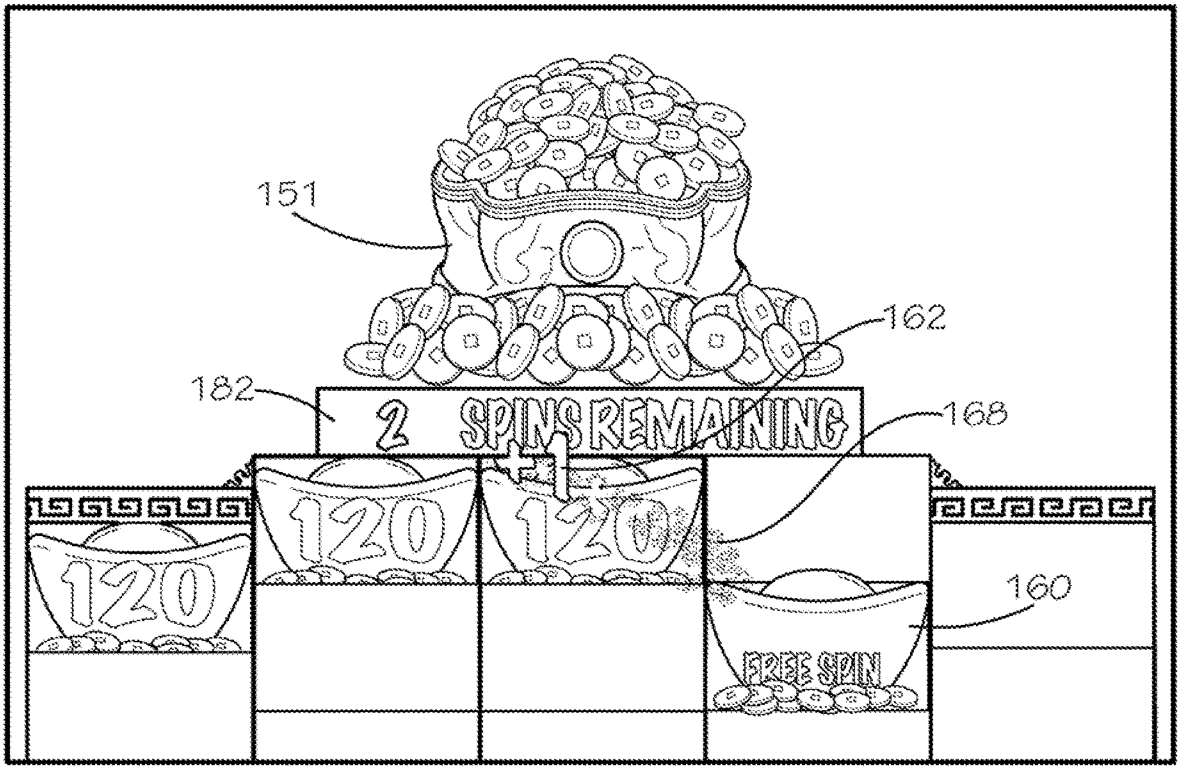
Figure 53:
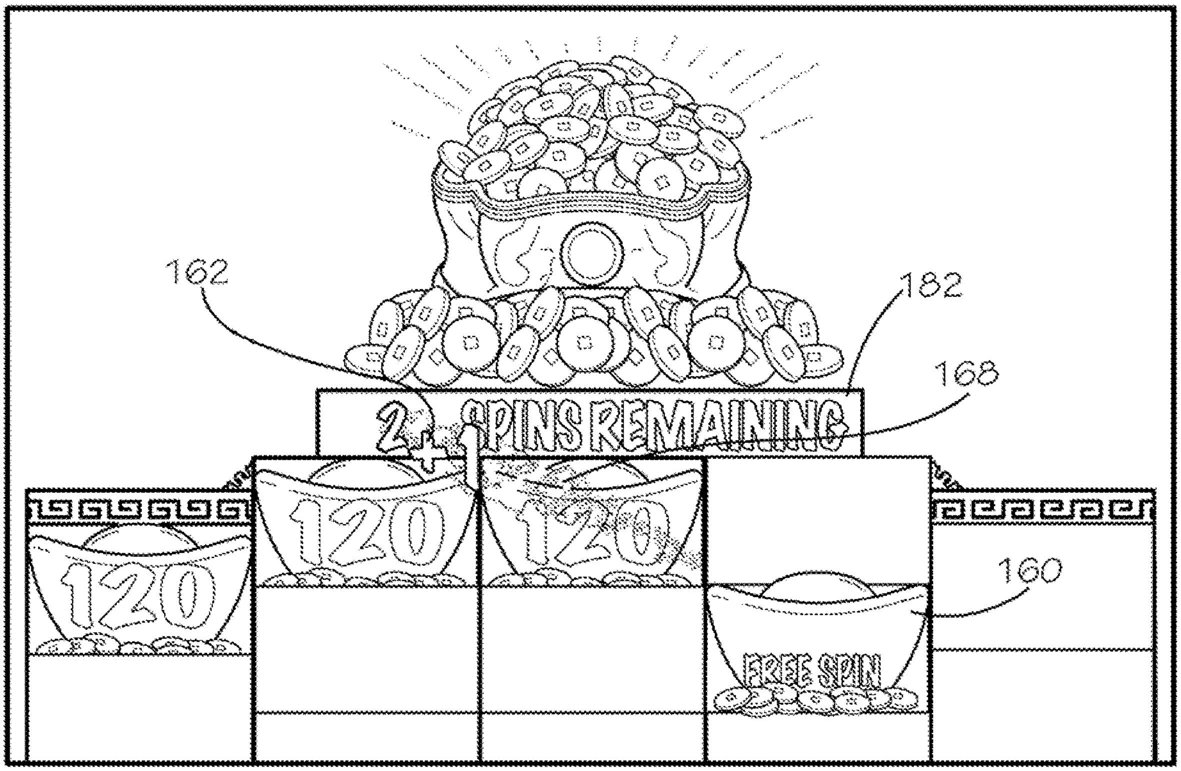
Figure 54:
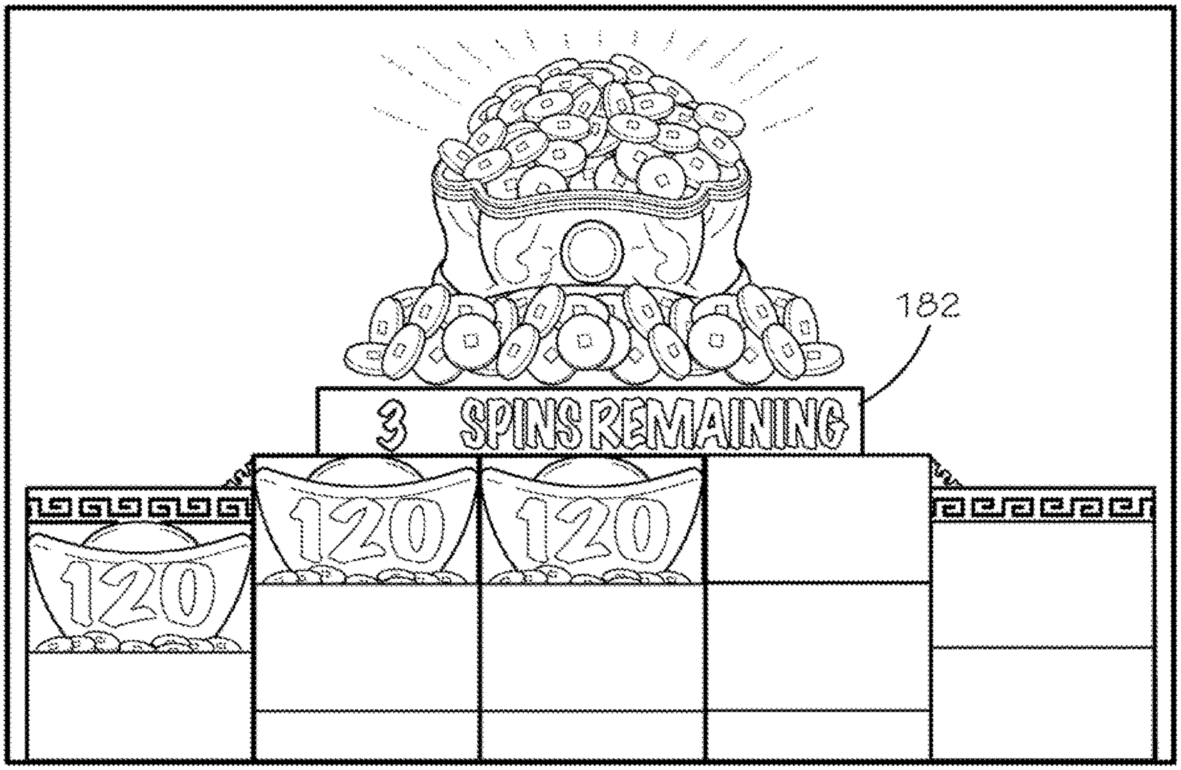
Figure 55:
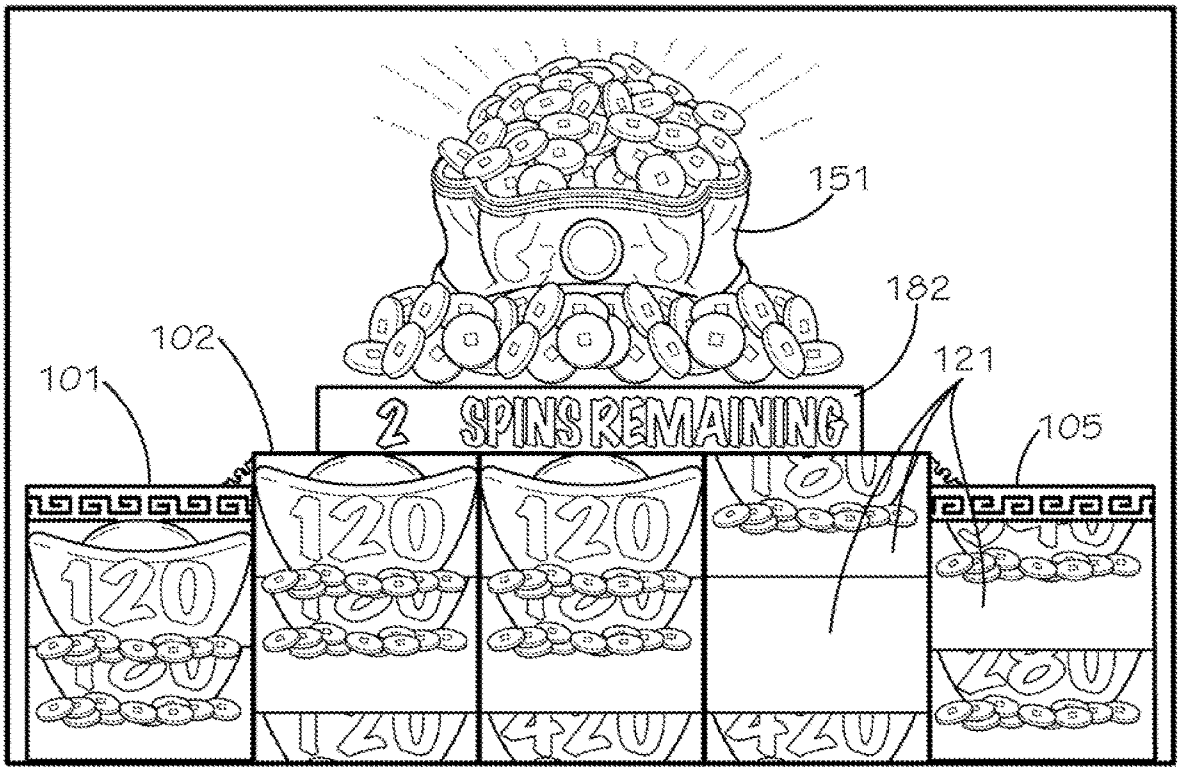
Figure 56:
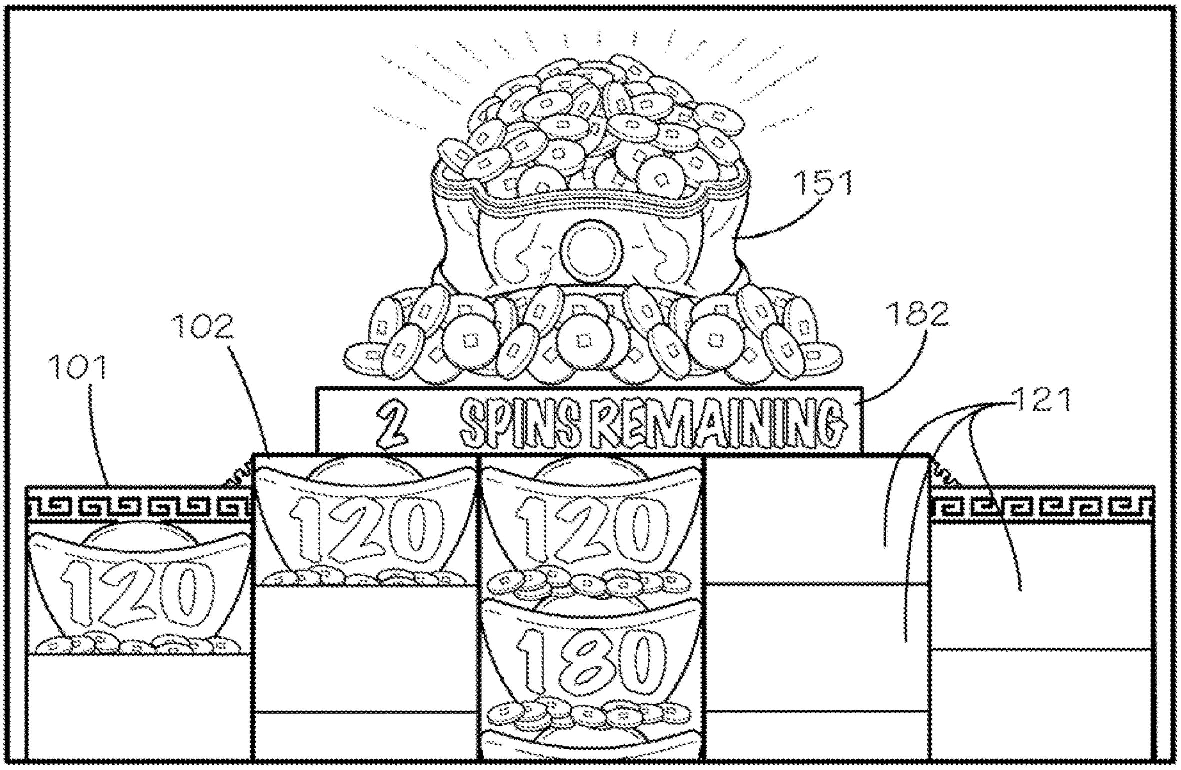
Figure 57:
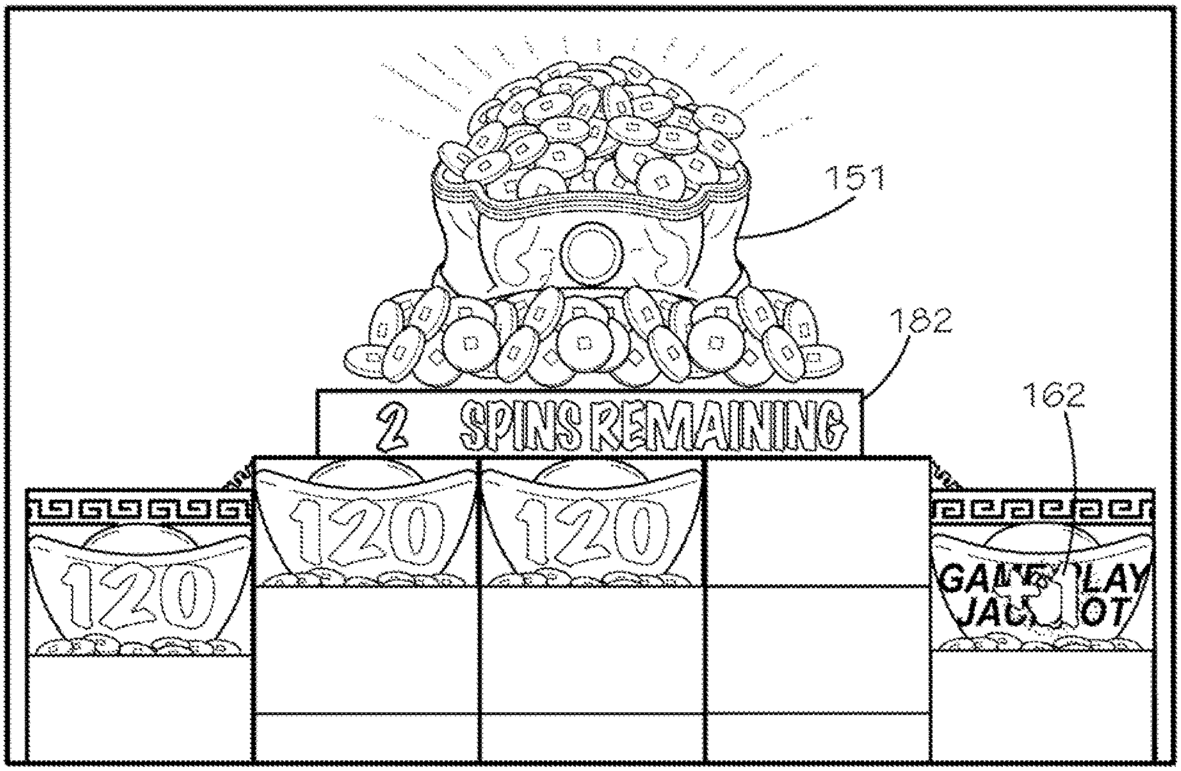

FIGS. 41-83 illustrate bonus play of the game machine as an applied illustrative embodiment of the special feature win symbol display according to the present invention. FIG. 41 illustrates bonus play in which the non-winning symbol positions 121 in the matrix are vacated or empty of symbols prior to an initial spin during a bonus period. The number of awarded win values is displayed and shown with a flash 184. The player uses the input device 92 to initiate the playing of the awarded spins, and FIG. 42 shows the decrease in spins (value type) remaining. In the example, the first spin achieves an award of an additional spin 186. Similarly as discussed above for the win value display apparatus, the win value 186 experiences the notification flash 164, which expands over the win value and opens the passageway 165 for again viewing the win value as shown in FIG. 45. The win symbol is displayed with the overlying win value (FIG. 46). The win value type may be displayed (FIG. 47) and the second flash 180 notification occurs (FIG. 48). The second flash expands over the win symbol (FIG. 49), and collapses (FIG. 50). The win value then moves to the win field 182 as shown in FIG. 51 with the tail 168 trailing (FIGS. 52 and 53). The win value increases the total of the win type in the win field 182.

As shown in FIGS. 55 and 56, the player again initiates a play of the game activity with the input device 92. The reels 101-105 spin to move symbols through the matrix 110. After the reels stop, the matrix 110 displays the result. In the illustration shown in FIG. 57, a win symbol includes a win value 162. The win value similarly moves to the win field with the flash 164, expansion, collapse, second flash 180 and movement, as discussed above.

Figure 58:
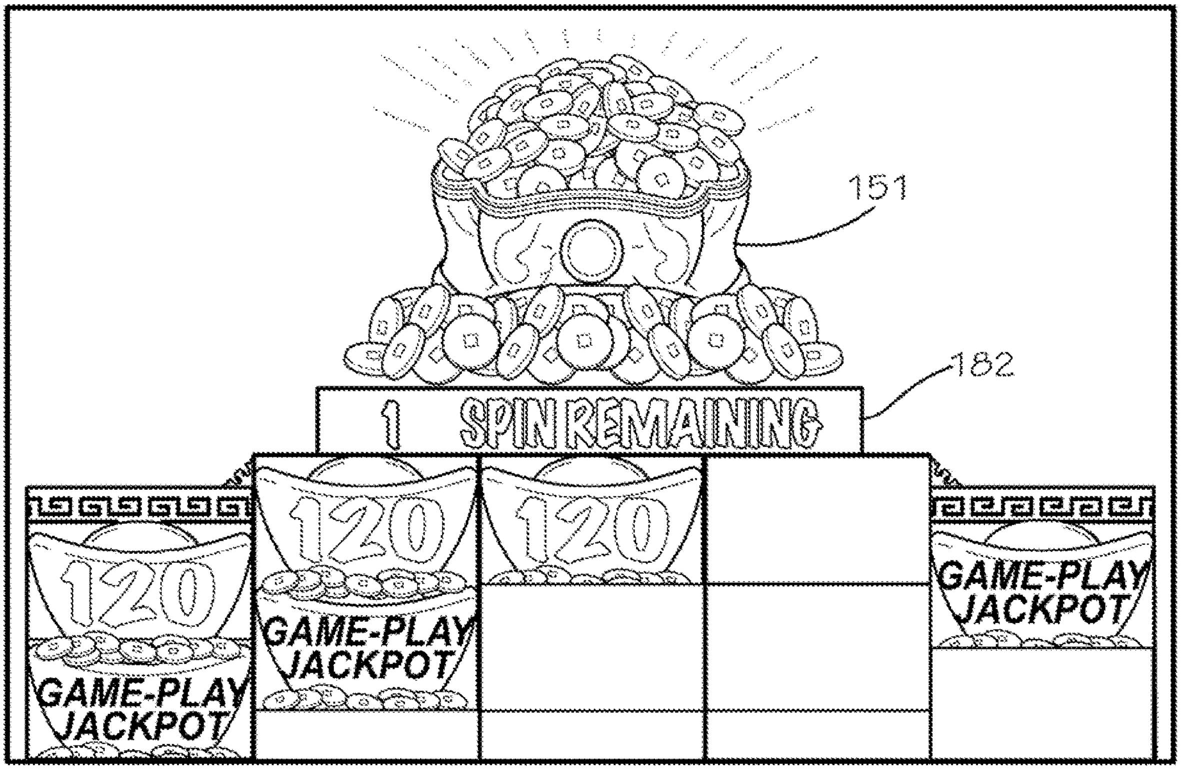
Figure 59:
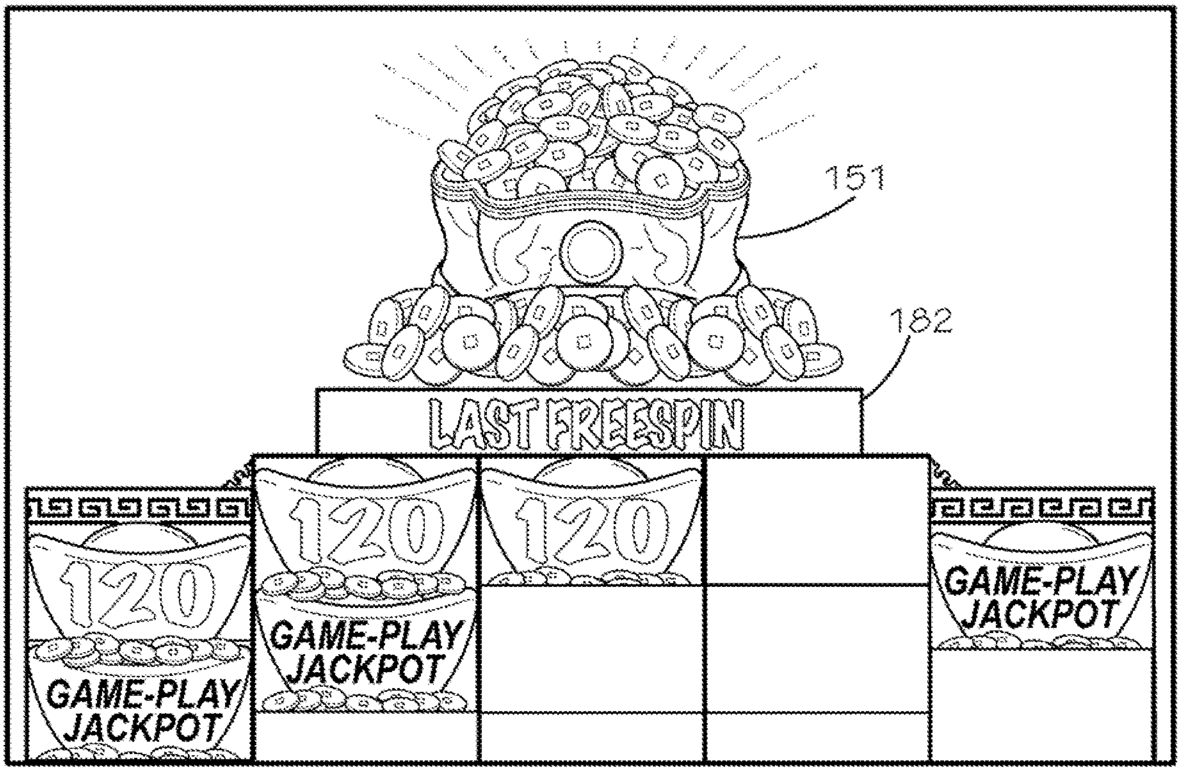
Figure 60:
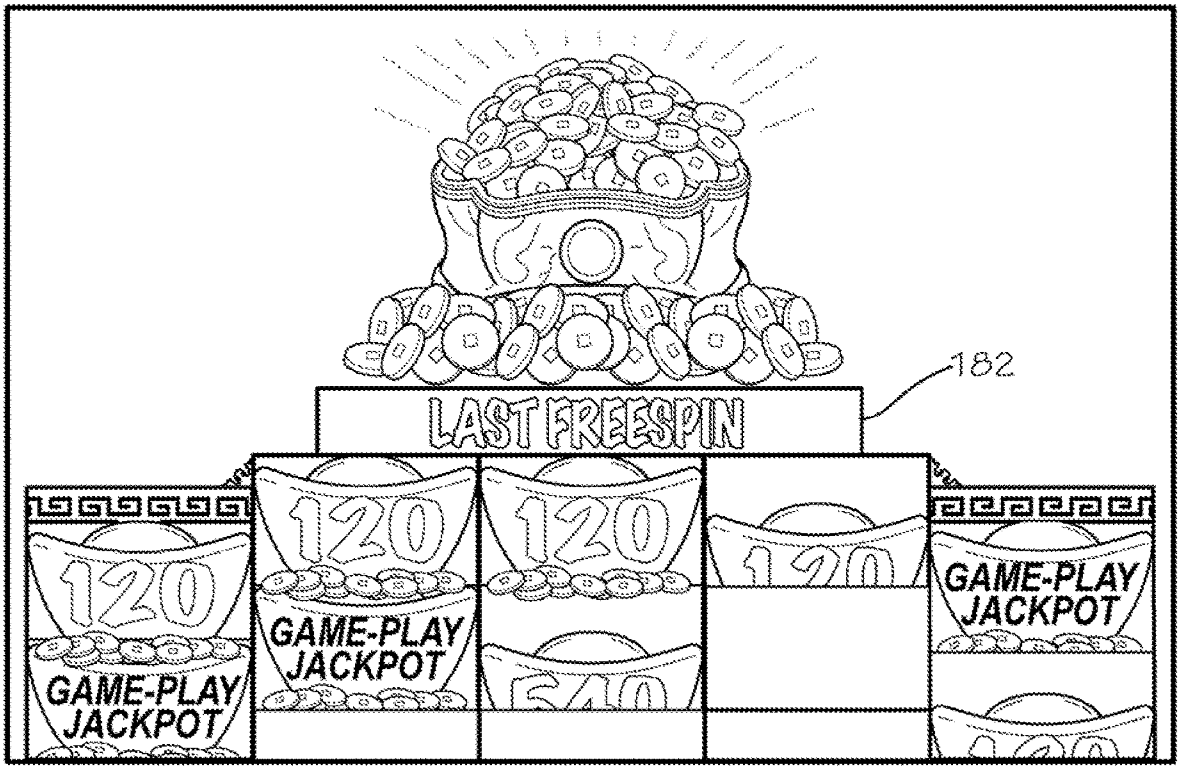
Figure 61:
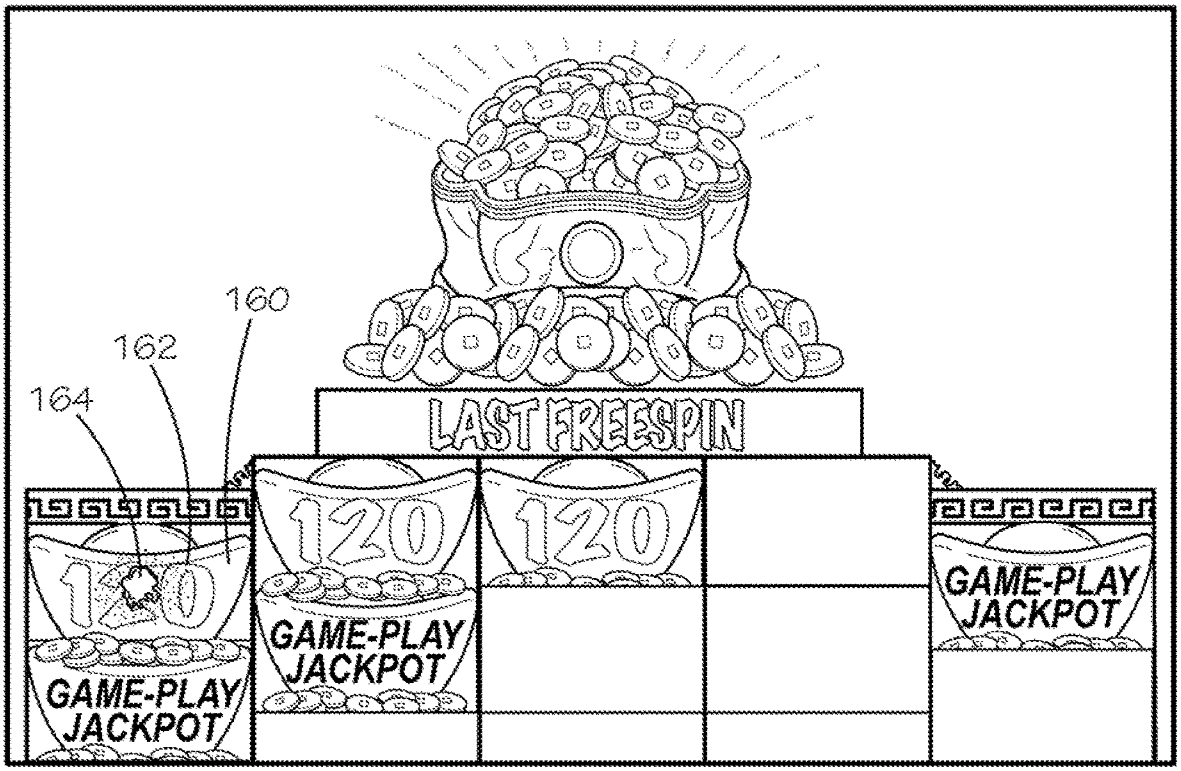
Figure 62:
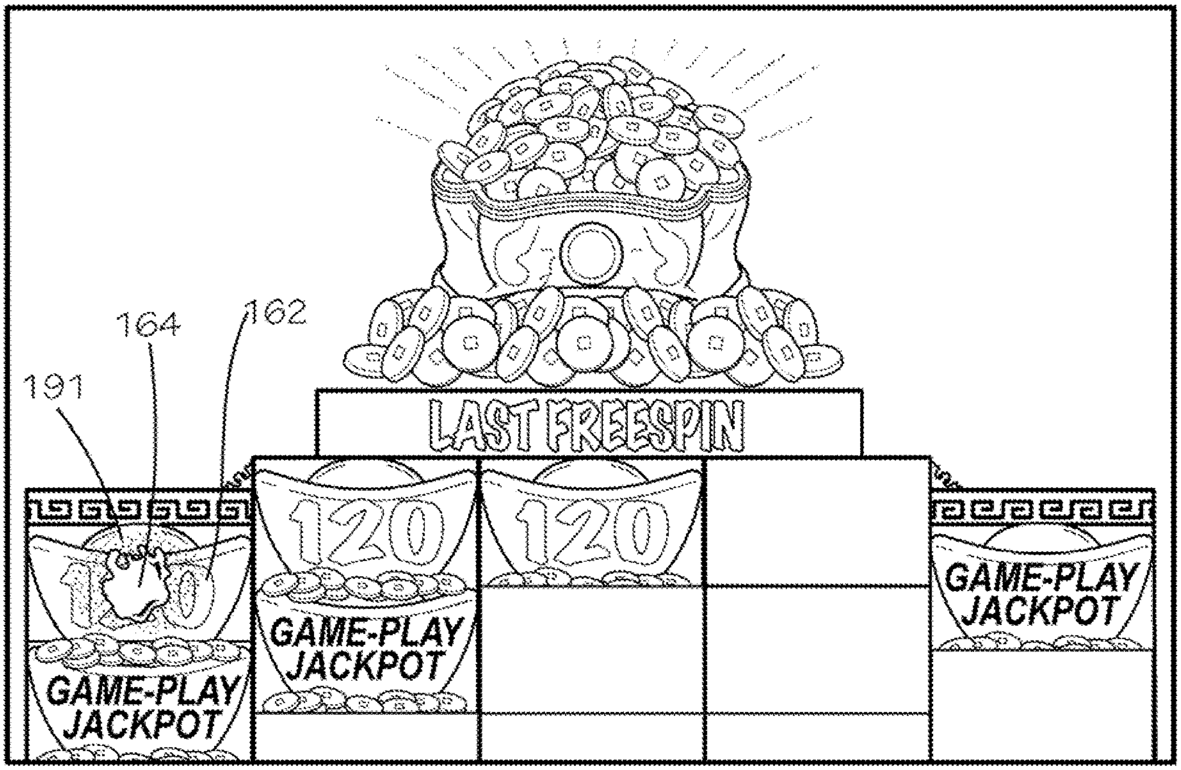
Figure 63:
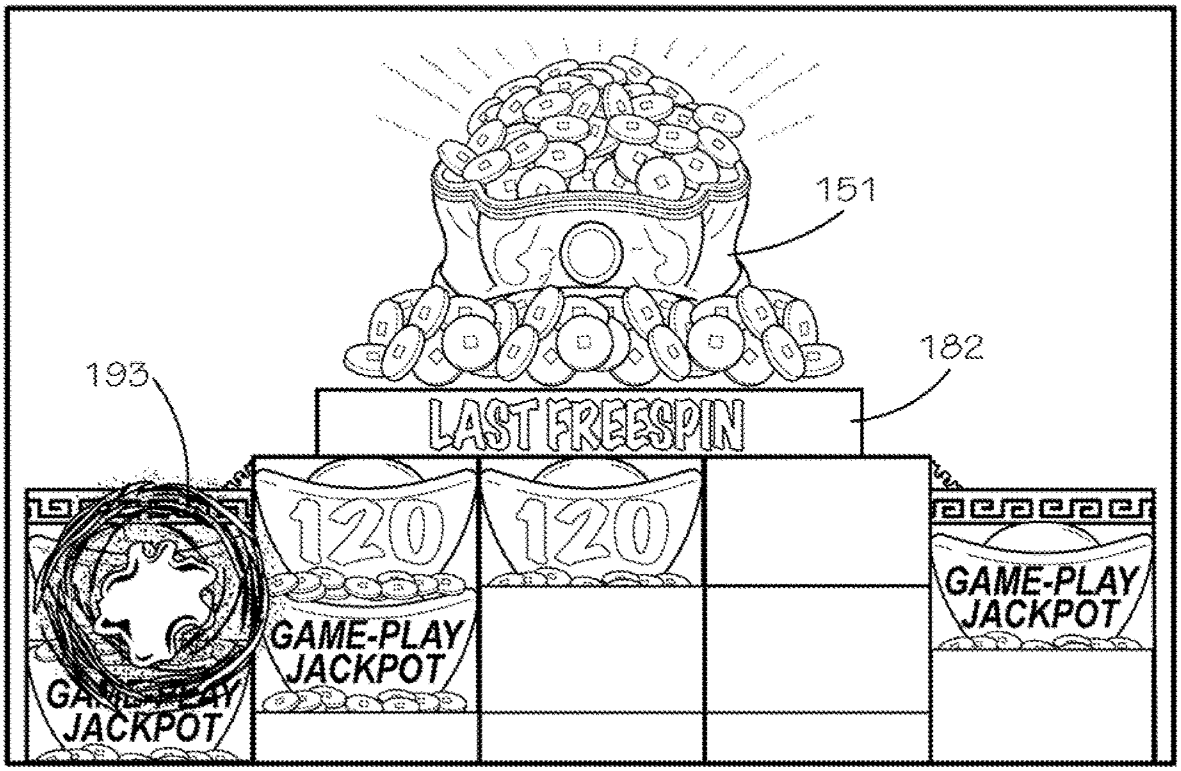
Figure 64:
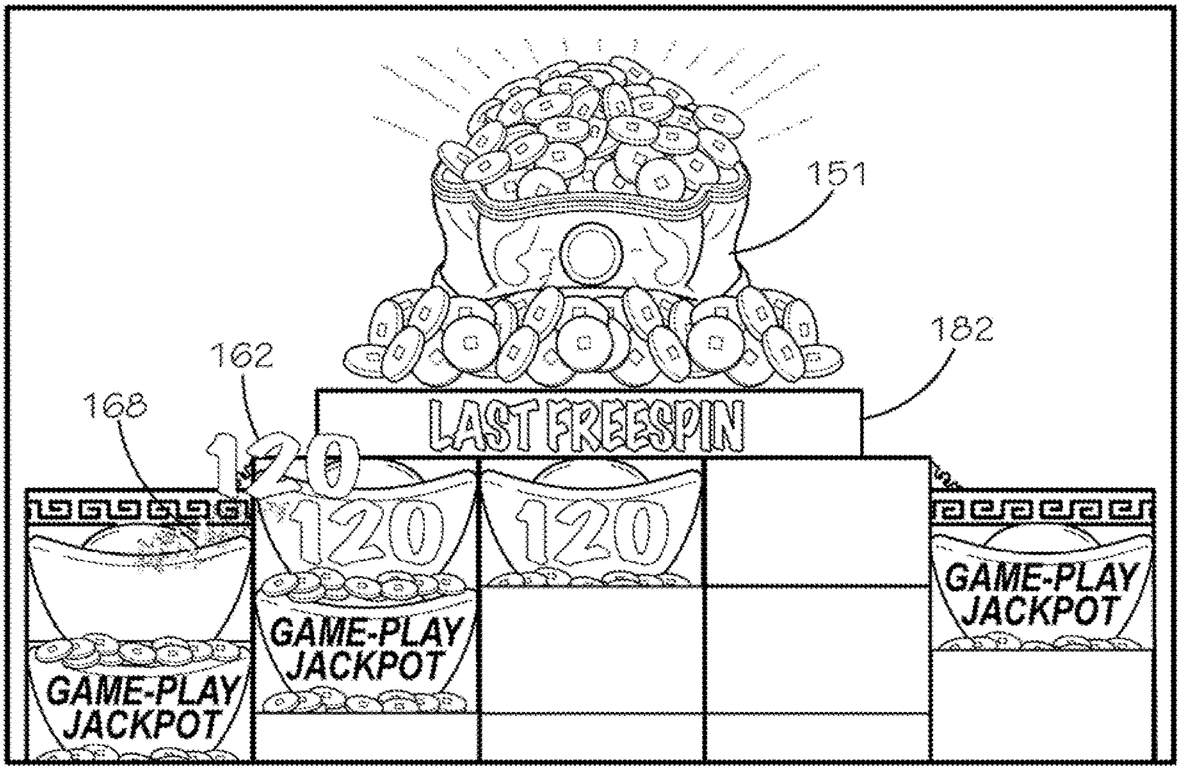
Figure 65:
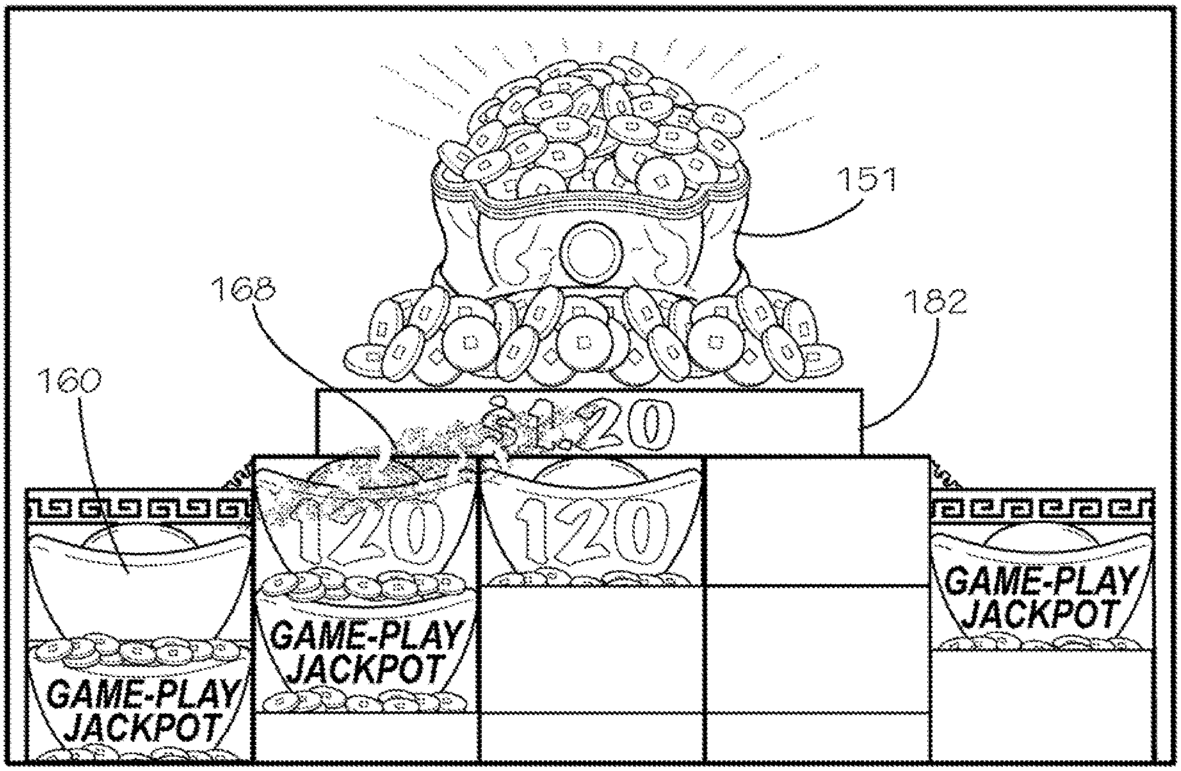
Figure 66:
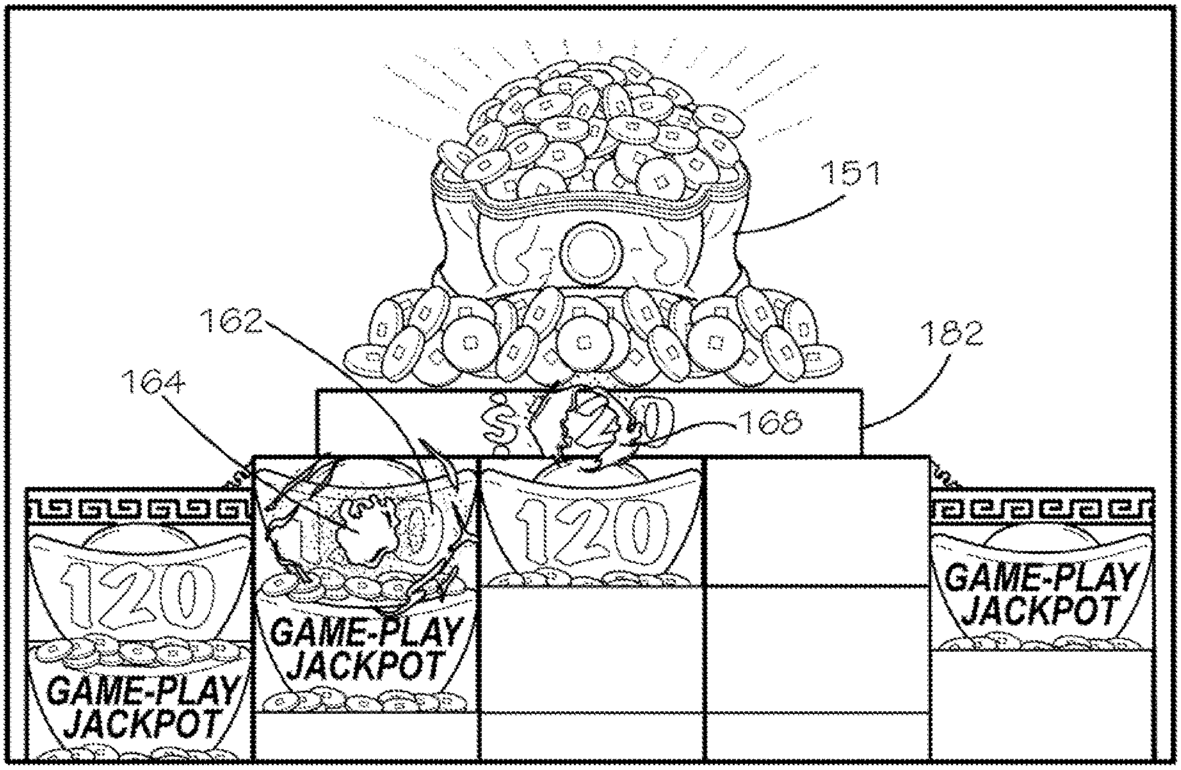
Figure 67:
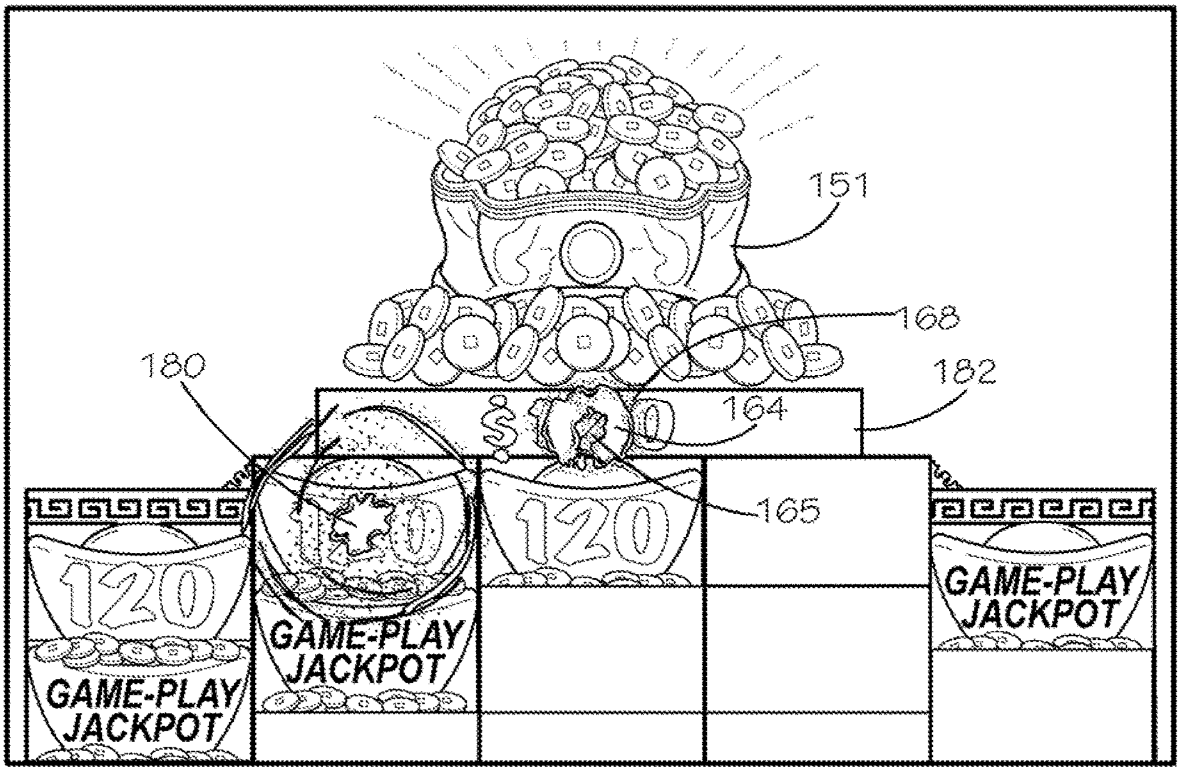
Figure 68:
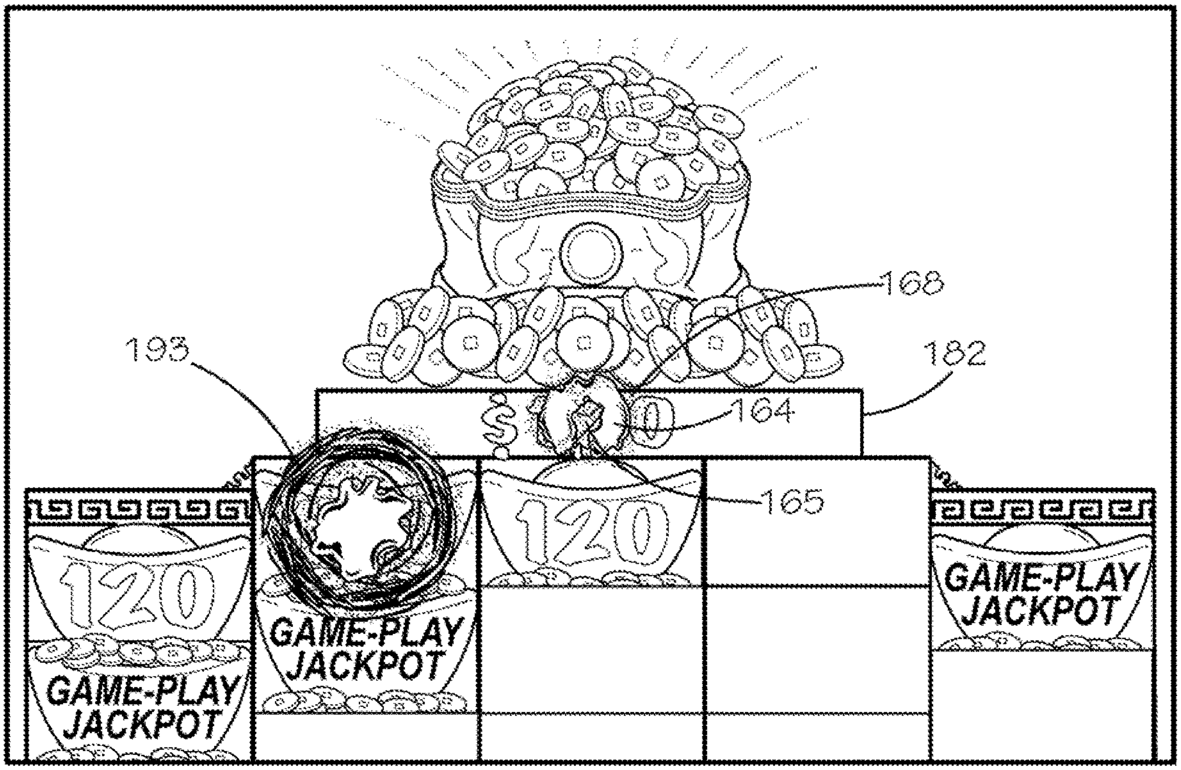
Figure 69:
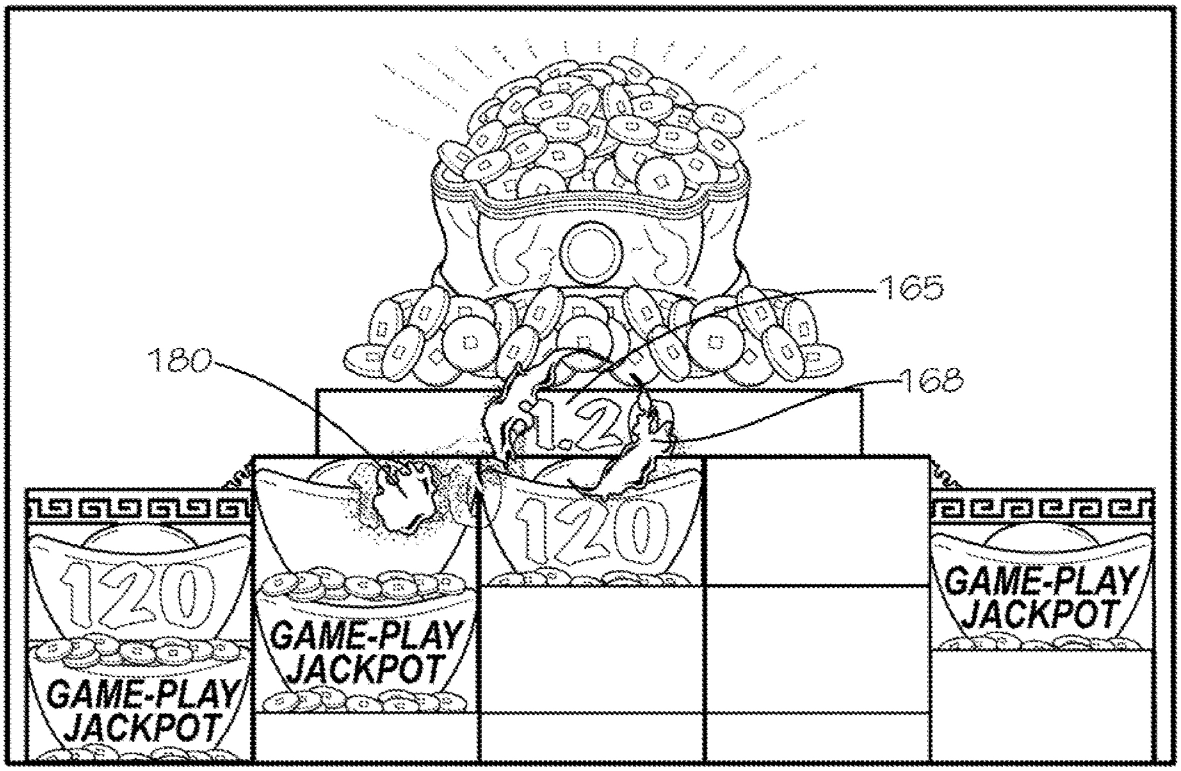
Figure 70:
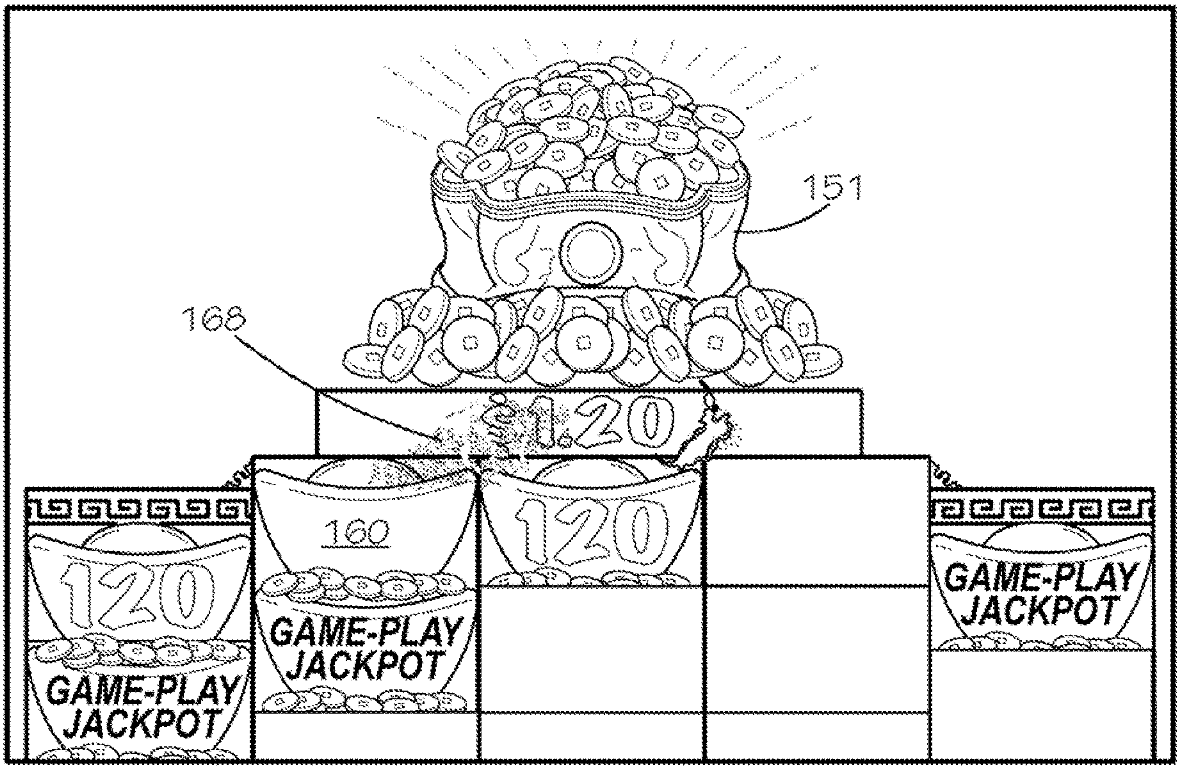
Figure 71:
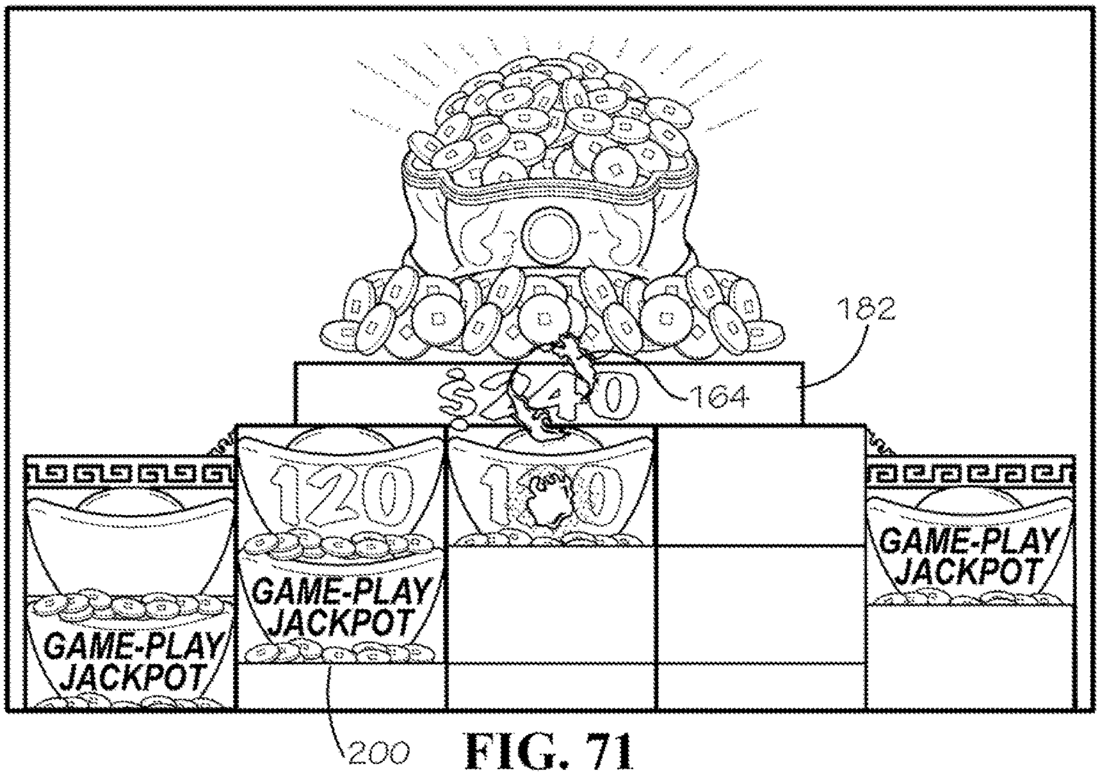

The win field 182 displays the amount of the remaining win types available for play, as shown in FIG. 58. Upon initiation of the last of the remaining win types for play, the win field 182 displays confirmation of such, and the reels move as shown in FIGS. 59 and 60. If no further win symbols occur at the end of play as shown in the matrix, the win values of the first type than transfer to the win field 182. The flash 164 occurs (FIG. 61) and an irregular plate 191 forms around the flash that expands over the win value (FIG. 62). The irregular plate 191 is a gaseous cloudy field of an irregular perimeter. As shown in FIG. 63, the irregular plate 191 transforms into a regular perimeter field 193, and the flash field area increases and obscures the win symbol and win value. The regular field 193 then collapses and vaporizes as shown in FIG. 64. The win value 162 commences moving to the win field 182 as shown in FIGS. 64 and 65. The win type is displayed in the win field 182. As shown in FIG. 66, upon entry of the win value in the win field 182, the next (if any) of the win values is displayed and moved in accordance with the present apparatus, including the flash 164 (FIG. 66) while the tail 168 of the prior win value dissipates in the win field 182. The expansion of the flash overlies the win symbol and win value (FIG. 68), and the win value starts to move to the win field to be added to the total available for that win type (FIGS. 69, 70, and 71).

Figure 72:
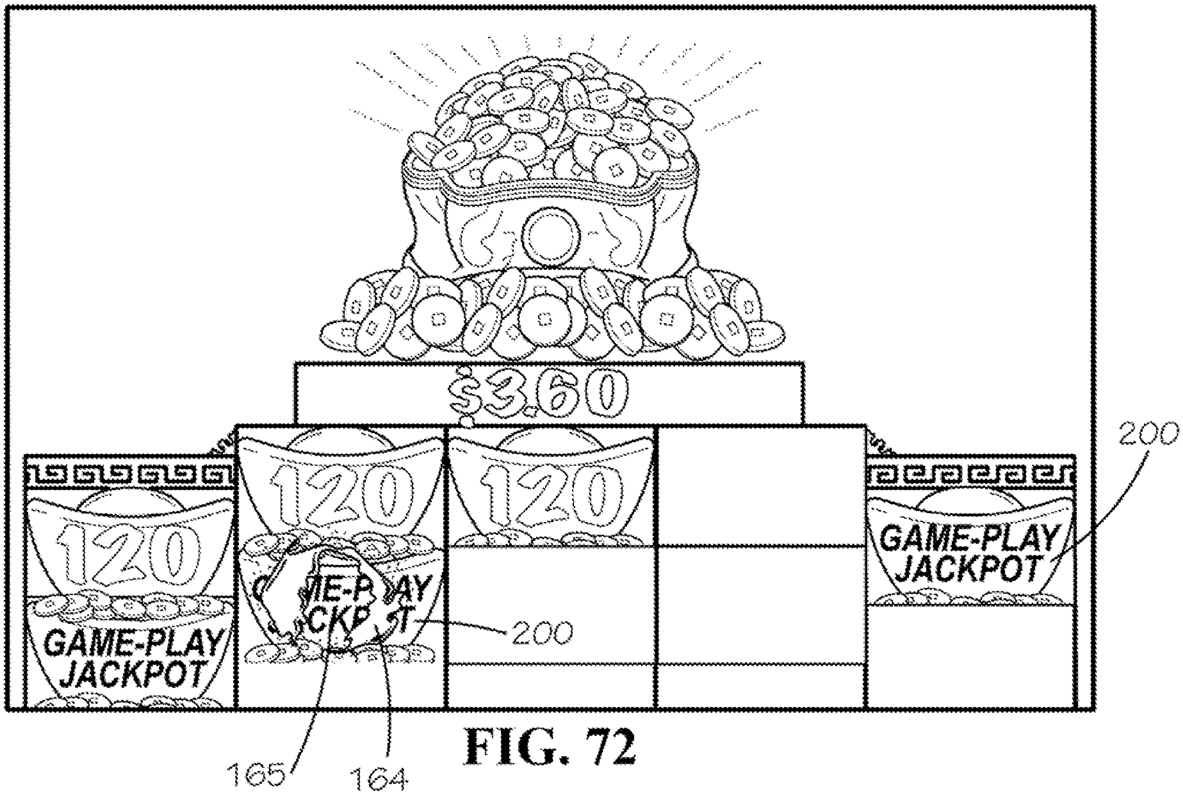

With reference to FIG. 72, in the illustrated embodiment, one or more game name symbols 200 may be displayed after the play or spin of the game. The illustrated embodiment as shown in FIG. 3 provides multiple levels of game play, which play level 201 is selected by the player and provides different awards. The illustrated embodiment provides an electronic game with the "mini" game award 132, the "minor" game award 134, the "major" game award 136, and a "grand" prize game award 138. The occurrence of wining is randomly provided during play according to game rules, with the mini game award 132 more common in occurrence than higher value awards.

Figure 73:
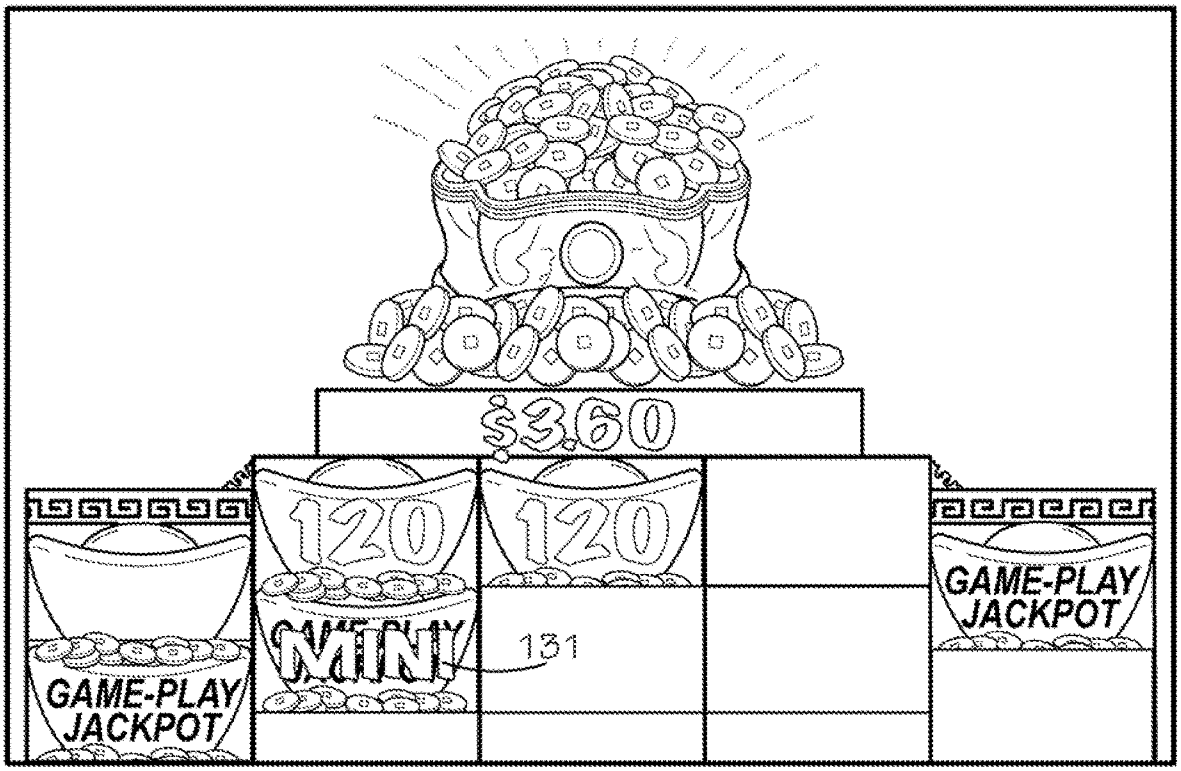
Figure 74:
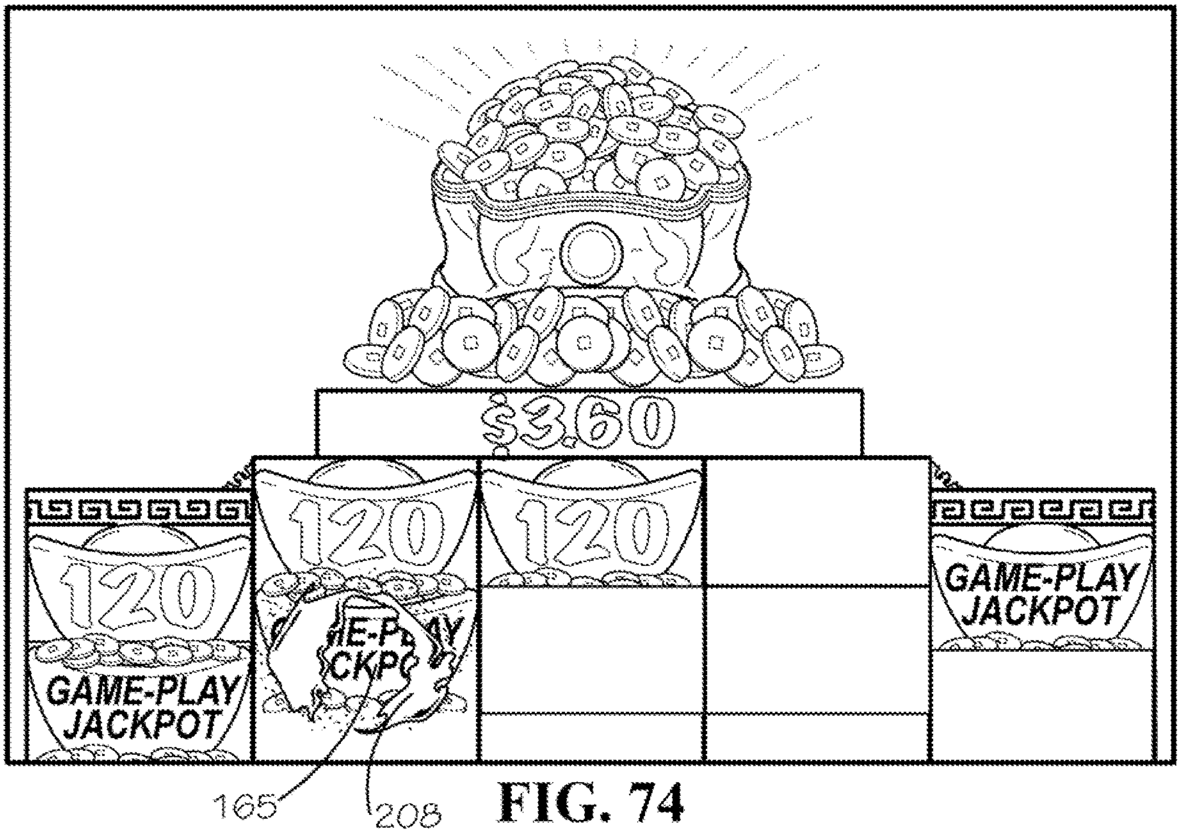
Figure 75:
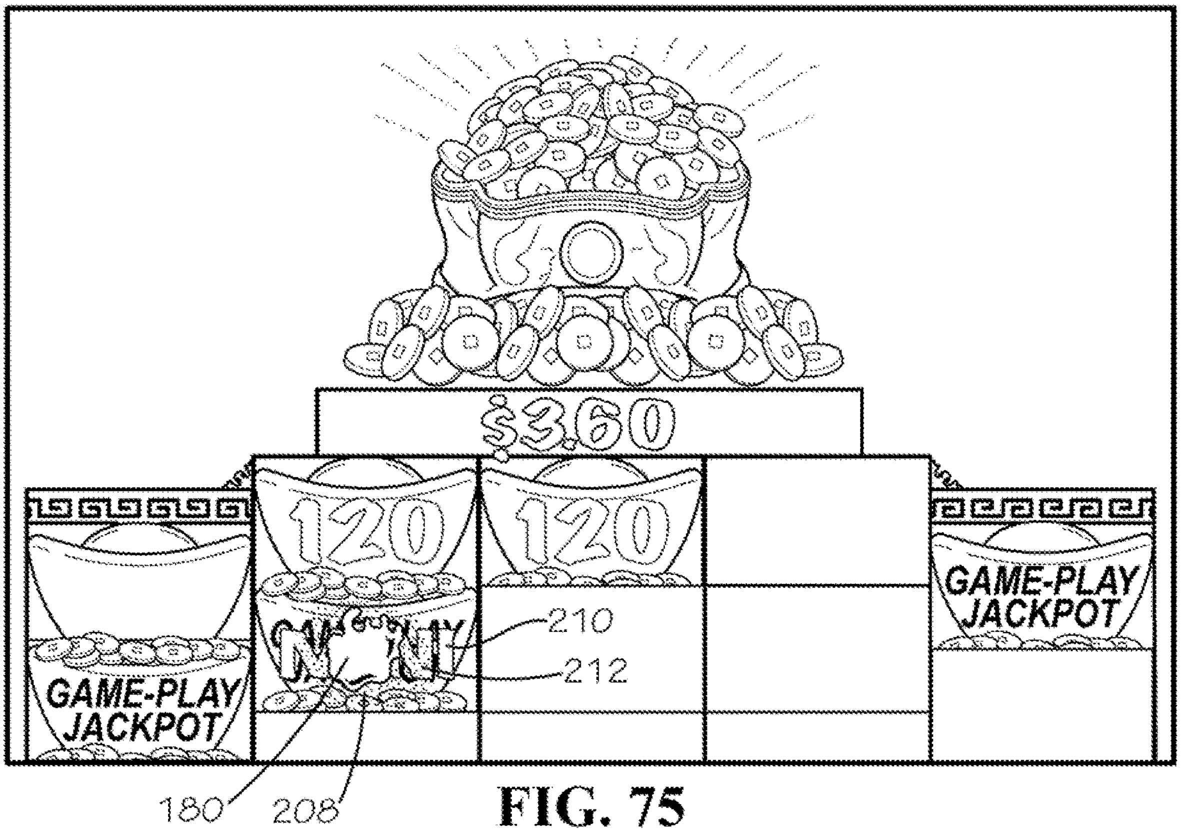
Figure 76:
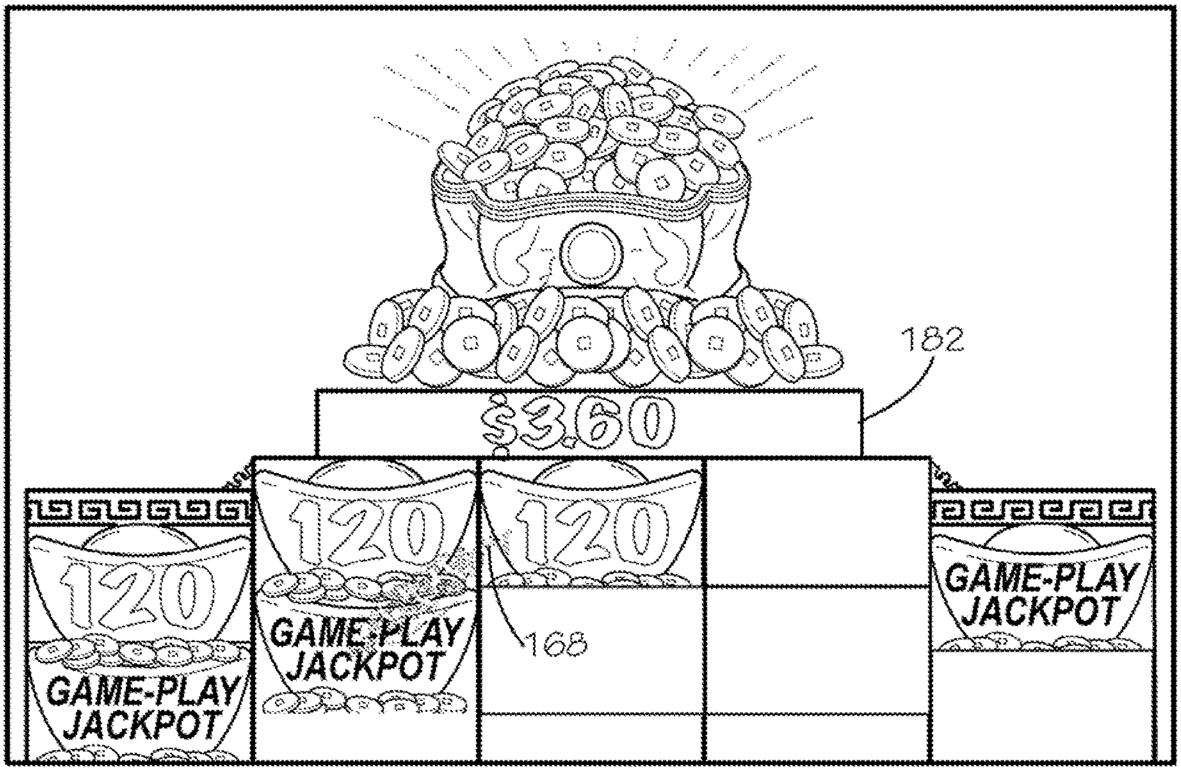
Figure 77:
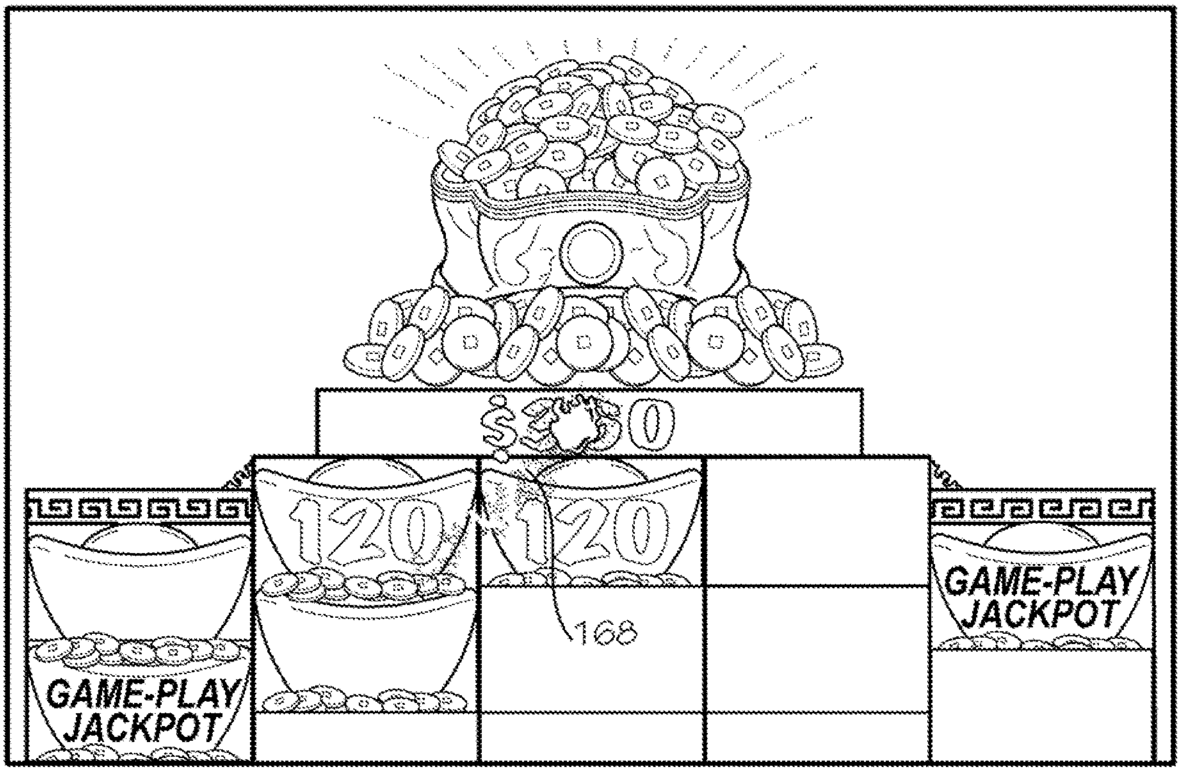
Figure 78:
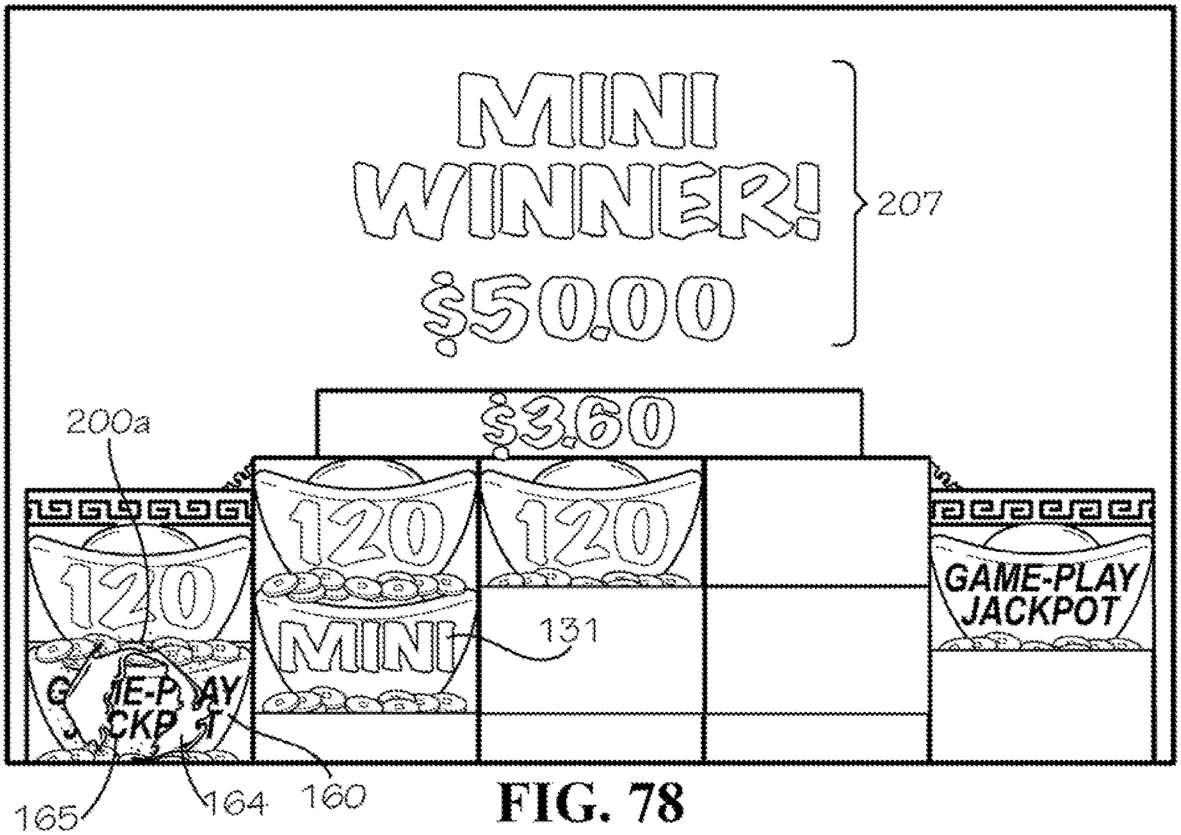
Figure 79:
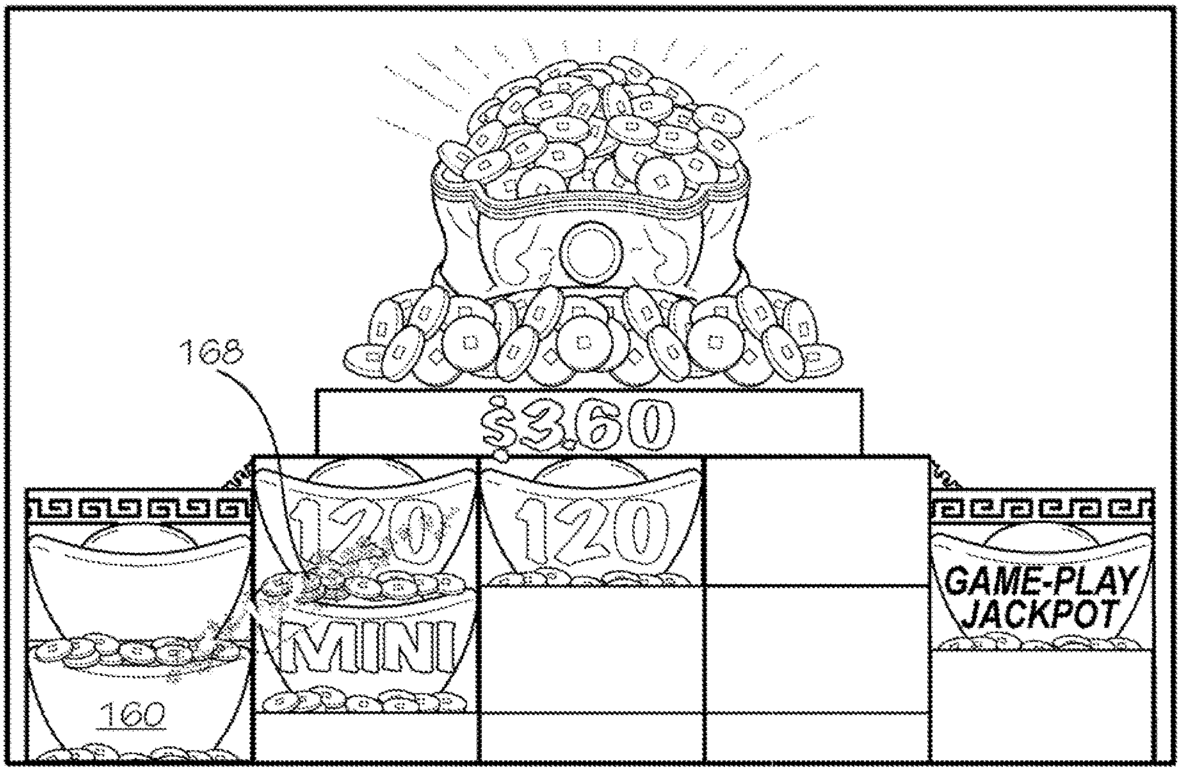
Figure 80:
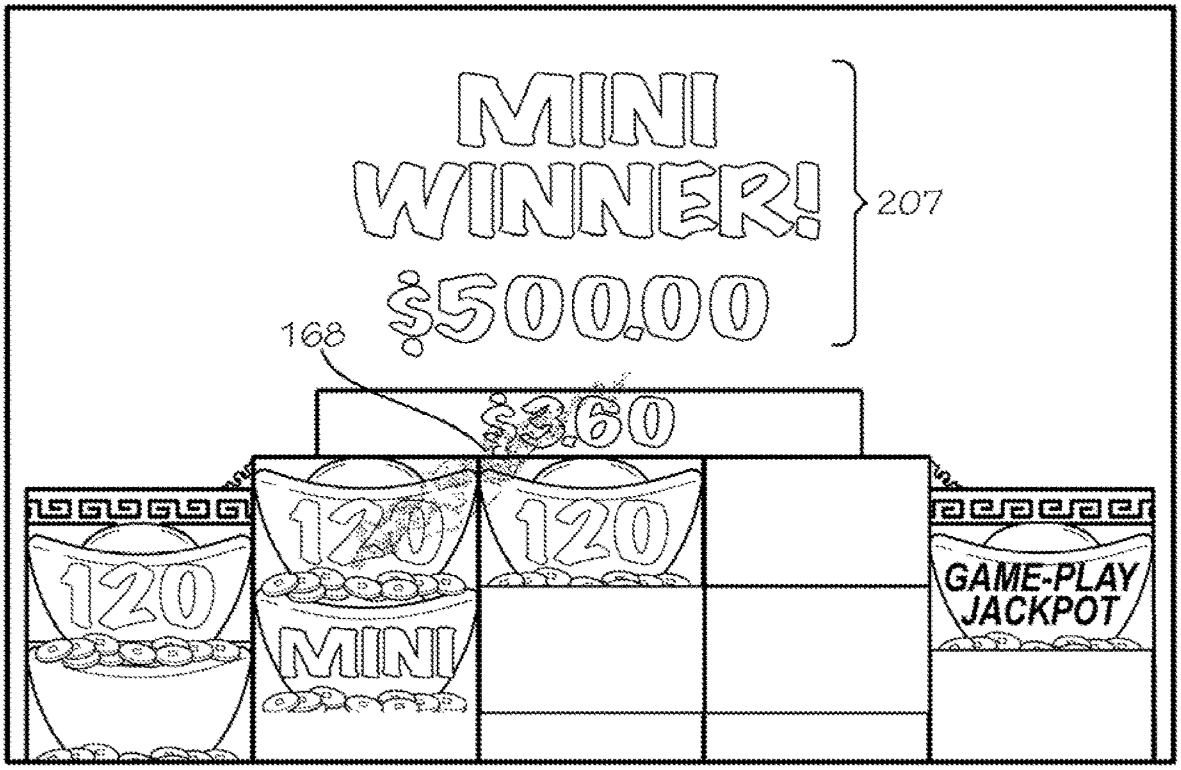
Figure 81:
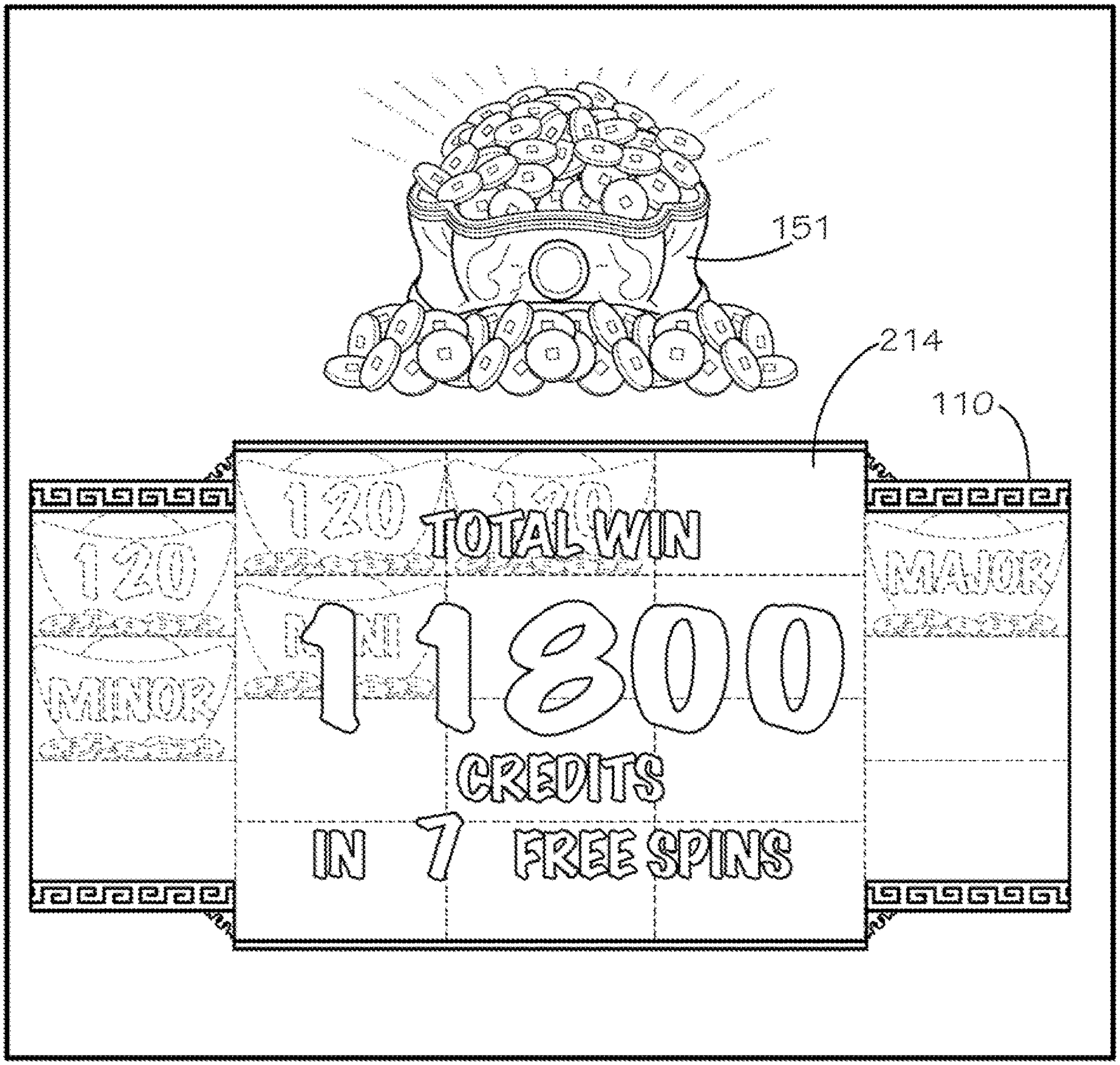
Figure 82:
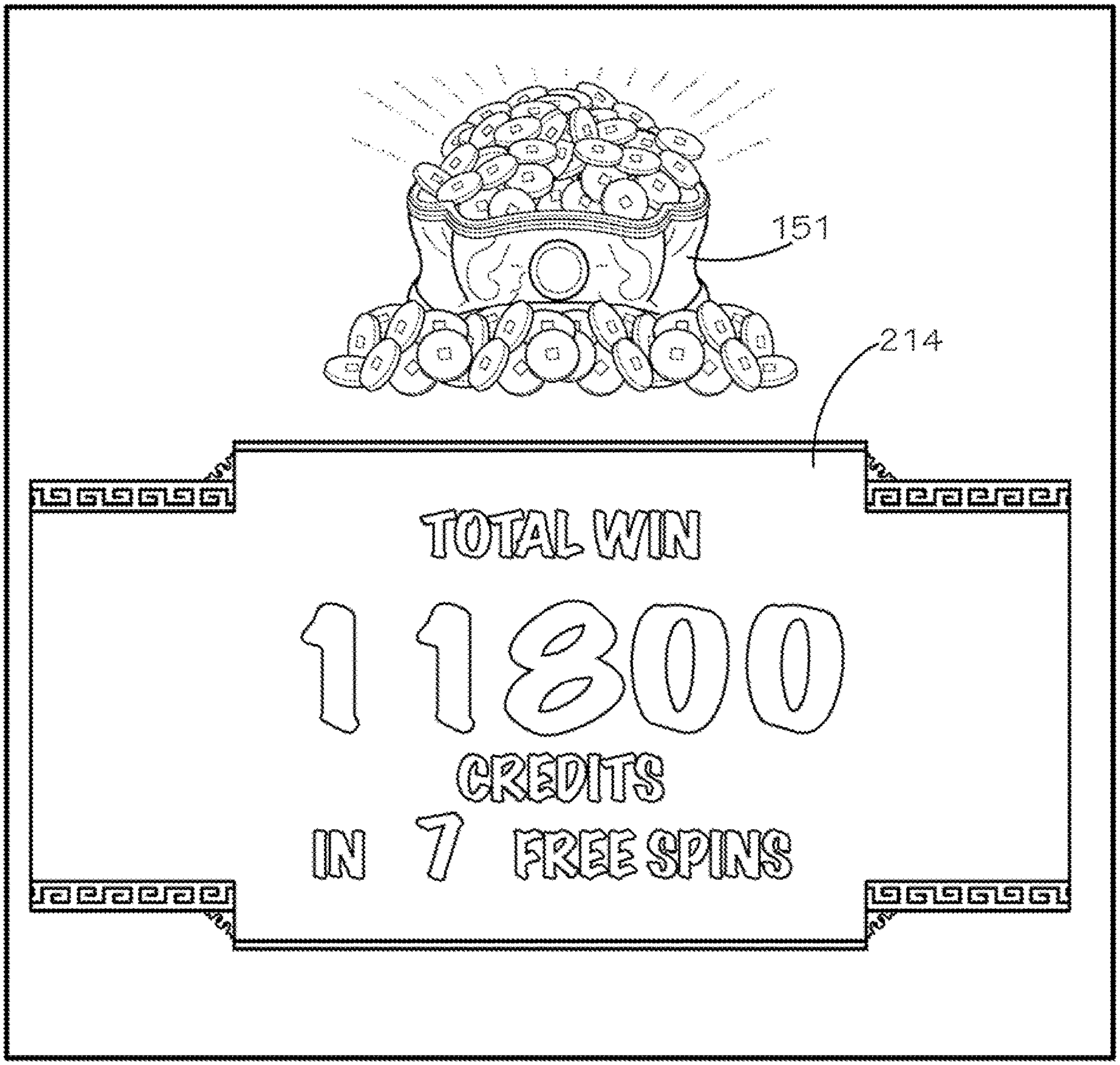

During play, a first of the bonus game symbol 200, such as a game name symbol, experiences one of the flashes 164, that expands outwardly overlying and covering the view of the game name symbol. As shown in FIG. 72, the expanding flash 164 develops the passageway 165 for view of the game name symbol. The game name symbol changes to an indicator of one of the game levels 131 as shown in FIG. 3 visible after vaporization of the temporarily obscuring cloud from the flash. A second flash 208 and expansion occurs as shown in FIGS. 73 and 74. A field 210 displays the level of the game and possible prize amount. The game level indicator overlying the win symbol experiences a flash 212 and expansion, and development of the passageway 165. The expanded flash 212 collapses, and the second flash 208 occurs as shown in FIG. 75. The game level indicator moves to the win field with the trailing tail 168 (FIGS. 76 and 77). Upon reaching the win field 182, the tail vaporizes (FIG. 78) while a second one of the game name symbols (if present in the matrix) experiences the flash and its expansion as discussed above. The game level indicator moves to the win field 182 as shown in FIGS. 79 and 80. The display displays 207 the game level name and possible prize award. The remaining game level symbols similarly display and move with the disclosed apparatus and process. The end of the bonus plays provides a display 214 over the matrix 110, which fades while the display presents information as to the won credits during the plays (FIGS. 81 and 82). The game machine then returns to the display of the reels and the award accumulator 150 for further play of the game. The win value shown on the display increases the accumulated wins, for example by adding and changing to the new value, or by a display of a sequential counter.

The present application discloses a gaming system for entertaining play having a randomly obtained win symbol for display during game activity, which gaming system comprises at least one input device, at least one display device configured to display a game comprising a matrix of rotating reels, and a processor. At least one memory includes computer program code configured to, with the processor, operate the activity of the gaming system. A win symbol occurs randomly during a play of the gaming system, said win symbol included in the matrix displayed on the display device and said win symbol for displaying a win value. The winning notice field having a group of a plurality of value devices representative of the win value and overlying the win symbol in the matrix, said winning notice field comprising a perimeter being irregular, whereby the win value is at least partially legible and the perimeter transforming to a substantially regular perimeter and expanding outwardly from the irregular perimeter to cover substantially more of the win symbol.

Further, a gaming system for entertaining play having a randomly obtained win symbol for display during game activity, which gaming system comprises: at least one input device; at least one display device configured to display a game comprising a matrix of rotating reels; a processor; at least one memory including computer software configured to, with the processor, operate the activity of the gaming system; a win symbol randomly occurring during a play of the gaming system, said win symbol displayed in the matrix displayed on the display device and said win symbol for a win value; and a winning notice field having a plurality of value devices representative of the win value and overlying at least a portion of the win symbol in the matrix, said winning notice field comprising: an opaque field having a perimeter, whereby the win value is at least partially legible; and the perimeter transformable to a substantially regular perimeter and expandable outwardly to cover at least the entirety of the win symbol.

The gaming system for entertaining play as recited above, wherein the perimeter expanding outwardly further defines a transparent passageway for viewing a portion of the win symbol therethrough until the winning notice field disappears from the display as the win value thereby becomes legible.

The gaming system for entertaining play as recited above, further comprising the plurality of value devices movable from the win symbol to a winnings accumulator.

The gaming system for entertaining play as recited above, wherein a value associated with the winnings accumulator increases by the win value.

The gaming system for entertaining play as recited above, further comprising a trailing tail that extends from the plurality of value devices during movement to the winnings accumulator.

The gaming system for entertaining play as recited above, wherein the plurality of value devices fade from the display upon entering the display of the winning accumulator and the trailing tail flashes into an expanding field overlying at least a portion of the winnings accumulator.

The gaming system for entertaining play as recited above, wherein the expanding field defines a plurality of irregular members separately coalescing from a portion of the expanding field and moving outwardly from the winnings accumulator.

The gaming system for entertaining play as recited above, wherein each of the plurality of separating irregular members decrease in size from a first size to a second size as the expanding field dissolves into the coalescing irregular members.

The gaming system for entertaining play as recited above, further comprising a first flash of light displayed emitting from the win symbol prior to display of the winning notice field.

The gaming system for entertaining play as recited above, further comprising a second flash of light displayed emitting from the winnings accumulator upon the movement of the win symbol arriving at the winnings accumulator.

The gaming system for entertaining play as recited above, further comprising a second opaque field overlying at least a portion of the winnings accumulator upon the movement of the win symbol arriving at the winnings accumulator.

The gaming system for entertaining play as recited above, further comprising the second opaque field expanding from a first perimeter to a second perimeter overlying at least a majority of the displayed winnings accumulator.

The gaming system for entertaining play as recited above, further comprising the second opaque field fading from display while portions coalesce into a plurality of spaced apart irregular members.

The gaming system for entertaining play as recited above, wherein the irregular members move outwardly from the winnings accumulator.

The gaming system for entertaining play as recited above, wherein the irregular members change from a first size to second size smaller than the first size during movement.

Further, the present invention provides a gaming system for entertaining play having a win symbol for display during game activity, comprising: at least one input device; at least one display device configured to display a game; a processor for playing a game configured with computer software for operating the activity of the game; a win symbol displayed on the display during a play of the gaming system, said win symbol for displaying a value of a winning play; a winning notice field for temporary display in association with the win symbol, said winning notice field comprising: a perimeter being irregular and the winning notice field being translucent for overlaying at least a portion of the win symbol, whereby the win value is at least partially legible; the perimeter transforming to a substantially regular perimeter and expanding outwardly from the irregular perimeter to cover at least an entirety of the win symbol; and the winning notice field decreasing translucency to make the winning notice field opaque to hide the win symbol.

The gaming system for entertaining play as recited above, wherein the perimeter expanding outwardly further defines a transparent passage for viewing a portion of the win symbol therethrough until disappearing from the display over the win symbol as the win symbol thereby becomes legible.

The gaming system for entertaining play as recited above, further comprising the win symbol movable from a first portion of the display to a winnings accumulator.

The gaming system for entertaining play as recited above, wherein the win value increasingly adds to a current value associated with the winnings accumulator.

The gaming system for entertaining play as recited above, further comprising a trailing tail that extends from the win symbol during movement to the winnings accumulator.

The gaming system for entertaining play as recited above, wherein the display of the trailing tail fades from the display when the win symbol stops moving.

The gaming system for entertaining play as recited above, wherein the winning notice field includes a plurality of value devices representative of the win value.

In another aspect, the present invention provides a method of mechanically characterizing the display of a win symbol displayed during play of a gaming system, comprising the steps of: displaying a win symbol on a portion of the game presented on a display of a game playing device; overlying the win symbol with a winning notice field, said winning notice field opaque for covering at least a portion of the win symbol; enlarging the winning notice from a first perimeter to a second perimeter for covering the win symbol; forming a passageway through the winning notice for viewing at least a portion of the win symbol; fading the winning notice field from the display; and displaying a move of the win symbol from the portion of the game to a winnings accumulator.

The method of mechanically characterizing the display of a win symbol as recited above, further comprising the step of displaying a plurality of spaced-apart value devices in the winning notice field.

The method of mechanically characterizing the display of a win symbol as recited above, further comprising the step of moving the plurality of spaced-apart value devices with the movement of the win symbol to the winnings accumulator.

The method of mechanically characterizing the display of a win symbol as recited above, further comprising the step of rotating the plurality of spaced-apart value devices during the movement of the win symbol to the winnings accumulator.

The method of mechanically characterizing the display of a win symbol as recited above, further comprising the step of changing the color of the plurality of spaced-apart value devices during the movement of the win symbol to the winnings accumulator.

The method of mechanically characterizing the display of a win symbol as recited above, further comprising after the step of displaying the win symbol, displaying a light field emitting from a flash of a light from the win symbol.

The method of mechanically characterizing the display of a win symbol as recited above, further comprising the step of enlarging the light field from a first area to second area, the first area covering at least a portion of the win symbol and the second area covering at least a perimeter of the win symbol.

The method of mechanically characterizing the display of a win symbol as recited above, further comprising the step of increasing an intensity of the flash field from a first amount of light to a second amount of light, said second amount of light greater than the first amount of light and said flash field being a color lighter than the win symbol.

The method of mechanically characterizing the display of a win symbol as recited above, further comprising the step of fading the display of the light field to no light after reaching the second amount of light.

The method of mechanically characterizing the display of the win symbol as recited above, further comprising the step of displaying an opaque flash field overlying the display of the winnings accumulator after moving the win symbol thereto, said opaque field having a first perimeter.

The method of mechanically characterizing the display of the win symbol as recited above, further comprising the step of increasing the opaque field to a second perimeter greater than the first perimeter.

The method of mechanically characterizing the display of the win symbol as recited above, further comprising the step of changing an intensity of light of the opaque field from a first intensity to a second intensity greater than the first intensity.

The method of mechanically characterizing the display of the win symbol as recited above, further comprising the step of fading the light of the opaque field after reaching the second intensity to remove the opaque field from the display.

The method of mechanically characterizing the display of the win symbol as recited above, further comprising the step of coalescing portions of the opaque filed to form a plurality of spaced-apart irregular members that move outwardly therefrom.

The method of mechanically characterizing the display of the win symbol as recited above, further comprising the step of fading the color of the irregular members during movement.

The method of mechanically characterizing the display of the win symbol as recited above, further comprising the step of changing the area of each of the irregular members from a first area to a second area during movement, said second area smaller than the first area.

The foregoing discloses illustrative embodiments of a game system and method for mechanically characterizing a win event of a play of the game for attracting the player and increasing excitement and interest in game play. Variations and changes may be made to embodiments without departing from the scope of the invention as recited in the claims.

What is claimed is:

1. A gaming system for entertaining play having a randomly obtained win symbol for display during game activity, which gaming system comprises:

at least one input device;

at least one display device configured to display a game comprising a matrix of rotating reels;

a processor;

at least one memory including computer program software configured to, with the processor, operate the activity of the gaming system;

a win symbol randomly occurring during a play of the gaming system, said win symbol displayed in the matrix displayed on the display device and said win symbol having a win value displayed therewith; and a winning notice field having a plurality of value devices representative of the win value and overlying at least a portion of the win symbol in the matrix, said number of value devices representative of the win value, wherein the number of value devices displayed ranges from a first number of value devices for a first win value to a second number of value devices for a second win value, said second number greater than the first number and said second win value greater than said first win value, said winning notice field comprising:

an opaque field having a perimeter defining a first area whereby the win value is at least partially legible and said opaque field operative to expand outwardly while fading from display to define a transparent passageway for viewing a portion of the win symbol therethrough until the opaque field disappears from the display as the win value thereby becomes legible; and the plurality of value devices configured for being movable from the win symbol to a winnings accumulator; and the plurality of value devices further configured to fade from the display upon entering the display of the winning accumulator.

2. The gaming system for entertaining play as recited in claim 1, wherein a value associated with the winnings accumulator increases by the win value.

3. The gaming system for entertaining play as recited in claim 1, further comprising a trailing tail that extends from the plurality of value devices during movement to the winnings accumulator.

4. The gaming system for entertaining play as recited in claim 3, wherein the trailing tail flashes into an expanding field overlying at least a portion of the winnings accumulator.

5. The gaming system for entertaining play as recited in claim 4, wherein the expanding field defines a plurality of irregular members separately coalescing from a portion of the expanding field and moving outwardly from the winnings accumulator.

6. The gaming system for entertaining play as recited in claim 5, wherein each of the plurality of separating irregular members decrease in size from a first size to a second size as the expanding field dissolves into the coalescing irregular members.

7. The gaming system for entertaining play as recited in claim 1, further comprising a first flash of light displayed emitting from the win symbol prior to display of the winning notice field.

8. The gaming system for entertaining play as recited in claim 1, further comprising a flash of light displayed emitting from the winnings accumulator upon the movement of the win symbol arriving at the winnings accumulator.

9. The gaming system for entertaining play as recited in claim 1, further comprising a second opaque field overlying at least a portion of the winnings accumulator upon the movement of the win symbol arriving at the winnings accumulator.

10. The gaming system for entertaining play as recited in claim 9, further comprising the second opaque field expanding from a first perimeter to a second perimeter overlying at least a majority of the displayed winnings accumulator.

11. The gaming system for entertaining play as recited in claim 9, further comprising the second opaque field fading from display while portions coalesce into a plurality of spaced apart irregular members.

12. The gaming system for entertaining play as recited in claim 11, wherein the irregular members move outwardly from the winnings accumulator.

13. The gaming system for entertaining play as recited in claim 12, wherein the irregular members change from a first size to second size smaller than the first size during movement.

14. The gaming system for entertaining play as recited in claim 1, wherein the perimeter transformable to a substantially regular perimeter and expandable outwardly to cover at least the entirety of the win symbol.

15. The gaming system for entertaining play as recited in claim 14, wherein the perimeter expanding outwardly further defines a transparent passageway for viewing a portion of the win symbol therethrough until the winning notice field disappears from the display as the win value thereby becomes legible.

16. A method of mechanically characterizing the display of a win symbol during play of a gaming system, comprising the steps of:

displaying a win symbol on a portion of the game presented on a display of a game playing device during play of a game;

displaying a winning field having a plurality of value devices representative of the win value and overlying at least a portion of the win symbol, said number of value devices representative of the win value, wherein the number of value devices ranges from a first number for a first win value to a second number for a second win value, said second number greater than the first number and said second win value greater than said first win value, said winning notice field comprising:

an opaque field having a perimeter for covering at least a portion of the win symbol, whereby the win symbol is at least partially legible and said opaque field operative to expand outwardly while fading from display to define a transparent passageway for viewing a portion of the win symbol therethrough until the opaque field disappears from the display as the win value thereby becomes legible;

moving the plurality of value devices movable from the win symbol to a winnings accumulator; and fading the display of the plurality of value devices upon entering the display of the winning accumulator.

17. The method of mechanically characterizing the display of a win symbol as recited in claim 16, further comprising the step of moving the plurality of spaced-apart value devices with the movement of the win symbol to the winnings accumulator.

18. The method of mechanically characterizing the display of a win symbol as recited in claim 16, further comprising the step of rotating the plurality of spaced-apart value devices during the movement of the win symbol to the winnings accumulator.

19. The method of mechanically characterizing the display of a win symbol as recited in claim 17, further comprising the step of changing the color of the plurality of spaced-apart value devices during the movement of the win symbol to the winnings accumulator.

20. The method of mechanically characterizing the display of a win symbol as recited in claim 16, further comprising after the step of displaying the win symbol, displaying a light field emitting from a flash of a light from the win symbol.

21. The method of mechanically characterizing the display of a win symbol as recited in claim 20, further comprising the step of enlarging the light field from a first area to second area, the first area covering at least a portion of the win symbol and the second area covering at least a perimeter of the win symbol.

22. The method of mechanically characterizing the display of a win symbol as recited in claim 21, further comprising the step of increasing an intensity of the flash field from a first amount of light to a second amount of light, said second amount of light greater than the first amount of light and said flash field being a color lighter than the win symbol.

23. The method of mechanically characterizing the display of a win symbol as recited in claim 22, further comprising the step of fading the display of the light field to no light after reaching the second amount of light.

24. The method of mechanically characterizing the display of the win symbol as recited in claim 16, further comprising the step of displaying an opaque flash field overlying the display of the winnings accumulator after moving the win symbol thereto, said opaque field having a first perimeter.

25. The method of mechanically characterizing the display of the win symbol as recited in claim 16, further comprising the step of increasing the opaque field to a second perimeter greater than the first perimeter.

26. The method of mechanically characterizing the display of the win symbol as recited in claim 24, further comprising the step of changing an intensity of light of the opaque field from a first intensity to a second intensity greater than the first intensity.

27. The method of mechanically characterizing the display of the win symbol as recited in claim 26, further comprising the step of fading the light of the opaque field after reaching the second intensity to remove the opaque field from the display.

28. The method of mechanically characterizing the display of the win symbol as recited in claim 25, further comprising the step of coalescing portions of the opaque filed to form a plurality of spaced-apart irregular members that move outwardly therefrom.

29. The method of mechanically characterizing the display of the win symbol as recited in claim 28, further comprising the step of fading the color of the irregular members during movement.

30. The method of mechanically characterizing the display of the win symbol as recited in claim 29, further comprising the step of changing the area of each of the irregular members from a first area to a second area during movement, said second area smaller than the first area.

31. The method of mechanically characterizing the display of the win symbol as recited in claim 29, further comprising the steps of:

enlarging the winning notice from a first perimeter to a second perimeter for covering the win symbol;

forming a passageway through the winning notice for viewing at least a portion of the win symbol; and fading the winning notice field from the display.

* * * * *